(12) United States Patent
Murakawa et al.

(10) Patent No.: US 11,111,567 B2
(45) Date of Patent: Sep. 7, 2021

(54) NON-ORIENTED ELECTRICAL STEEL SHEET

(71) Applicant: NIPPON STEEL CORPORATION, Tokyo (JP)

(72) Inventors: Tesshu Murakawa, Tokyo (JP); Hiroshi Fujimura, Tokyo (JP); Satoshi Kano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/970,573

(22) PCT Filed: Mar. 25, 2019

(86) PCT No.: PCT/JP2019/012417
§ 371 (c)(1),
(2) Date: Aug. 17, 2020

(87) PCT Pub. No.: WO2019/188940
PCT Pub. Date: Oct. 3, 2019

(65) Prior Publication Data
US 2021/0108296 A1    Apr. 15, 2021

(30) Foreign Application Priority Data

Mar. 26, 2018  (JP) .............................. JP2018-058264

(51) Int. Cl.
*C22C 38/42*      (2006.01)
*C22C 38/34*      (2006.01)
(Continued)

(52) U.S. Cl.
CPC .............. *C22C 38/42* (2013.01); *B32B 15/01* (2013.01); *C21D 6/004* (2013.01); *C21D 6/005* (2013.01);
(Continued)

(58) Field of Classification Search
CPC ......... C22C 38/42; C22C 38/34; C22C 38/04; C22C 38/06; C22C 38/008; C22C 38/005;
(Continued)

(56) References Cited

U.S. PATENT DOCUMENTS

2006/0124207 A1   6/2006  Takashima et al.
2014/0170440 A1*  6/2014  Kawata ................... C22C 38/34
                                                          428/659

(Continued)

FOREIGN PATENT DOCUMENTS

EP       1 411 138 A1    4/2004
JP       61-231120 A    10/1986
(Continued)

OTHER PUBLICATIONS

"Metallic materials—Tensile testing—Method of test at room temperature", JIS Z 2241, 2011, total 37 pages.
(Continued)

*Primary Examiner* — Michael E. La Villa
(74) *Attorney, Agent, or Firm* — Birch, Stewart, Kolasch & Birch, LLP

(57) ABSTRACT

A non-oriented electrical steel sheet including, as a chemical composition, by mass %: C: 0.0030 % or less; Si: 2.00 % to 4.00 %; Al: 0.01 % to 3.00 %; Mn: 0.10 % to 2.00 %; P: 0.005 % to 0.200 %; S: 0.0030 % or less; Cu: more than 1.0 % and 3.0 % or less; Ni: 0.10 % to 3.0 %; one or more coarse precipitate forming element: more than 0.0005 % and 0.0100 % or less in total; a parameter Q (Q=[Si] +2 [Al] [Mn]) is 2.00 or more; Sn: 0.00 % to 0.40 %; Cr: 0.0 % to 10.0 %, and a remainder: Fe and impurities, wherein a number of Cu particles having a diameter of less than 100 nm is 5 or more per 10 μm², a {100} crystal orientation intensity is 2.4 or more, a thickness is 0.10 mm to 0.60 mm, and an average grain size is 70 μm to 200 μm.

4 Claims, 1 Drawing Sheet

(51) Int. Cl.

| | |
|---|---|
| *C22C 38/06* | (2006.01) |
| *C22C 38/04* | (2006.01) |
| *C22C 38/00* | (2006.01) |
| *C21D 9/46* | (2006.01) |
| *C21D 8/12* | (2006.01) |
| *C21D 8/00* | (2006.01) |
| *C21D 6/00* | (2006.01) |
| *H01F 1/147* | (2006.01) |
| *B32B 15/01* | (2006.01) |
| *C23C 30/00* | (2006.01) |
| *C22C 38/40* | (2006.01) |
| *C22C 38/02* | (2006.01) |
| *C22C 38/08* | (2006.01) |
| *C22C 38/16* | (2006.01) |
| *C22C 38/18* | (2006.01) |
| *C22C 38/20* | (2006.01) |
| *C22C 38/38* | (2006.01) |
| *C22C 38/58* | (2006.01) |

(52) U.S. Cl.
CPC ............ *C21D 6/008* (2013.01); *C21D 8/005* (2013.01); *C21D 8/1222* (2013.01); *C21D 9/46* (2013.01); *C22C 38/00* (2013.01); *C22C 38/002* (2013.01); *C22C 38/005* (2013.01); *C22C 38/008* (2013.01); *C22C 38/04* (2013.01); *C22C 38/06* (2013.01); *C22C 38/34* (2013.01); *C22C 38/40* (2013.01); *C23C 30/00* (2013.01); *C23C 30/005* (2013.01); *H01F 1/147* (2013.01); *C21D 8/12* (2013.01); *C22C 38/004* (2013.01); *C22C 38/02* (2013.01); *C22C 38/08* (2013.01); *C22C 38/16* (2013.01); *C22C 38/18* (2013.01); *C22C 38/20* (2013.01); *C22C 38/38* (2013.01); *C22C 38/58* (2013.01); *C22C 2202/02* (2013.01); *Y10T 428/12951* (2015.01); *Y10T 428/12972* (2015.01)

(58) Field of Classification Search
CPC ..... C22C 38/002; C22C 38/004; C22C 38/02; C22C 38/08; C22C 38/16; C22C 38/18; C22C 38/20; C22C 38/38; C22C 38/58; C22C 2202/02; C22C 38/40; C22C 38/00; C21D 9/46; C21D 8/005; C21D 8/1222; C21D 6/005; C21D 6/008; C21D 6/004; C21D 8/12; H01F 1/147; Y10T 428/12951; Y10T 428/12972; B32B 15/01; C23C 30/00; C23C 30/005

See application file for complete search history.

(56) References Cited

U.S. PATENT DOCUMENTS

| | | |
|---|---|---|
| 2017/0241002 A1 | 8/2017 | Nakajima et al. |
| 2018/0119258 A1 | 5/2018 | Fujikura et al. |

FOREIGN PATENT DOCUMENTS

| | | | |
|---|---|---|---|
| JP | 62-240714 | A | 10/1987 |
| JP | 3-126845 | A | 5/1991 |
| JP | 5-140648 | A | 6/1993 |
| JP | 10-36912 | A | 2/1998 |
| JP | 2002-3944 | A | 1/2002 |
| JP | 2004-197217 | A | 7/2004 |
| JP | 2004-315956 | A | 11/2004 |
| JP | 2004-323972 | A | 11/2004 |
| JP | 2006-124809 | A | 5/2006 |
| JP | 2008-127659 | A | 6/2008 |
| JP | 2008-132534 | A | 6/2008 |
| JP | 2010-121150 | A | 6/2010 |
| JP | 2011-157603 | A | 8/2011 |
| JP | 2016-153521 | A | 8/2016 |
| JP | 2017-137537 | A | 8/2017 |
| JP | 2018-12854 | A | 1/2018 |
| KR | 10-2008-0058479 | A | 6/2008 |
| TW | 201608035 | A | 3/2016 |
| TW | 201700750 | A | 1/2017 |
| WO | WO 2016/175121 | A1 | 11/2016 |

OTHER PUBLICATIONS

"Test pieces for tensile test for metallic materials", JIS Z 2201, 1998, total 6 pages.

International Search Report for PCT/JP2019/012417 dated Jun. 18, 2019.

Office Action for TW 108110281 dated Nov. 5, 2019.

\* cited by examiner

NON-ORIENTED ELECTRICAL STEEL SHEET

TECHNICAL FIELD OF THE INVENTION

The present invention relates to a non-oriented electrical steel sheet.

Priority is claimed on Japanese Patent Application No. 2018-058264 filed on Mar. 26, 2018, the content of which is incorporated herein by reference.

RELATED ART

Non-oriented electrical steel sheets are used, for example, for the cores of motors. Non-oriented electrical steel sheets are required to have excellent magnetic characteristics in all directions parallel to the sheet surface (hereinafter, sometimes referred to as "all directions in the sheet surface"), such as low iron loss and high magnetic flux density. Particularly, a non-oriented electrical steel sheet used for a motor for a hybrid electric vehicle (HEV) is required to have good performance at an ultra-high-speed rotation of about 10,000 rpm.

At this rotational speed, while a material having a strength to withstand centrifugal force, excellent high-frequency iron loss, and high magnetic flux density is required, elongation of the material is also required to prevent chipping during working.

PRIOR ART DOCUMENT

Patent Document

[Patent Document 1] Japanese Unexamined Patent Application, First Publication No. H3-126845
[Patent Document 2] Japanese Unexamined Patent Application, First Publication No. 2006-124809
[Patent Document 3] Japanese Unexamined Patent Application, First Publication No. S61-231120
[Patent Document 4] Japanese Unexamined Patent Application, First Publication No. 2004-197217
[Patent Document 5] Japanese Unexamined Patent Application, First Publication No. H5-140648
[Patent Document 6] Japanese Unexamined Patent Application, First Publication No. 2008-132534
[Patent Document 7] Japanese Unexamined Patent Application, First Publication No. 2004-323972
[Patent Document 8] Japanese Unexamined Patent Application, First Publication No. S62-240714
[Patent Document 9] Japanese Unexamined Patent Application, First Publication No. 2011-157603
[Patent Document 10] Japanese Unexamined Patent Application, First Publication No. 2008-127659

DISCLOSURE OF THE INVENTION

Problems to be Solved by the Invention

An object of the present invention is to provide a non-oriented electrical steel sheet which is excellent in magnetic characteristics and excellent in both strength and elongation.

Means for Solving the Problem

The present inventors have intensively studied to solve the above-mentioned problems. As a result, it became clear that it is important to make a chemical composition, a thickness, and an average grain size appropriate. It also became clear that in the manufacturing of such a non-oriented electrical steel sheet, when a steel strip to be subjected to cold rolling, such as a hot-rolled steel strip, is to be obtained, it is important to control a proportion of columnar crystals and an average grain size in casting or rapid solidification of molten steel, to control a rolling reduction of the cold rolling, and to control a sheet passing tension and a cooling rate during final annealing.

The present inventors have conducted further intensive studies based on such findings, and as a result, have arrived at various aspects of the invention described below.

(1) A non-oriented electrical steel sheet according to an aspect of the present invention includes, as a chemical composition, by mass %:
C: 0.0030% or less;
Si: 2.00% to 4.00%;
Al: 0.01% to 3.00%;
Mn: 0.10% to 2.00%;
P: 0.005% to 0.200%;
S: 0.0030% or less;
Cu: more than 1.0% and 3.0% or less;
Ni: 0.10% to 3.0%;
one or more selected from the group consisting of Mg, Ca, Sr, Ba, Ce, La, Nd, Pr, Zn, and Cd: more than 0.0005% and 0.0100% or less in total;
a parameter Q represented by Formula 1 where a Si content (mass %) is set as [Si], an Al content (mass %) is set as [Al], and a Mn content (mass %) is set as [Mn]: 2.00 or more;
Sn: 0.00% to 0.40%;
Cr: 0.0% to 10.0%, and
a remainder: Fe and impurities,
in which a number of particles of a simple Cu having a diameter of less than 100 nm is 5 or more per 10 μm², a {100} crystal orientation intensity is 2.4 or more, a thickness is 0.10 mm to 0.60 mm, and an average grain size is 70 μm to 200 μm.

$$Q=[Si]+2[Al]-[Mn] \quad\quad\quad \text{(Formula 1)}$$

(2) The non-oriented electrical steel sheet according to (1), in which, in the chemical composition,
Sn: 0.02% to 0.40%
may be satisfied.

(3) The non-oriented electrical steel sheet according to (1) or (2), in which, in the chemical composition,
Cr: 0.2% to 10.0%
may be satisfied.

Effects of the Invention

According to the present invention, since a chemical composition, a thickness, and an average grain size are appropriate, it is possible to provide a non-oriented electrical steel sheet which is excellent in magnetic characteristics and excellent in both strength and elongation.

EMBODIMENTS OF THE INVENTION

Figure 1:
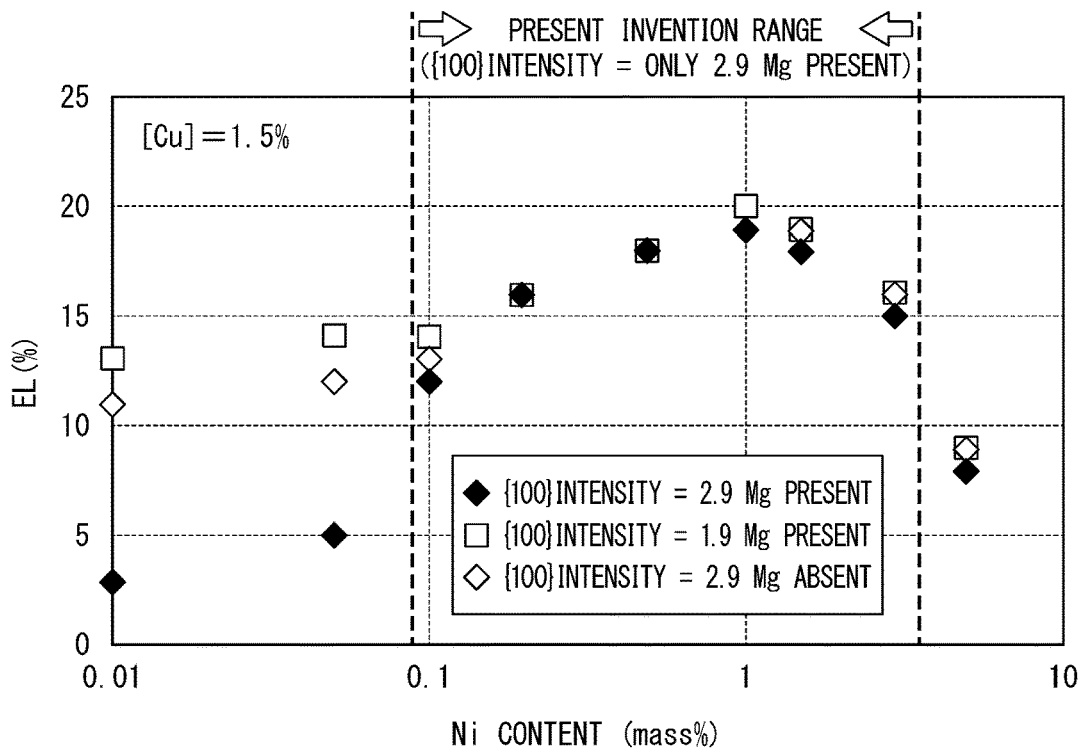
FIG. 1 is a diagram showing a relationship between a Ni content and an EL in a case where a Cu content is 1.5%.

Hereinafter, embodiments of the present invention will be described in detail. It is obvious that the present invention is not construed as being limited to the following embodiments.

First, the chemical compositions of a non-oriented electrical steel sheet according to an embodiment of the present invention and molten steel used for manufacturing the same will be described. Although details will be described later, the non-oriented electrical steel sheet according to the embodiment of the present invention is manufactured through casting and hot rolling of molten steel or rapid solidification of molten steel, cold rolling, final annealing, and the like. Therefore, for the chemical compositions of the non-oriented electrical steel sheet and the molten steel, not only the characteristics of the non-oriented electrical steel sheet, but also these treatments are considered.

In the following description, "%", which is a unit of the amount of each element contained in the non-oriented electrical steel sheet or the molten steel, means "mass %" unless otherwise specified.

Furthermore, the numerical limit range described below includes a lower limit and an upper limit. Numerical values indicating "more than" or "less than" do not fall within the numerical range. "%" regarding the amount of each element means "mass %".

The non-oriented electrical steel sheet according to the present embodiment includes, as a chemical composition: C: 0.0030% or less; Si: 2.00% to 4.00%; Al: 0.01% to 3.00%; Mn: 0.10%. 2.00%; P: 0.005% to 0.200%; S: 0.0030% or less; Cu: more than 1.0% and 3.0% or less; Ni: 0.10% to 3.0%; one or more selected from the group consisting of Mg, Ca, Sr, Ba, Ce, La, Nd, Pr, Zn, and Cd: more than 0.0005% and 0.0100% or less in total; a parameter Q represented by Formula 1 where a Si content (mass %) is set as [Si], an Al content (mass %) is set as [Al], and a Mn content (mass %) is set as [Mn]: 2.00 or more; Sn: 0.00% to 0.40%; Cr: 0.0% to 10.0%, and a remainder: Fe and impurities.

$$Q=[Si]+2[Al]-[Mn] \quad \text{(Formula 1)}$$

Examples of impurities include those contained in raw materials such as ore and scrap, and those contained in manufacturing steps.

(C: 0.0030% or less)

C increases iron loss and causes magnetic aging. Therefore, the lower the C content, the better. Such a phenomenon is remarkable when the C content is more than 0.0030%. For this reason, the C content is set to 0.0030% or less. Reducing the C content also contributes to a uniform improvement in magnetic characteristics in all directions in a sheet surface.

The upper limit of the C content is more preferably 0.0020. The lower limit of the C content is preferably as low as possible, but is not particularly limited, and is preferably 0.0005 or more in consideration of the cost of removing C from steel.

(Si: 2.00% to 4.00%)

Si reduces the iron loss by increasing electric resistance and reduces eddy-current loss, and improves punching workability into the core by increasing a yield ratio.

When the Si content is less than 2.00%, these action effects cannot be sufficiently obtained. Therefore, the Si content is set to 2.00% or more. On the other hand, when the Si content is more than 4.00%, a magnetic flux density decreases, the punching workability decreases due to an excessive increase in hardness, and cold rolling becomes difficult. Therefore, the Si content is set to 4.00% or less.

The lower limit of the Si content is preferably 2.30%, and more preferably 2.50%. The upper limit of the Si content is preferably 3.70%, and more preferably 3.50%.

(Al: 0.01% to 3.00%)

Al reduces the iron loss by increasing the electric resistance and reducing the eddy-current loss.

Al also contributes to an improvement in the relative magnitude of a magnetic flux density B50 with respect to a saturation magnetic flux density. Here, the magnetic flux density B50 is a magnetic flux density in a magnetic field of 5000 A/m. When the Al content is less than 0.01%, these action effects cannot be sufficiently obtained. Therefore, the Al content is set to 0.01% or more. On the other hand, when the Al content is more than 3.00%, the magnetic flux density decreases, the yield ratio decreases, and the punching workability decreases. Therefore, the Al content is set to 3.00% or less.

The lower limit of the Al content is preferably 0.10%, and more preferably 0.20%. The upper limit of the Al content is preferably 2.50%, and more preferably 2.00%.

(Mn: 0.10% to 2.00%)

Mn reduces the iron loss by increasing the electric resistance and reducing the eddy-current loss. When Mn is contained, in a texture obtained by primary recrystallization, a plane parallel to the sheet surface tends to be a plane on which crystals of a {100} plane (hereinafter, sometimes referred to as "{100} crystal") are developed. The {100} crystal is a crystal suitable for a uniform improvement in the magnetic characteristics in all directions in the sheet surface.

Furthermore, the larger the Mn content, the higher the MnS precipitation temperature and the larger the MnS precipitated. For this reason, as the Mn content increases, fine MnS having a particle size of about 100 nm, which inhibit recrystallization and grain growth in final annealing, are less likely to precipitate.

When the Mn content is less than 0.10%, these action effects cannot be sufficiently obtained. Therefore, the Mn content is set to 0.10% or more. On the other hand, when the Mn content is more than 2.00%, the grains do not grow sufficiently in the final annealing, and the iron loss increases. Therefore, the Mn content is set to 2.00% or less.

The lower limit of the Mn content is preferably 0.15%, and more preferably 0.20%. The upper limit of the Mn content is preferably 1.50%, and more preferably 1.00%.

(P: 0.005% to 0.200%)

P has an effect of improving the strength of the non-oriented electrical steel sheet. When the P content is less than 0.005%, the effect of increasing the strength cannot be obtained. When the P content is more than 0.200%, workability decreases, so that the P content is set to 0.005% to 0.200%.

The lower limit of the P content is preferably 0.008%, and more preferably 0.010%. The upper limit of the P content is preferably 0.180%, and more preferably 0.150%.

(S: 0.0030% or less)

S is not an essential element and is contained, for example, as an impurity in steel.

S inhibits recrystallization and grain growth in the final annealing due to precipitation of fine MnS. Therefore, the lower the S content, the better. An increase in iron loss and a decrease in magnetic flux density due to such inhibition of recrystallization and grain growth are remarkable when the S content is more than 0.0030%. Therefore, the S content is set to 0.0030% or less.

The upper limit of the S content is preferably 0.0025%, and more preferably 0.0020%. Since the lower limit of the S content is preferably as low as possible, there is no particular limitation. However, since the cost of removing S from steel is unnecessarily high, 0.0005 or more is desirable.

(Cu: more than 1.0% and 3.0% or less)

Cu is an essential element for obtaining a non-oriented electrical steel sheet having high strength.

When the Cu content is less than 1.0%, the strength becomes insufficient. On the other hand, when the Cu content is more than 3.0%, toughness significantly decreases, and fracture easily occurs. Therefore, the Cu content is set to be more than 1.0% and 3.0% or less.

The lower limit of the Cu content is preferably 1.2%, and more preferably 1.5%. The upper limit of the Cu content is preferably 2.5%, and more preferably 2.0%.

(Ni: 0.10% to 3.0%)

Ni is an element necessary for improving elongation.

Although details will be described later, in particular, in a case where a {100} crystal orientation intensity is 2.4 or more, Cu is contained in more than 1.0% and 3.0% or less, and one or more selected from the group consisting of Mg, Ca, Sr, Ba, Ce, La, Nd, Pr, Zn, and Cd are contained in more than 0.0005% and 0.0100% or less, the effect of improving the elongation is exhibited by adding Ni in a range of 0.10% to 3.0%.

When Ni is contained in less than 0.10%, the effect cannot be obtained. On the other hand, when the Ni content is more than 3.0%, conversely the elongation decreases. For this reason, the Ni content is set to 0.10% to 3.0%.

The lower limit of the Ni content is preferably 0.15%, and more preferably 0.20%. The upper limit of the Ni content is preferably 2.5%, and more preferably 2.2%.

(One or more selected from the group consisting of Mg, Ca, Sr, Ba, Ce, La, Nd, Pr, Zn, and Cd: more than 0.0005% and 0.0100% or less in total)

Mg, Ca, Sr, Ba, Ce, La, Nd, Pr, Zn, and Cd react with S in the molten steel during casting of the molten steel or rapid solidification to form precipitates of sulfides, oxysulfides, or both thereof.

Hereinafter, Mg, Ca, Sr, Ba, Ce, La, Nd, Pr, Zn and Cd may be collectively referred to as a "coarse precipitate forming element".

The particle size of the precipitates containing the coarse precipitate forming element is about 1 μm to 2 μm, which is much larger than the particle size of fine precipitates such as MnS, TiN, and AlN (about 100 nm). For this reason, these fine precipitates formed at the grain boundaries adhere to the precipitates of the coarse precipitate forming element, and are less likely to inhibit recrystallization and grains growth during final annealing.

When the total amount of the coarse precipitate forming element is 0.0005% or less, these effects cannot be sufficiently obtained. Therefore, the total amount of the coarse precipitate forming element is set to more than 0.0005%. On the other hand, when the total amount of the coarse precipitate forming element is more than 0.0100%, the total amount of sulfides or oxysulfides or both thereof becomes excessive, and recrystallization and grain growth in final annealing are inhibited. Therefore, the total amount of the coarse precipitate forming element is set to 0.0100% or less.

The lower limit of the amount of the coarse precipitate forming element is preferably 0.0010%, and more preferably 0.0020%. The upper limit of the amount of the coarse precipitate forming element is preferably 0.0090%, and more preferably 0.0080%.

(Parameter Q: 2.00 or more)

In order to suppress the occurrence of ferrite-austenite transformation ($\alpha$-$\gamma$ transformation), the value of a parameter Q is set to 2.00 or more.

When the parameter Q represented by Formula 1 is less than 2.00, ferrite-austenite transformation ($\alpha$-$\gamma$ transformation) may occur. Therefore, during casting of molten steel or rapid solidification, the columnar crystals once formed are fractured by $\alpha$-$\gamma$ transformation, or the average grain size decreases. Furthermore, $\alpha$-$\gamma$ transformation may occur during final annealing. Therefore, when the parameter Q is less than 2.00, the desired magnetic characteristics cannot be obtained.

When the parameter Q is 2.00 or more, $\alpha$-$\gamma$ transformation does not occur. Therefore, the upper limit thereof is not particularly defined, but naturally becomes 10 or less from the specified ranges of Si, Al, and Mn.

The lower limit of the parameter Q is preferably 2.50.

Sn and Cr are not essential elements, but are optional elements that may be appropriately contained in the non-oriented electrical steel sheet up to a predetermined amount.

(Sn: 0.00% to 0.40%)

Sn develops a crystal suitable for improving the magnetic characteristics by primary recrystallization. Therefore, when Sn is contained, a texture in which a {100} crystal suitable for a uniform improvement in the magnetic characteristics in all directions in the sheet surface is developed is easily obtained by primary recrystallization. Sn suppresses oxidation and nitriding of the surface of the steel sheet during final annealing, and suppresses variation in the size of grains. Therefore, Sn may be contained.

In order to sufficiently obtain these action effects, the amount of Sn is preferably set to 0.02% or more. On the other hand, when the amount of Sn is more than 0.40%, the above-mentioned action effects are saturated and the cost is unnecessarily increased, or the grain growth in the final annealing is suppressed. Therefore, the Sn content is set to 0.40% or less.

The lower limit of the Sn content is more preferably 0.05%. The upper limit of the Sn content is preferably 0.30%, and more preferably 0.20%.

(Cr: 0.0% to 10.0%)

Cr reduces high-frequency iron loss. A reduction in the high-frequency iron loss contributes to high-speed rotation of rotating machines, and high-speed rotation contributes to a reduction in size and an increase in efficiency of the rotating machines. Cr reduces the iron loss such as high-frequency iron loss by increasing the electric resistance and reducing the eddy-current loss. Cr reduces stress sensitivity and thus contributes to a reduction in the reduction in the magnetic characteristics due to compressive stress introduced when a core is formed and the reduction in the magnetic characteristics due to compressive stress acting during high-speed rotation. Therefore, Cr may be contained.

In order to obtain these action effects sufficiently, the amount of Cr is preferably set to 0.2% or more. On the other hand, when the Cr content is more than 10.0%, the magnetic flux density decreases and the cost increases. Therefore, the Cr content is set to 10.0% or less.

The lower limit of the Cr content is more preferably 0.4%. The upper limit of the Cr content is preferably 5.0%, and more preferably 3.0%.

The impurities contained in the remainder indicate those that are incorporated from ore or scrap as a raw material or from a manufacturing environment when steel is industrially manufactured. These impurities are preferably restricted in order to sufficiently exhibit the effects of the present embodiment. In addition, since the amount of the impurities is preferably small, it is not necessary to limit the lower limit, and the lower limit of the impurities may be 0%.

The above-mentioned steel composition may be measured by a general steel analysis method. For example, the steel composition may be measured by the method described in JIS G 1211-1258.

Next, the texture of the non-oriented electrical steel sheet according to the embodiment of the present invention will be described.

In the non-oriented electrical steel sheet according to the present embodiment, the {100} crystal orientation intensity is 2.4 or more. When the {100} crystal orientation intensity is less than 2.4, a decrease in magnetic flux density and an increase in iron loss may occur, or variations in magnetic characteristics between directions parallel to the sheet surface may occur.

The higher the {100} intensity, the better. Therefore, the upper limit is not particularly defined.

The {100} crystal orientation intensity can be measured by an X-ray diffraction method or an electron backscatter diffraction (EBSD) method. Since the reflection angles and the like of the X-ray and the electron beam from the sample are different for each crystal orientation, the crystal orientation intensity can be obtained from the reflection intensity and the like based on the random orientation sample.

Specifically, the {100} crystal orientation intensity can be obtained by the {100} crystal orientation reflection intensity (i(100)) of a target sample to the {100} crystal orientation reflection intensity (I(100)) of a random orientation sample, that is, i(100)/I(100).

Next, particles of simple Cu in the non-oriented electrical steel sheet according to the embodiment of the present invention will be described. In the non-oriented electrical steel sheet according to the present embodiment, the number of particles of simple Cu having a diameter (particle size) of less than 100 nm is 5 or more per 10 $\mu m^2$.

Here, among the particles of simple Cu, particles having a particle size of less than 100 nm can increase mechanical strength and have an action of not deteriorating the magnetic characteristics. On the other hand, among the particles of simple Cu, particles having a particle size of 100 nm or more have an effect of increasing the mechanical strength but deteriorating the magnetic characteristics.

When the number of particles of simple Cu having a diameter of less than 100 nm acting as described above is less than 5 per 10 $\mu m^2$, the mechanical strength is insufficiently improved or the deterioration of the magnetic characteristics is incurred. Therefore, the number of particles of simple Cu having a diameter of less than 100 nm is set to 5 or more per 10 $\mu m^2$. Since the larger the number of particles of simple Cu having a diameter of less than 100 nm, the more the strength can be improved without adversely affecting the iron loss, the upper limit thereof is not particularly specified.

It is more preferable that the number of particles of simple Cu having a diameter of less than 100 nm is 100 or more per 10 $\mu m^2$.

Particles smaller than 100 nm can be observed, for example, with a transmission electron microscope (TEM). With a scanning electron microscope (SEM), it is difficult to observe the particles smaller than 100 nm depending on the model. For sample adjustment at the time of TEM observation, for example, a method of thinning an observation point or a replica method of transferring a precipitate to an organic film is used. Since it is difficult to observe the particles of simple Cu by the replica method, a thinning sample adjustment method is preferably used.

Specifically, the diameter of the particles of simple Cu according to the present embodiment is obtained by observing a range of 10 $\mu m^2$ or more by TEM, counting the number in the observation range, and performing averaging with the measurement area. The observation range by TEM is more preferably 20 $\mu m^2$ or more, and even more preferably 30 $\mu m^2$ or more. The composition of the particles is identified by a representative in a TEM diffraction pattern.

Next, the average grain size of the non-oriented electrical steel sheet according to the embodiment of the present invention will be described.

The average grain size of the non-oriented electrical steel sheet according to the present embodiment is 70 $\mu m$ to 200 $\mu m$. When the average grain size is less than 70 $\mu m$, the iron loss W10/400 is high. Here, the iron loss W10/400 is an iron loss at a magnetic flux density of 1.0 T and a frequency of 400 Hz. On the other hand, when the average grain size is larger than 200 $\mu m$, the iron loss W10/400 is deteriorated and cracks are induced during work.

In the present embodiment, the grain size means an equivalent circle diameter of the grain.

The average grain size means the grain size per grain. For example, EBSD measurement is performed, a range of 5 $mm^2$ is observed, and the average grain size in the observed visual field can be obtained by a program (for example, OIM Analysis).

Next, the thickness of the non-oriented electrical steel sheet according to the embodiment of the present invention will be described.

The thickness of the non-oriented electrical steel sheet according to the present embodiment is, for example, 0.10 mm or more and 0.60 mm or less. When the thickness of the non-oriented electrical steel sheet is more than 0.60 mm, excellent high-frequency iron loss cannot be obtained. Therefore, the thickness of the non-oriented electrical steel sheet is set to 0.60 mm or less.

When the thickness of the non-oriented electrical steel sheet is less than 0.10 mm, the magnetic characteristics on the surface of the non-oriented electrical steel sheet having low stability become more dominant than the magnetic characteristics on the inside having high stability. When the thickness of the non-oriented electrical steel sheet is less than 0.10 mm, it becomes difficult to pass sheets through an annealing line of final annealing or the number of non-oriented electrical steel sheets required for a core of a certain size increases, which leads to a reduction in productivity and an increase in manufacturing cost due to an increase in the number of steps. Therefore, the thickness of the non-oriented electrical steel sheet is set to 0.10 mm or more.

The lower limit of the thickness of the non-oriented electrical steel sheet is more preferably 0.20 mm. The upper limit of the thickness of the non-oriented electrical steel sheet is more preferably 0.50 mm.

Next, the magnetic characteristics and mechanical properties of the non-oriented electrical steel sheet according to the embodiment of the present invention will be described.

The non-oriented electrical steel sheet according to the present embodiment can exhibit magnetic characteristics represented by a magnetic flux density B50 in a ring magnetism measurement of 1.63 T or more, and an iron loss W10/400 of $11\times[0.45+0.55\times\{0.5\times(t/0.20)+0.5\times(t/0.20)^2\}]$ W/kg or less when the thickness of the non-oriented electrical steel sheet is t (mm).

In the ring magnetism measurement, a ring-shaped sample collected from the non-oriented electrical steel sheet, for example, a ring-shaped sample having an outer diameter of 5 inches (12.70 cm) and an inner diameter of 4 inches (10.16 cm) is excited to cause a magnetic flux to flow over the whole circumference of the sample. The magnetic characteristics obtained by the ring magnetism measurement reflect the structure in all directions in the sheet surface.

In addition, the non-oriented electrical steel sheet according to the present embodiment can obtain mechanical properties having a strength (tensile strength TS) of 590 MPa or more and a total elongation (EL) of 10% or more.

Here, the mechanical properties can be tested by the method described in JIS Z 2241. A test piece to be used is a JIS No. 5 test piece described in JIS Z 2201 in which a parallel portion of the test piece is aligned with a rolling direction of a steel sheet. Hereinafter, the tensile strength at the time of a tensile test may be described as TS, and the total elongation may be described as EL.

Subsequently, the relationship between the chemical composition of the non-oriented electrical steel sheet according to the present embodiment, and the magnetic characteristics and mechanical properties will be described. As described above, the non-oriented electrical steel sheet according to the present embodiment needs to have a {100} crystal orientation intensity of 2.4 or more and to achieve both strength and elongation in order to obtain good magnetic characteristics. The higher the {100} crystal orientation intensity is, the more desirable it is. Therefore, no particular upper limit is specified.

In order to obtain a high-strength non-oriented electrical steel sheet, the Cu content needs to be more than 1.0%. In addition, in order to reduce the iron loss, it is necessary to include conditions under which grains are likely to grow, that is, contain more than 0.0005% and 0.0100% or less of the coarse precipitate forming element.

As shown in FIG. 1, under the condition that the {100} crystal orientation intensity is 2.9, when a case where 0.004% of Mg, which is the above-mentioned coarse precipitate forming element, is contained (data of "◆" in the graph of FIG. 1) is compared to a case where Mg is not contained (data of "◇" in the graph of FIG. 1), it can be seen that EL decreases in a case where Mg which is the coarse precipitate forming element is contained when the Ni content is small.

Figure 2:
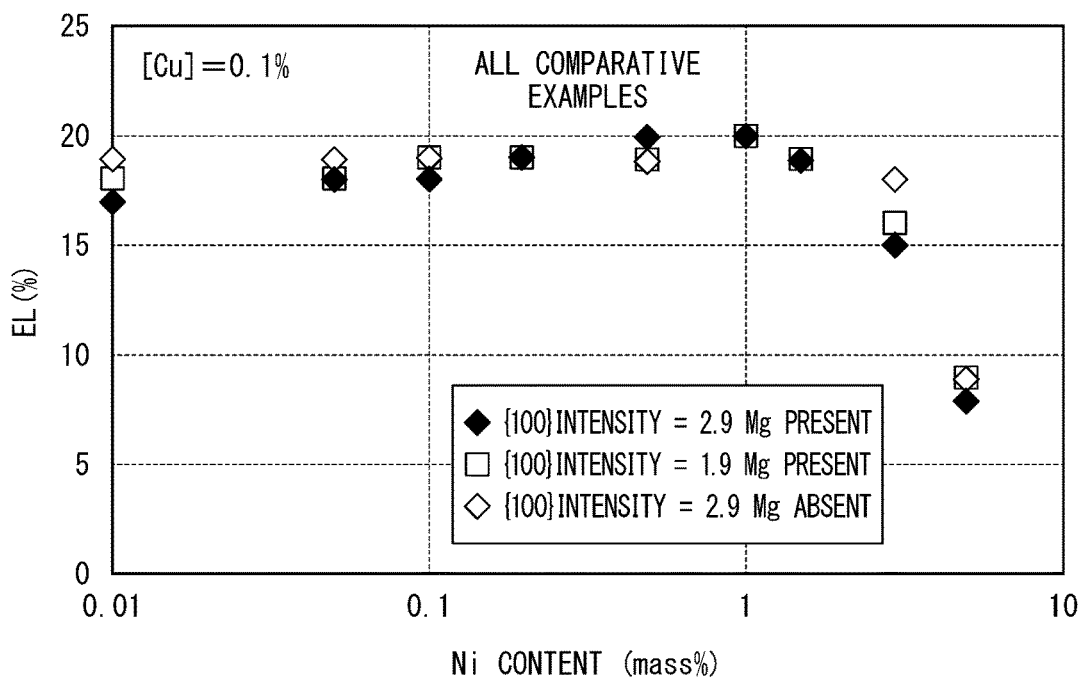
FIG. 2 is a diagram showing a relationship between a Ni content and an EL in a case where a Cu content is 0.1%.

On the other hand, as shown in FIG. 2, in a case where the Cu content is small, such a tendency is not observed. That is, even in a case where the Ni content is changed, the presence or absence of Mg, which is the coarse precipitate forming element, and the {100} crystal orientation intensity do not affect EL.

From the above results, it can be seen that in a case where the Cu content is more than 1.0%, the relationship between the Cu content and the Ni content changes when a coarse precipitate forming element is contained.

As described above, in order to achieve both strength and elongation and obtain good magnetic characteristics, as can be seen from FIG. 1, it is important to satisfy all the conditions including more than 0.0005% and 0.0100% or less of the coarse precipitate forming element, more than 1.0% and 3.0% or less of Cu, 0.10% to 3.0% of Ni, and a {100} crystal orientation intensity of 2.4 or more.

A method of manufacturing the non-oriented electrical steel sheet according to the above-described embodiment is not particularly limited, but the following (1) high-temperature hot-band annealing+cold rolling large reduction method, (2) thin slab continuous casting method, (3) lubrication hot rolling method, and (4) strip casting method can be adopted.

In any of the methods, the chemical composition of a starting material such as a slab is the chemical composition described in the above item. Hereinafter, an embodiment of the method of manufacturing the non-oriented electrical steel sheet will be described.

(1) High-Temperature Hot-Band Annealing+Cold Rolling Large Reduction Method

First, a slab is manufactured in a steelmaking step. After the slab is heated in a reheating furnace, rough rolling and finish rolling are continuously performed in a hot rolling step to obtain a hot-rolled coil. The hot rolling conditions are not particularly limited.

A general manufacturing method, that is, a manufacturing method in which a slab heated to 1000° C. to 1200° C. is subjected to finishing hot rolling completed at 700° C. to 900° C., and is then wound at 500° C. to 700° C.

Next, hot-band annealing is performed on the steel sheet of the hot-rolled coil. By the hot-band annealing, grains are recrystallized and coarsely grow to a grain size of 300 to 500 μm.

The hot-band annealing may be continuous annealing or batch annealing. From the viewpoint of cost, the hot-band annealing is preferably performed by continuous annealing. In order to perform the continuous annealing, it is necessary to grow grains within a short period of time at a high temperature. By adjusting the amount of Si or the like so as to cause the value of the parameter Q described above to become 2.00 or more, a composition with which ferrite-austenite transformation does not occur at a high temperature can be obtained.

Next, pickling is performed on the steel sheet before cold rolling.

The pickling is a necessary step to remove the scale on the surface of the steel sheet. Pickling conditions are selected according to the scale removal situation. The scale may be removed with a grinder instead of the pickling. Furthermore, washing with water may be performed.

Next, cold rolling is performed on the steel sheet.

Here, in a high-grade non-oriented electrical steel sheet having a large Si content, when the grain size is too large, the steel sheet becomes embrittled, and there is concern of brittle fracture in cold rolling. Therefore, the average grain size of the steel sheet before the cold rolling is usually limited to 200 μm or less. On the other hand, in the present manufacturing method, the average grain size before the cold rolling is set to 300 to 500 μm, and the subsequent cold rolling is performed at a rolling reduction of 90% to 97%. The rolling reduction (%) can be calculated as "rolling reduction=(1−(sheet thickness after cold rolling)/(sheet thickness before cold rolling))×100".

Instead of the cold rolling, warm rolling may be performed at a temperature equal to or higher than the ductile-brittle transition temperature of the material from the viewpoint of avoiding brittle fracture.

Thereafter, when final annealing is performed, ND// <100> recrystallized grains grow. Accordingly, the {100} plane intensity increases, and the probability of the presence of {100} oriented grains increases.

Next, final annealing is performed on the steel sheet.

The conditions of the final annealing need to be determined in order to obtain a grain size with which desired magnetic characteristics are obtained, but may be within the range of the final annealing conditions for ordinary non-oriented electrical steel sheets.

The final annealing may be continuous annealing or batch annealing. From the viewpoint of cost, the final annealing is preferably performed by continuous annealing.

In the present manufacturing method, primary recrystallization and grain growth are caused by the final annealing, so that the average grain size can be 70 µm to 200 µm. By this final annealing, a texture in which a {100} crystal suitable for a uniform improvement in the magnetic characteristics in all directions in the sheet surface are obtained. In the final annealing, for example, it is preferable that a retention temperature is set to 900° C. or higher and 1000° C. or lower, and a retention time is set to 10 seconds or longer and 60 seconds or shorter.

In the present manufacturing method, as a Cu precipitation treatment, annealing at 500° C. to 700° C. may be further performed. In this annealing, a precipitation amount and the diameter of precipitates can be changed by changing an annealing temperature and an annealing time.

Through the above steps, the non-oriented electrical steel sheet according to the embodiment of the present invention described above is obtained.

(2) Thin Slab Continuous Casting Method

In the thin slab continuous casting method, a slab having a thickness of 30 to 60 mm is manufactured in a steelmaking step, and rough rolling in the hot rolling step is omitted. It is desirable that columnar crystals are sufficiently developed with the thin slab and the {100}<011> orientation obtained by processing the columnar crystals by hot rolling is left in the hot-rolled sheet.

In this process, the columnar crystals grow such that the {100} plane is parallel to the steel sheet surface. For this purpose, it is desirable not to perform electromagnetic stirring in the continuous casting. In addition, it is desirable to reduce fine inclusions in the molten steel that promote the solidification nucleation as much as possible.

Then, the thin slab is heated in a reheating furnace, and thereafter finish-rolled continuously in a hot rolling step to obtain a hot-rolled coil.

Thereafter, the steel sheet of the hot-rolled coil is subjected to hot-band annealing, pickling, cold rolling, final annealing, and the like in the same manner as in "(1) High-temperature hot-band annealing+cold rolling large reduction method". However, cold rolling may be performed at a rolling reduction of 80% to 97%.

Through the above steps, the non-oriented electrical steel sheet according to the embodiment of the present invention described above is obtained.

(3) Lubrication Hot Rolling Method

First, a slab is manufactured in a steelmaking step. After the slab is heated in a reheating furnace, rough rolling and finish rolling are continuously performed in a hot rolling step to obtain a hot-rolled coil.

Normally, hot rolling is performed without lubrication, but in the method according to the present embodiment, hot rolling is performed under appropriate lubrication conditions. When hot rolling is performed under appropriate lubrication conditions, shear deformation introduced to the vicinity of the surface layer of the steel sheet is reduced. As a result, a worked structure having an RD//<011> orientation called α fiber which usually develops at the center of the steel sheet can be developed to the vicinity of the surface layer of the steel sheet.

For example, as described in Japanese Unexamined Patent Application, First Publication No. H10-036912, α fiber can be developed by mixing 0.5% to 20% of oil in hot rolling roll cooling water as a lubricant during hot rolling, and causing the average friction coefficient between a finishing hot rolling roll and the steel sheet to be 0.25 or less. The temperature conditions of the hot rolling may not be particularly specified, and may be the same temperature as in the above-described "(1) High-temperature hot-band annealing+cold rolling large reduction method".

Thereafter, the steel sheet of the hot-rolled coil is subjected to hot-band annealing, pickling, cold rolling, final annealing, and the like in the same manner as in "(2) Thin slab continuous casting method". According to the method described above, when the α fiber is developed to the vicinity of the surface layer of the steel sheet of the hot-rolled coil, {h11}<l/h 1 2> oriented grains, particularly {100}<012> to {411}<148> oriented grains are recrystallized in the subsequent hot-band annealing. When the steel sheet is pickled and thereafter subjected to cold rolling and final annealing, the {100}<012> to {411}<148> oriented grains are recrystallized. Accordingly, the {100} plane intensity increases, and the probability of the presence of {100} oriented grains increases.

Through the above steps, the non-oriented electrical steel sheet according to the embodiment of the present invention described above is obtained.

(4) Strip Casting Method

First, in a steelmaking step, a hot-rolled coil having a thickness of 1 to 3.5 mm is manufactured by strip casting.

In the strip casting, a steel sheet having a thickness equivalent to a directly hot-rolled coil can be obtained by rapidly cooling molten steel between a pair of water-cooled rolls. At this time, by sufficiently increasing the temperature difference between the outermost surface of the steel sheet in contact with the water-cooled rolls and the molten steel, grains solidified on the surface grow in the direction perpendicular to the steel sheet to form columnar crystals.

By the strip casting as described above, the molten steel having the above chemical composition can be rapidly solidified on the surface of the cooling body that moves and renews. Accordingly, a steel strip having a proportion of columnar crystals of 80% or more in terms of area fraction and an average grain size of 0.1 mm or more can be obtained.

When the proportion of columnar crystals is 80% or more, a texture in which a {100} crystal is developed by the final annealing can be obtained. In the present manufacturing method, in order to cause the proportion of columnar crystals to be 80% or more, for example, a condition that the temperature of the molten steel injected into the surface of the cooling body that moves and renews is raised by 25° C. or more from the solidification temperature may be adopted. In particular, in a case where the temperature of the molten steel injected into the surface of the cooling body that moves and renews is raised by 40° C. or more from the solidification temperature, the proportion of columnar crystals can be made almost 100%, which is more preferable.

In a case where molten steel is solidified under the condition that the proportion of such columnar crystals is 80% or more, sulfides or oxysulfides of Mg, Ca, Sr, Ba, Ce, La, Nd, Pr, Zn, or Cd, or both thereof are easily formed and the formation of fine sulfides such as MnS is suppressed, which is more preferable.

In a steel having a BCC structure, columnar crystals grow such that the {100} plane is parallel to the steel sheet surface. As the proportion of columnar crystals increases, the {100} plane intensity increases, and the probability of the presence of {100} oriented grains increases. In order to increase the {100} plane intensity, it is important for the {100} plane not to be changed as much as possible by transformation, working, or recrystallization. Specifically, by including Si, which is a ferrite promoting element, and by limiting the amount of Mn, which is an austenite promoting element, it is important to form a ferrite single phase from immediately after solidification to room temperature without forming an austenite phase at a high temperature.

Even though austenite-ferrite transformation occurs, the {100} plane is partially maintained. However, by adjusting the amount of Si or the like so as to cause the value of the parameter Q to become 2.00 or more, a composition with which ferrite-austenite transformation does not occur at a high temperature can be obtained.

The smaller the average grain size of the steel strip, the larger the number of grains and the larger the area of the grain boundaries. In the recrystallization of the final annealing, crystals grow from the inside of the grains and from the grain boundaries.

Crystals that grow from the inside of the grains are {100} crystals that are desirable for magnetic characteristics, whereas crystals that grow from the grain boundaries are crystals that are not desirable for magnetic characteristics, such as {111}<112> crystals. Therefore, the larger the average grain size of the steel strip, the more easily the {100} crystals desirable for the magnetic characteristics develop in the final annealing. Particularly, in a case where the average grain size of the steel strip is 0.1 mm or more, excellent magnetic characteristics are easily obtained. Therefore, it is preferable that the average grain size of the steel strip is 0.1 mm or more.

Next, the steel sheet of the hot-rolled coil obtained by the strip casting is hot-rolled, and thereafter, the obtained hot-rolled sheet is annealed (hot-band annealing). A subsequent step may be directly performed without performing the hot rolling. A subsequent step may also be directly performed without performing the hot-band annealing.

Here, in a case where a strain of 30% or more is introduced into the steel sheet by the hot rolling, when the hot-band annealing is performed at a temperature of 550° C. or higher, recrystallization occurs from the strain-introduced portion and the crystal orientation may change. Therefore, in a case where a strain of 30% or more is introduced by the hot rolling, hot-band annealing is not performed or performed at a temperature at which recrystallization does not occur.

Next, the steel sheet is subjected to pickling and the like and thereafter subjected to cold rolling.

Cold rolling is an essential step for obtaining a desired product thickness in the present manufacturing method. However, when the rolling reduction of the cold rolling is excessive, a desirable crystal orientation in a product cannot be obtained. Therefore, the rolling reduction of the cold rolling is set to preferably 90% or less, more preferably 85% or less, and even more preferably 80% or less. There is no need to particularly provide the lower limit of the rolling reduction of the cold rolling, but the lower limit of the rolling reduction is determined from the sheet thickness of the steel sheet before the cold rolling and the desired product thickness.

In addition, in the present manufacturing method, when the rolling reduction of the cold rolling is set to less than 40%, it may be difficult to secure the accuracy of the thickness and the flatness of the non-oriented electrical steel sheet. Therefore, the rolling reduction of the cold rolling is preferably set to 40% or more.

Even in a case where the surface properties and flatness required for a laminated steel sheet are not obtained, cold rolling is necessary. Therefore, cold rolling may be performed with a minimum rolling reduction for the purpose. The cold rolling may be performed by a reversing mill or a tandem mill.

Instead of the cold rolling, warm rolling may be performed at a temperature equal to or higher than the ductile-brittle transition temperature of the material from the viewpoint of avoiding brittle fracture.

In addition, instead of the above-mentioned strip casting, by performing casting and hot rolling of molten steel, a steel strip in which the proportion of columnar crystals in a hot-rolled crystal structure is 80% or more in terms of area fraction and the average grain size is 0.1 mm or more may be obtained, and this may be subjected to the same cold rolling, final annealing, and the like as in the above-described strip casting.

In order to cause the proportion of columnar crystals to be 80% or more, for example, it is preferable that the temperature difference between one surface and the other surface of a cast piece during solidification is 40° C. or higher. This temperature difference can be controlled by the cooling structure, material, mold taper, mold flux, and the like of the mold.

In the present manufacturing method, pickling, final annealing, and the like may be performed in the same manner as in "(1) High-temperature hot-band annealing+ cold rolling large reduction method".

Through the above steps, the non-oriented electrical steel sheet according to the embodiment of the present invention described above is obtained.

In the non-oriented electrical steel sheet according to the above-described embodiment, the columnar crystals have a {100}<0vw> texture desirable for a uniform improvement in the magnetic characteristics of the non-oriented electrical steel sheet, particularly the magnetic characteristics in all directions in the sheet surface.

The {100}<0vw> texture means a texture in which crystals having a plane parallel to the sheet surface being a {100} plane and a rolling direction being a <0vw> orientation are developed (v and w are real numbers (excluding a case where both v and w are 0)).

When the proportion of columnar crystals is 80% or more, a texture in which a {100} crystal is developed by final annealing can be obtained, which is preferable. The proportion of columnar crystals can be specified by microscopic observation.

In a case where molten steel is cast under the condition that the proportion of such columnar crystals is 80% or more, sulfides or oxysulfides of Mg, Ca, Sr, Ba, Ce, La, Nd, Pr, Zn, or Cd, or both thereof are easily formed and the formation of fine sulfides such as MnS is suppressed, which is more preferable.

The proportion of columnar crystals can be measured, for example, by the following procedure.

First, the cross section of a steel strip is polished, and the cross section is etched with a picric acid-based corrosive solution to reveal a solidification structure. Here, the cross section of the steel strip may be an L-section parallel to the longitudinal direction of the steel strip or a C-section perpendicular to the longitudinal direction of the steel strip, but the L-section is generally used.

In this cross section, in a case where dendrites develop in the sheet thickness direction and penetrate the overall sheet thickness, it is determined that the proportion of columnar crystals is 100%. In a case where a granular black structure (equiaxial grain) other than the dendrites can be seen in this cross section, a value obtained by dividing a value obtained by subtracting the thickness of this granular structure from the overall thickness of the steel sheet by the overall thickness of the steel sheet is used as the proportion of columnar crystals of the steel sheet.

Furthermore, the non-oriented electrical steel sheet according to the above-described embodiment may be manufactured, for example, by a method of manufacturing a non-oriented electrical steel sheet including: a step of manufacturing a slab; a step of performing rough rolling on the slab; a step of obtaining a hot-rolled coil by performing finish rolling on the steel sheet subjected to the rough rolling; a step of performing hot-band annealing on the hot-rolled coil; a step of performing cold rolling or warm rolling on the steel sheet subjected to the hot-band annealing; and a step of performing final annealing on the steel sheet subjected to the cold rolling or warm rolling.

In the step of obtaining the hot-rolled coil, rough rolling may be omitted, or the hot-rolled coil may be obtained by strip casting. Lubrication hot rolling using the above lubricant may be performed on the hot-rolled coil. Furthermore, the manufacturing method may further include a step of removing scale of the hot-rolled and annealed steel sheet.

In each of the above-described manufacturing methods, it is preferable that the coarse precipitate forming element is put into the bottom of the final ladle before casting in the steelmaking step and molten steel containing an element other than the coarse precipitate forming element is poured into the ladle to dissolve the coarse precipitate forming element in the molten steel. Accordingly, it is possible to make it difficult for the coarse precipitate forming element to be scattered from the molten steel, and to promote the reaction between the coarse precipitate forming element and S.

The final ladle before casting in the steelmaking step is, for example, a ladle directly above a tundish of a continuous casting machine.

EXAMPLES

Next, the non-oriented electrical steel sheet according to the embodiment of the present invention will be specifically described with reference to examples. The examples shown below are merely examples of the non-oriented electrical steel sheet according to the embodiment of the present invention, and the non-oriented electrical steel sheet according to the present invention is not limited to the following examples.

(First Test)

In a first test, a non-oriented electrical steel sheet was produced by the following method.

A 250 mm thick slab having the chemical composition shown in Table 1 was prepared. Next, the slab was subjected to hot rolling to produce hot-rolled sheets having a thickness of 6.5 mm and a thickness of 2.0 mm, respectively.

A slab reheating temperature was 1200° C., a finishing temperature was 850° C., and a winding temperature was 650° C.

After annealing the obtained hot-rolled sheets at 1050° C. for 30 minutes, scale on the surface layer was removed by pickling Thereafter, the above hot-rolled sheets were cold-rolled to have thicknesses of 0.65 mm and 0.20 mm, respectively. A rolling reduction in the cold rolling was set to 90% in any of the hot-rolled sheets. In final annealing, the steel strip was heated at a temperature rising rate of 20° C./sec, and after 1000° C. was reached, soaked for 15 seconds and air-cooled.

In Tables 1 to 20, "---" indicates that the amount of the corresponding element is below the detection limit, and the remainder is Fe and impurities.

Furthermore, as a Cu precipitation treatment, the steel sheet was heated to 600° C., soaked for 1 minute, and then air-cooled. In Sample No. 12, the Cu precipitation treatment was omitted. For each of the non-oriented electrical steel sheets, the number of particles of simple Cu having a diameter of less than 100 nm per 10 $\mu m^2$, the {100} crystal orientation intensity I, and the average grain size r were measured. The results are shown in Table 2.

For each of the samples, the magnetic characteristics and mechanical properties of each of the non-oriented electrical steel sheets were measured. For this measurement, a ring test piece having an outer diameter of 5 inches and an inner diameter of 4 inches was used. That is, a ring magnetism measurement was measured. The results are shown in Table 2.

An iron loss W10/400 equal to or less than an evaluation criterion W0 (W/kg) represented by Formula 2 indicates an excellent value. That is, in a case where the thickness was 0.20 mm, an iron loss of 11.0 (W/kg) or less was evaluated as excellent, and in a case where the thickness was 0.65 mm, an iron loss of 46.7 (W/kg) or less was evaluated as excellent. A magnetic flux density B50 of 1.63 T or more was evaluated as excellent.

$$W0=11\times[0.45+0.55\times\{0.5\times(t/0.20)+0.5\times(t/0.20)^2\}] \quad \text{(Formula 2)}$$

Regarding the mechanical properties, since a non-oriented electrical steel sheet used in an HEV motor needs to be able to withstand an ultra-high-speed rotation of nearly 10,000 rpm, TS≥590 MPa and EL≥10% were taken as good criteria.

TABLE 1

| No. | C mass % | Si mass % | Mn mass % | Al mass % | P mass % | S mass % | Cu mass % | Ni mass % | Mg mass % | Ca mass % |
|---|---|---|---|---|---|---|---|---|---|---|
| 1 | 0.0021 | 2.95 | 0.24 | 0.32 | 0.011 | 0.0014 | 1.4 | 0.11 | 0.0040 | — |
| 2 | 0.0020 | 2.94 | 0.20 | 0.28 | 0.012 | 0.0015 | 1.5 | 0.10 | — | 0.0050 |
| 3 | 0.0021 | 2.96 | 0.19 | 0.34 | 0.012 | 0.0016 | 1.5 | 0.12 | — | — |
| 4 | 0.0019 | 2.96 | 0.20 | 0.32 | 0.011 | 0.0014 | 1.4 | 0.12 | — | — |
| 5 | 0.0020 | 2.94 | 0.23 | 0.25 | 0.011 | 0.0014 | 1.5 | 0.10 | — | — |
| 6 | 0.0021 | 2.96 | 0.25 | 0.33 | 0.012 | 0.0016 | 1.4 | 0.11 | — | — |
| 7 | 0.0020 | 2.95 | 0.22 | 0.32 | 0.014 | 0.0015 | 1.4 | 0.10 | — | — |
| 8 | 0.0020 | 2.95 | 0.20 | 0.29 | 0.012 | 0.0014 | 1.4 | 0.10 | — | — |
| 9 | 0.0021 | 2.94 | 0.24 | 0.29 | 0.011 | 0.0014 | 1.5 | 0.11 | — | — |
| 10 | 0.0021 | 2.95 | 0.23 | 0.31 | 0.012 | 0.0014 | 1.5 | 0.12 | — | — |
| 11 | 0.0021 | 2.96 | 0.17 | 0.28 | 0.013 | 0.0015 | 1.5 | 0.10 | — | — |
| 12 | 0.0020 | 2.95 | 0.19 | 0.35 | 0.012 | 0.0015 | <u>0.9</u> | 0.10 | 0.0050 | — |
| 13 | 0.0021 | 2.96 | 0.16 | 0.32 | 0.011 | 0.0016 | <u>3.2</u> | 0.11 | 0.0040 | — |
| 14 | 0.0019 | 2.94 | 0.21 | 0.31 | 0.012 | 0.0016 | 1.5 | 0.10 | 0.0050 | — |
| 15 | 0.0021 | 2.95 | 0.21 | 0.26 | 0.011 | 0.0016 | 1.4 | 0.12 | 0.0050 | — |
| 16 | 0.0019 | 2.97 | 0.19 | 0.26 | 0.012 | 0.0015 | 1.5 | 0.12 | 0.0040 | — |
| 17 | 0.0021 | 2.95 | 0.15 | 0.33 | 0.011 | 0.0014 | 1.4 | 0.11 | 0.0040 | — |
| 18 | 0.0020 | 2.01 | 0.10 | — | 0.012 | 0.0015 | 1.5 | 0 12 | 0.0046 | — |
| 19 | 0.0021 | 2.95 | 0.20 | 0.32 | 0.011 | 0.0014 | 1.4 | 0.11 | 0.0053 | 0.0052 |
| 20 | 0.0020 | <u>1.51</u> | 0.22 | 0.29 | 0.012 | 0.0016 | 1.6 | 0.12 | 0.0048 | — |

TABLE 1-continued

| No. | | | | | | | | | | |
|---|---|---|---|---|---|---|---|---|---|---|
| 21 | 0.0020 | 4.52 | 0.18 | 0.32 | 0.013 | 0.0016 | 1.5 | 0.11 | 0.0044 | — |
| 22 | 0.0019 | 2.96 | 0.06 | 0.26 | 0.011 | 0.0015 | 1.5 | 0.11 | 0.0053 | — |
| 23 | 0.0021 | 2.98 | 2.53 | 0.28 | 0.012 | 0.0014 | 1.5 | 0.12 | 0.0047 | — |
| 24 | 0.0018 | 2.98 | 0.16 | 3.52 | 0.013 | 0.0016 | 1.5 | 0.10 | 0.0047 | — |
| 25 | 0.0020 | 2.98 | 0.17 | 0.29 | 0.001 | 0.0013 | 1.6 | 0.11 | 0.0048 | — |
| 26 | 0.0021 | 2.96 | 0.24 | 0.30 | 0.306 | 0.0015 | 1.5 | 0.11 | 0.0048 | — |
| 27 | 0.0018 | 2.97 | 0.24 | 0.31 | 0.011 | 0.0042 | 1.6 | 0.12 | 0.0050 | — |
| 28 | 0.0022 | 2.97 | 0.25 | 0.34 | 0.014 | 0.0014 | 1.6 | 0.11 | 0.0200 | — |
| 29 | 0.0020 | 2.98 | 0.16 | 0.30 | 0.013 | 0.0014 | 1 6 | 0.11 | 0.0055 | — |
| 30 | 0.0019 | 2.97 | 0.22 | 0.31 | 0.012 | 0.0014 | 1 6 | 0.11 | 0.0043 | — |
| 31 | 0.0021 | 2.98 | 0.19 | 0.27 | 0.013 | 0.0014 | 1.5 | 0.12 | 0.0051 | — |
| 32 | 0.0020 | 2.96 | 1.03 | 0.33 | 0.011 | 0.0014 | 1.6 | 0.11 | 0.0054 | — |
| 33 | 0.0021 | 2.95 | 0.24 | 1.51 | 0.002 | 0.0015 | 1.6 | 0.10 | 0.0047 | — |
| 34 | 0.0021 | 2.95 | 0.17 | 0.25 | 0.102 | 0.0015 | 1.5 | 0.11 | 0.0048 | — |
| 35 | 0.0019 | 2.95 | 0.22 | 0.29 | 0.013 | 0.0014 | 1.8 | 0.12 | 0.0054 | — |
| 36 | 0.0020 | 2.98 | 0.16 | 0.29 | 0.014 | 0.0013 | 1.5 | 1.53 | 0.0045 | — |
| 37 | 0.0020 | 2.95 | 0.17 | 0.25 | 0.011 | 0.0014 | 1.6 | 0.12 | 0.0050 | — |
| 38 | 0.0030 | 2.96 | 0.19 | 0.29 | 0.012 | 0.0014 | 1 5 | 0.10 | 0 0052 | — |
| 39 | 0.0019 | 2.96 | 0.17 | 0.10 | 0.013 | 0.0015 | 1 5 | 0.11 | 0.0046 | — |
| 40 | 0.0019 | 2.97 | 0.21 | 2.93 | 0.013 | 0.0016 | 1.4 | 0.11 | 0.0043 | — |
| 41 | 0.0019 | 3.95 | 0.21 | 0.29 | 0.010 | 0.0015 | 1.5 | 0.10 | 0.0048 | — |
| 42 | 0.0019 | 3.50 | 1.88 | 0.30 | 0.011 | 0.0014 | 1.6 | 0.10 | 0.0051 | — |
| 43 | 0.0021 | 2.96 | 0.20 | 0.32 | 0.011 | 0.0014 | 2.9 | 0.12 | 0.0044 | — |
| 44 | 0.0020 | 2.95 | 0.22 | 0.27 | 0.011 | 0.0013 | 1.5 | 2.80 | 0.0052 | — |

| No. | Sr mass % | Ba mass % | Ce mass % | La mass % | Nd mass % | Pr mass % | Zn mass % | Cd mass % | Sn mass % | Cr mass % |
|---|---|---|---|---|---|---|---|---|---|---|
| 1 | — | — | — | — | — | — | — | — | — | — |
| 2 | — | — | — | — | — | — | — | — | — | — |
| 3 | 0.0040 | — | — | — | — | — | — | — | — | — |
| 4 | — | 0.0050 | — | — | — | — | — | — | — | — |
| 5 | — | — | 0.0040 | — | — | — | — | — | — | — |
| 6 | — | — | — | 0.0040 | — | — | — | — | — | — |
| 7 | — | — | — | — | 0.0060 | — | — | — | — | — |
| 8 | — | — | — | — | — | 0.0050 | — | — | — | — |
| 9 | — | — | — | — | — | — | 0.0040 | — | — | — |
| 10 | — | — | — | — | — | — | — | 0.0050 | — | — |
| 11 | — | — | — | — | — | — | — | — | — | — |
| 12 | — | — | — | — | — | — | — | — | — | — |
| 13 | — | — | — | — | — | — | — | — | — | — |
| 14 | — | — | — | — | — | — | — | — | — | — |
| 15 | — | — | — | — | — | — | — | — | 0.10 | — |
| 16 | — | — | — | — | — | — | — | — | — | 3.0 |
| 17 | — | — | — | — | — | — | — | — | — | — |
| 18 | — | — | — | — | — | — | — | — | — | — |
| 19 | — | — | — | — | — | — | — | — | — | — |
| 20 | — | — | — | — | — | — | — | — | — | — |
| 21 | — | — | — | — | — | — | — | — | — | — |
| 22 | — | — | — | — | — | — | — | — | — | — |
| 23 | — | — | — | — | — | — | — | — | — | — |
| 24 | — | — | — | — | — | — | — | — | — | — |
| 25 | — | — | — | — | — | — | — | — | — | — |
| 26 | — | — | — | — | — | — | — | — | — | — |
| 27 | — | — | — | — | — | — | — | — | — | — |
| 28 | — | — | — | — | — | — | — | — | — | — |
| 29 | — | — | — | — | — | — | — | — | 0.50 | — |
| 30 | — | — | — | — | — | — | — | — | — | 11.0 |
| 31 | — | — | — | — | — | — | — | — | — | — |
| 32 | — | — | — | — | — | — | — | — | — | — |
| 33 | — | — | — | — | — | — | — | — | — | — |
| 34 | — | — | — | — | — | — | — | — | — | — |
| 35 | — | — | — | — | — | — | — | — | — | — |
| 36 | — | — | — | — | — | — | — | — | — | — |
| 37 | — | — | — | — | — | — | — | — | — | — |
| 38 | — | — | — | — | — | — | — | — | — | — |
| 39 | — | — | — | — | — | — | — | — | — | — |
| 40 | — | — | — | — | — | — | — | — | — | — |
| 41 | — | — | — | — | — | — | — | — | — | — |
| 42 | — | — | — | — | — | — | — | — | — | — |
| 43 | — | — | — | — | — | — | — | — | — | — |
| 44 | — | — | — | — | — | — | — | — | — | — |

TABLE 2

| No. | Q | Sheet thickness mm | Grain size μm | {100} intensity | Number of Cu particles (<100 μm)/10 μm² | TS MPa | EL % | W10/400 W/kg | B50 T | Note |
|---|---|---|---|---|---|---|---|---|---|---|
| 1 | 3.35 | 0.20 | 82 | 2.8 | 95 | 600 | 13 | 10.5 | 1.65 | Invention Example |
| 2 | 3.30 | 0.20 | 81 | 2.8 | 91 | 620 | 14 | 10.3 | 1.64 | Invention Example |
| 3 | 3.45 | 0.20 | 80 | 2.7 | 101 | 610 | 13 | 10.5 | 1.64 | Invention Example |
| 4 | 3.40 | 0.20 | 80 | 2.8 | 105 | 610 | 12 | 10.4 | 1.64 | Invention Example |
| 5 | 3.21 | 0.20 | 81 | 2.7 | 92 | 620 | 12 | 10.5 | 1.64 | Invention Example |
| 6 | 3.37 | 0.20 | 81 | 2.7 | 95 | 600 | 13 | 10.3 | 1.64 | Invention Example |
| 7 | 3.37 | 0.20 | 82 | 2.8 | 91 | 610 | 12 | 10.5 | 1.65 | Invention Example |
| 8 | 3.33 | 0.20 | 82 | 2.8 | 100 | 600 | 14 | 10.3 | 1.64 | Invention Example |
| 9 | 3.28 | 0.20 | 80 | 2.7 | 102 | 610 | 13 | 10.4 | 1.64 | Invention Example |
| 10 | 3.34 | 0.20 | 81 | 2.7 | 109 | 600 | 12 | 10.6 | 1.64 | Invention Example |
| 11 | 3.35 | 0.20 | 40 | 2.8 | 91 | 630 | 13 | 11.5 | 1.65 | Comparative Example |
| 12 | 3.46 | 0.20 | 80 | 2.8 | 2 | 490 | 17 | 10.5 | 1.64 | Comparative Example |
| 13 | 3.44 | 0.20 | | | Fractured | | | | | Comparative Example |
| 14 | 3.35 | 0.20 | 82 | 2.8 | 91 | 630 | 14 | 10.4 | 1.64 | Invention Example |
| 15 | 3.26 | 0.20 | 81 | 2.9 | 99 | 630 | 11 | 10.5 | 1.65 | Invention Example |
| 16 | 3.30 | 0.20 | 80 | 2.8 | 106 | 630 | 13 | 10.6 | 1.64 | Invention Example |
| 17 | 3.46 | 0.65 | 81 | 2.8 | 104 | 620 | 14 | 51.4 | 1.64 | Comparative Example |
| 18 | 1.91 | 0.20 | 95 | 0.4 | 45 | 540 | 15 | 12.5 | 1.63 | Comparative Example |
| 19 | 3.39 | 0.20 | 82 | 2.8 | 98 | 610 | 13 | 10.5 | 1.65 | Invention Example |
| 20 | 1.87 | 0.20 | 83 | 2.7 | 108 | 580 | 17 | 12.2 | 1.74 | Comparative Example |
| 21 | 4.98 | 0.20 | | | Fractured | | | | | Comparative Example |
| 22 | 3.42 | 0.20 | 60 | 2.9 | 103 | 640 | 18 | 15.5 | 1.64 | Comparative Example |
| 23 | 1.01 | 0.20 | 40 | 2.7 | 101 | 680 | 14 | 15.7 | 1.61 | Comparative Example |
| 24 | 9.86 | 0.20 | | | Fractured | | | | | Comparative Example |
| 25 | 3.39 | 0.20 | 83 | 2.7 | 96 | 580 | 16 | 10.3 | 1.62 | Comparative Example |
| 26 | 3.32 | 0.20 | | | Fractured | | | | | Comparative Example |
| 27 | 3.35 | 0.20 | 40 | 2.9 | 96 | 690 | 15 | 15.2 | 1.66 | Comparative Example |
| 28 | 3.40 | 0.20 | 81 | 2.8 | 102 | 630 | 15 | 15.6 | 1.65 | Comparative Example |
| 29 | 3.42 | 0.20 | | | Fractured | | | | | Comparative Example |
| 30 | 3.37 | 0.20 | 80 | 2.7 | 103 | 670 | 9 | 12.3 | 1.60 | Comparative Example |
| 31 | 3.33 | 0.20 | 299 | 2.7 | 102 | 580 | 8 | 11.5 | 1.65 | Comparative Example |
| 32 | 2.59 | 0.20 | 83 | 2.7 | 106 | 630 | 14 | 9.8 | 1.63 | Invention Example |
| 33 | 5.73 | 0.20 | 79 | 2,8 | 110 | 650 | 13 | 9.7 | 1.63 | Invention Example |
| 34 | 3.28 | 0.20 | 80 | 2.8 | 109 | 670 | 14 | 10.3 | 1.66 | Invention Example |
| 35 | 3.31 | 0.20 | 80 | 2.8 | 251 | 720 | 15 | 10.4 | 1.64 | Invention Example |
| 36 | 3.40 | 0.20 | 83 | 2.8 | 106 | 680 | 14 | 9.9 | 1.66 | Invention Example |
| 37 | 3.28 | 0.20 | 154 | 2.8 | 100 | 590 | 12 | 9.8 | 1.65 | Invention Example |
| 38 | 3.35 | 0.20 | 83 | 2.8 | 100 | 610 | 14 | 10.3 | 1.65 | Invention Example |
| 39 | 2.99 | 0.20 | 70 | 2.9 | 105 | 600 | 15 | 10.9 | 1.65 | Invention Example |
| 40 | 8.62 | 0.20 | 81 | 2.8 | 98 | 700 | 14 | 9.5 | 1.63 | Invention Example |
| 41 | 4.32 | 0.20 | 80 | 2.8 | 92 | 650 | 14 | 9.6 | 1.63 | Invention Example |
| 42 | 2.22 | 0.20 | 81 | 2.8 | 102 | 760 | 15 | 9.3 | 1.63 | Invention Example |
| 43 | 3.40 | 0.20 | 81 | 2.9 | 507 | 790 | 15 | 10.3 | 1.63 | Invention Example |
| 44 | 3.27 | 0.20 | 82 | 2.9 | 94 | 760 | 14 | 9.6 | 1.63 | Invention Example |

As shown in Tables 1 and 2, in Sample Nos. 1 to 10, Nos. 14 to 16, No. 19, and Nos. 32 to 44, since the chemical composition was within the range of the present invention and other conditions were within the ranges of the present invention, good results were obtained in magnetic characteristics and mechanical properties.

In Sample No. 11, since substantially no coarse precipitate forming element was contained, the iron loss W10/400 was high.

In Sample No. 12, since the Cu content was too small, the tensile strength (TS) was insufficient.

In Sample No. 13, since the Cu content was too large, fracture had occurred during the test.

In Sample No. 17, since the sheet thickness was too thick, the iron loss W10/400 was high.

In Sample No. 18, since Al was not contained in a specified amount and the parameter Q was less than 2.00, the tensile strength (TS) was low, and the iron loss W10/400 was high.

In Sample No. 20, since the Si content was small, the iron loss W10/400 was high.

In Sample No. 21, since the Si content was large, fracture had occurred during the test.

In Sample No. 22, since the Mn content was small, the iron loss W10/400 was high.

In Sample No. 23, since the Mn content was large, the iron loss W10/400 was high, and as a result, the magnetic flux density B50 was inferior.

In Sample No. 24, since the Al content was large, fracture had occurred during the test.

In Sample No. 25, since the P content was small, the tensile strength (TS) was low, and as a result, the magnetic flux density B50 was inferior.

In Sample No. 26, since the P content was large, fracture had occurred during the test.

In Sample No. 27, since the S content was large, the iron loss W10/400 was high.

In Sample No. 28, since the Mg content was large, the iron loss W10/400 was high.

In Sample No. 29, since the Sn content was too large, fracture had occurred during the test.

In Sample No. 30, since the Cr content was too large, the total elongation EL was low, the iron loss W10/400 was high, and as a result, the magnetic flux density B50 was inferior.

In Sample No. 31, since the average grain size was large, the tensile strength (TS) and the total elongation EL were low, and the iron loss W10/400 was high.

(Second Test)

In a second test, molten steel having the chemical composition shown in Table 3 was cast to produce a slab, and in the subsequent steps, a non-oriented electrical steel sheet was produced in the same manner as in the first test. However, the hot-rolled sheet thickness was limited to 2.0 mm, and the cold-rolled sheet thickness was limited to 0.20 mm. By variously changing manufacturing conditions, non-oriented electrical steel sheets having different {100} crystal orientation intensities I were produced. For each of the non-oriented electrical steel sheets, the number of particles of simple Cu having a diameter of less than 100 nm per 10 $\mu m^2$, the {100} crystal orientation intensity I, and the average grain size r were measured. The results are shown in Table 4.

In addition, the iron loss W10/400, the magnetic flux density B50, the tensile strength (TS), and the total elongation (EL) were also measured by the same procedure as in the first test. The results are shown in Table 4.

TABLE 3

| No. | C mass % | Si mass % | Mn mass % | Al mass % | P mass % | S mass % | Mg mass % | Cu mass % | Ni mass % |
|---|---|---|---|---|---|---|---|---|---|
| 201 | 0.0021 | 2.95 | 0.21 | 0.26 | 0.013 | 0.0013 | 0.0040 | 1.6 | 0.01 |
| 202 | 0.0020 | 2.96 | 0.21 | 0.27 | 0.014 | 0.0015 | 0.0050 | 1.5 | 0.05 |
| 203 | 0.0022 | 2.95 | 0.21 | 0.27 | 0.015 | 0.0015 | 0.0040 | 1.5 | 0.10 |
| 204 | 0.0021 | 2.97 | 0.15 | 0.33 | 0.013 | 0.0014 | 0.0040 | 1.5 | 0.20 |
| 205 | 0.0021 | 2.96 | 0.22 | 0.29 | 0.014 | 0.0014 | 0.0040 | 1.5 | 0.53 |
| 206 | 0.0022 | 2.96 | 0.25 | 0 28 | 0.014 | 0.0013 | 0.0050 | 1.6 | 1.02 |
| 207 | 0.0020 | 2.95 | 0.22 | 0.32 | 0.015 | 0.0015 | 0.0040 | 1.6 | 1.51 |
| 208 | 0.0021 | 2.95 | 0.24 | 0.27 | 0.013 | 0.0014 | 0.0040 | 1.6 | 3.01 |
| 209 | 0.0022 | 2.96 | 0.18 | 0.28 | 0.014 | 0.0013 | 0.0040 | 1.5 | 5.03 |
| 210 | 0.0021 | 2.97 | 0.19 | 0.31 | 0.014 | 0.0015 | 0.0040 | 1.5 | 0.01 |
| 211 | 0.0022 | 2.96 | 0.24 | 0.30 | 0.015 | 0.0014 | 0.0040 | 1.5 | 0.05 |
| 212 | 0.0020 | 2.95 | 0.24 | 0.33 | 0.013 | 0.0013 | 0.0050 | 1.5 | 0.10 |
| 213 | 0.0021 | 2.95 | 0.17 | 0.31 | 0.013 | 0.0015 | 0.0040 | 1.5 | 0.20 |
| 214 | 0.0022 | 2.97 | 0.22 | 0.32 | 0.013 | 0.0014 | 0.0040 | 1.5 | 0.52 |
| 215 | 0.0021 | 2.97 | 0.21 | 0.31 | 0.014 | 0.0015 | 0.0040 | 1.5 | 1.01 |
| 216 | 0.0021 | 2.95 | 0.18 | 0.30 | 0.014 | 0.0013 | 0.0050 | 1.5 | 1.51 |
| 217 | 0.0020 | 2.96 | 0.18 | 0.29 | 0.013 | 0.0015 | 0.0050 | 1.5 | 3.02 |
| 218 | 0.0021 | 2.95 | 0.18 | 0.33 | 0.014 | 0.0014 | 0.0040 | 1.5 | 5.02 |
| 219 | 0.0021 | 2.97 | 0.23 | 0.32 | 0.014 | 0.0015 | — | 1.6 | 0.01 |
| 220 | 0.0022 | 2.95 | 0.25 | 0.30 | 0.013 | 0.0013 | — | 1.6 | 0.05 |
| 221 | 0.0022 | 2.97 | 0.16 | 0.26 | 0.013 | 0.0013 | — | 1.5 | 0.10 |
| 222 | 0.0022 | 2.95 | 0.16 | 0.27 | 0.014 | 0.0014 | — | 1.5 | 0.20 |
| 223 | 0.0021 | 2.96 | 0.16 | 0.26 | 0.015 | 0.0014 | — | 1.5 | 0.50 |
| 224 | 0.0020 | 2.96 | 0.16 | 0.26 | 0.013 | 0.0015 | — | 1.6 | 1.04 |
| 225 | 0.0020 | 2.96 | 0.19 | 0.33 | 0.014 | 0.0013 | — | 1.6 | 1.52 |
| 226 | 0.0021 | 2.97 | 0.19 | 0.34 | 0.015 | 0.0015 | — | 1.5 | 3.01 |
| 227 | 0.0022 | 2.95 | 0.16 | 0.29 | 0.014 | 0.0013 | — | 1.5 | 5.01 |
| 228 | 0.0022 | 2.97 | 0.25 | 0.34 | 0.014 | 0.0015 | 0.0040 | 0.1 | 0.01 |
| 229 | 0.0021 | 2.95 | 0.15 | 0.32 | 0.015 | 0.0013 | 0.0040 | 0.1 | 0.05 |
| 230 | 0.0022 | 2.97 | 0.16 | 0.33 | 0.013 | 0.0015 | 0.0050 | 0.1 | 0.10 |
| 231 | 0.0020 | 2.95 | 0.20 | 0.31 | 0.014 | 0.0013 | 0.0050 | 0.1 | 0.20 |
| 232 | 0.0021 | 2.95 | 0.17 | 0.29 | 0.015 | 0.0015 | 0.0040 | 0.1 | 0.51 |
| 233 | 0.0021 | 2.95 | 0.16 | 0.34 | 0.013 | 0.0015 | 0.0040 | 0.1 | 1.03 |
| 234 | 0.0022 | 2.95 | 0.21 | 0.28 | 0.014 | 0.0014 | 0.0040 | 0.1 | 1.53 |
| 235 | 0.0020 | 2.95 | 0.22 | 0.28 | 0.014 | 0.0014 | 0.0050 | 0.1 | 3.02 |
| 236 | 0.0021 | 2.95 | 0.20 | 0.26 | 0.013 | 0.0015 | 0.0050 | 0.1 | 5.91 |
| 237 | 0.0022 | 2.95 | 0.21 | 0.25 | 0.014 | 0.0013 | 0.0040 | 0.1 | 0.01 |
| 238 | 0.0021 | 2.96 | 0.16 | 0.25 | 0.013 | 0.0014 | 0.0040 | 0.1 | 0.05 |
| 239 | 0.0020 | 2.95 | 0.21 | 0.28 | 0.015 | 0.0015 | 0.0040 | 0.1 | 0.10 |
| 240 | 0.0020 | 2.96 | 0.24 | 0.26 | 0.013 | 0.0014 | 0.0050 | 0.1 | 0.20 |
| 241 | 0.0022 | 2.95 | 0.15 | 0.34 | 0.015 | 0.0015 | 0.0040 | 0.1 | 0.51 |
| 242 | 0.0021 | 2.95 | 0.17 | 0.34 | 0.014 | 0.0013 | 0.0040 | 0.1 | 1.02 |
| 243 | 0.0022 | 2.95 | 0.16 | 0.28 | 0.014 | 0.0015 | 0.0050 | 0.1 | 1.51 |
| 244 | 0.0022 | 2.95 | 0.18 | 0.34 | 0.013 | 0.0014 | 0.0040 | 0.1 | 3.03 |
| 245 | 0.0022 | 2.96 | 0.23 | 0.26 | 0.014 | 0.0013 | 0.0040 | 0.1 | 5.01 |
| 246 | 0.0022 | 2.95 | 0.21 | 0.30 | 0.014 | 0.0015 | — | 0.1 | 0.01 |
| 247 | 0.0021 | 2.96 | 0.22 | 0.34 | 0.013 | 0.0014 | — | 0.1 | 0.05 |
| 248 | 0.0021 | 2.95 | 0.23 | 0.29 | 0.015 | 0.0013 | — | 0.1 | 0.10 |
| 249 | 0.0022 | 2.95 | 0.21 | 0.35 | 0.014 | 0.0015 | — | 0.1 | 0.20 |
| 250 | 0.0020 | 2.97 | 0.21 | 0.32 | 0.014 | 0.0015 | — | 0.1 | 0.52 |
| 251 | 0.0021 | 2.95 | 0.20 | 0.32 | 0.014 | 0.0014 | — | 0.1 | 1.02 |
| 252 | 0.0020 | 2.95 | 0.21 | 0.33 | 0.013 | 0.0013 | — | 0.1 | 1.51 |
| 253 | 0.0022 | 2.96 | 0.23 | 0.29 | 0.015 | 0.0013 | — | 0.1 | 3.03 |
| 254 | 0.0021 | 2.96 | 0.23 | 0.30 | 0.013 | 0.0015 | — | 0.1 | 5.02 |
| 255 | 0.0019 | 1.51 | 0.18 | 0.34 | 0.012 | 0.0014 | 0.0054 | 1.6 | 0.10 |
| 256 | 0.0019 | 4.53 | 0.22 | 0.33 | 0.014 | 0.0014 | 0.0051 | 1.5 | 0.12 |
| 257 | 0.0019 | 2.97 | 0.09 | 0.32 | 0.011 | 0.0013 | 0.0053 | 1.6 | 0.11 |
| 258 | 0.0019 | 2.97 | 2.52 | 0.27 | 0.013 | 0.0015 | 0.0045 | 1.6 | 0.10 |
| 259 | 0.0018 | 2.95 | 0.18 | 3.53 | 0.012 | 0.0016 | 0.0049 | 1.6 | 0.11 |
| 260 | 0.0018 | 2.98 | 0.16 | 0.33 | 0.001 | 0.0014 | 0.0048 | 1.6 | 0.11 |
| 261 | 0.0019 | 2.96 | 0.23 | 0.30 | 0.307 | 0 0015 | 0.0046 | 1.6 | 0.11 |
| 262 | 0.0022 | 2.98 | 0.16 | 0.26 | 0.013 | 0.0047 | 0.0052 | 1.5 | 0.10 |
| 263 | 0.0021 | 2.99 | 0.23 | 0.32 | 0 013 | 0.0014 | 0.0200 | 1.5 | 0.12 |
| 264 | 0.0021 | 2.97 | 0.20 | 0.28 | 0.013 | 0.0013 | 0.0054 | 1 5 | 0 10 |

TABLE 3-continued

| No. | C mass % | Si mass % | Mn mass % | Al mass % | P mass % | S mass % | Mg mass % | Cu mass % | Ni mass % |
|---|---|---|---|---|---|---|---|---|---|
| 265 | 0.0021 | 2.95 | 1.01 | 0.28 | 0.012 | 0.0015 | 0.0048 | 1.6 | 0.11 |
| 266 | 0.0022 | 2.96 | 0.24 | 1.51 | 0.012 | 0.0016 | 0.0040 | 1.5 | 0.12 |
| 267 | 0.0018 | 2.98 | 0.21 | 0.32 | 0.103 | 0.0015 | 0.0053 | 1.5 | 0.10 |
| 268 | 0.0022 | 2.96 | 0.22 | 0.26 | 0.013 | 0.0013 | 0.0047 | 1.9 | 0.11 |
| 269 | 0.0018 | 2.99 | 0.16 | 0.31 | 0.013 | 0.0014 | 0.0043 | 1.5 | 1.51 |
| 270 | 0.0018 | 2.97 | 0.22 | 0.32 | 0.013 | 0.0014 | 0.0040 | 1.6 | 0.11 |

TABLE 4

| No. | Q | Sheet thickness mm | Grain size µm | {100} intensity | Number of Cu particles (<100 nm)/10 µm² | TS MPa | EL % | W10/400 W/kg | B50 T | Note |
|---|---|---|---|---|---|---|---|---|---|---|
| 201 | 3.26 | 0.20 | 83 | 2.9 | 100 | 600 | 3 | 10.5 | 1.65 | Comparative Example |
| 202 | 3.29 | 0.20 | 83 | 2 9 | 95 | 610 | 5 | 10.5 | 1.64 | Comparative Example |
| 203 | 3.28 | 0.20 | 81 | 2.9 | 103 | 600 | 12 | 10.6 | 1.64 | Invention Example |
| 204 | 3.48 | 0.20 | 81 | 2.8 | 99 | 600 | 16 | 10.6 | 1.65 | Invention Example |
| 205 | 3.32 | 0.20 | 82 | 2.9 | 102 | 610 | 18 | 10.6 | 1.64 | Invention Example |
| 206 | 3.27 | 0.20 | 83 | 2.9 | 102 | 610 | 19 | 10.3 | 1.64 | Invention Example |
| 207 | 3.37 | 0.20 | 83 | 2.9 | 99 | 620 | 18 | 10.7 | 1.64 | Invention Example |
| 208 | 3.25 | 0.20 | 81 | 2.8 | 97 | 630 | 15 | 10.7 | 1.64 | Invention Example |
| 209 | 3 34 | 0.20 | 83 | 2.9 | 96 | 650 | 8 | 10.5 | 1.65 | Comparative Example |
| 210 | 3.40 | 0.20 | 81 | 1.9 | 99 | 600 | 13 | 10.2 | 1.59 | Comparative Example |
| 211 | 3.32 | 0.20 | 82 | 1.9 | 102 | 600 | 14 | 10.7 | 1.60 | Comparative Example |
| 212 | 3.37 | 0.20 | 81 | 1.9 | 105 | 610 | 14 | 10.5 | 1.59 | Comparative Example |
| 213 | 3.40 | 0.20 | 83 | 1.9 | 104 | 600 | 16 | 10.2 | 1.60 | Comparative Example |
| 214 | 3.39 | 0.20 | 82 | 2.0 | 96 | 600 | 18 | 10.5 | 1.60 | Comparative Example |
| 215 | 3.38 | 0.20 | 80 | 1.8 | 95 | 610 | 20 | 10.5 | 1.59 | Comparative Example |
| 216 | 3.37 | 0.20 | 82 | 1.9 | 103 | 620 | 19 | 10.4 | 1.59 | Comparative Example |
| 217 | 3.36 | 0.20 | 81 | 2.0 | 101 | 630 | 16 | 10.7 | 1.60 | Comparative Example |
| 218 | 3.43 | 0.20 | 80 | 1.9 | 99 | 650 | 9 | 10.4 | 1.59 | Comparative Example |
| 219 | 3.38 | 0.2Q | 81 | 2.9 | 103 | 600 | 11 | 11.2 | 1.65 | Comparative Example |
| 220 | 3.30 | 3.20 | 82 | 2.9 | 102 | 600 | 12 | 11.5 | 1.65 | Comparative Example |
| 221 | 3.33 | 0.20 | 81 | 2.8 | 103 | 600 | 13 | 11.2 | 1.64 | Comparative Example |
| 222 | 3.33 | 0.20 | 82 | 3.0 | 104 | 600 | 16 | 11.3 | 1.64 | Comparative Example |
| 223 | 3.32 | 0.20 | 82 | 2.3 | 101 | 610 | 18 | 11.3 | 1.64 | Comparative Example |
| 224 | 3.32 | 0.20 | 80 | 2.9 | 97 | 610 | 19 | 11.7 | 1.65 | Comparative Example |
| 225 | 3.43 | 0.20 | 80 | 2.9 | 97 | | 19 | 11.4 | 1.65 | Comparative Example |
| 226 | 3.46 | 0.20 | 80 | 3.0 | 105 | 630 | 16 | 11.2 | 1.64 | Comparative Example |
| 227 | 3.37 | 0.20 | 82 | 2.9 | 103 | 650 | 9 | 11.5 | 1.64 | Comparative Example |
| 228 | 3.40 | 0.20 | 81 | 3.0 | 1 | 490 | 17 | 10.3 | 1.64 | Comparative Example |
| 229 | 3.44 | 0.20 | 81 | 2.8 | 0 | 490 | 18 | 10.6 | 1.65 | Comparative Example |
| 230 | 3.47 | 0.20 | 82 | 2.8 | 0 | 490 | 18 | 10.3 | 1.65 | Comparative Example |
| 231 | 3.37 | 0.20 | 82 | 3.0 | 1 | 500 | 19 | 10.6 | 1.65 | Comparative Example |
| 232 | 3.36 | 0.20 | 80 | 3.0 | 0 | 490 | 20 | 10.3 | 1.64 | Comparative Example |
| 233 | 3.47 | 0.20 | 80 | 2.8 | 0 | 500 | 20 | 10.7 | 1.04 | Comparative Example |
| 234 | 3.30 | 0.20 | 81 | 2.8 | 2 | 510 | 19 | 10.2 | 1.64 | Comparative Example |
| 235 | 3.29 | 0.20 | 83 | 2.9 | 0 | 520 | 15 | 10.6 | 1.64 | Comparative Example |
| 236 | 3.27 | 0.20 | 82 | 2.9 | 0 | 540 | 8 | 10.5 | 1.65 | Comparative Example |
| 237 | 3.24 | 0.20 | 81 | 19 | 0 | 490 | 18 | 10.4 | 1.59 | Comparative Example |
| 238 | 3.30 | 0.20 | 82 | 2.0 | 2 | 490 | 18 | 10.6 | 1.60 | Comparative Example |
| 239 | 3.30 | 0.20 | 80 | 1.9 | 0 | 490 | 19 | 10.4 | 1.59 | Comparative Example |
| 240 | 3.24 | 0.20 | 80 | 1.9 | 0 | 490 | 19 | 10.3 | 1.59 | Comparative Example |
| 241 | 3.48 | 0.20 | 82 | 1.9 | 2 | 500 | 19 | 10.5 | 1.59 | Comparative Example |
| 242 | 3.46 | 0.20 | 80 | 1.8 | 1 | 500 | 20 | 10.4 | 1.60 | Comparative Example |
| 243 | 3.35 | 0.20 | 81 | 1.9 | 0 | 510 | 15 | 10.4 | 1.59 | Comparative Example |
| 244 | 3.45 | 0.20 | 81 | 1.9 | 2 | 520 | 16 | 10.6 | 1.60 | Comparative Example |
| 245 | 3.25 | 0.20 | 82 | 1.9 | 0 | 540 | 9 | 10.6 | 1.60 | Comparative Example |
| 246 | 3.34 | 0.20 | 83 | 2.8 | 0 | 490 | 19 | 11.6 | 1.64 | Comparative Example |
| 247 | 3.42 | 0.20 | 82 | 2.8 | 1 | 490 | 19 | 11.5 | 1.65 | Comparative Example |
| 248 | 3.30 | 0.20 | 82 | 2 9 | 0 | 500 | 19 | 11.5 | 1.64 | Comparative Example |
| 249 | 3.44 | 0.20 | 82 | 2.9 | 0 | 490 | 19 | 11.5 | 1.64 | Comparative Example |
| 250 | 3.40 | 0.20 | 80 | 2.9 | 0 | 490 | 19 | 11.3 | 1.64 | Comparative Example |
| 251 | 3.39 | 0.20 | 80 | 3.0 | 1 | 500 | 20 | 11.6 | 1.65 | Comparative Example |
| 252 | 3.40 | 0.20 | 83 | 2.9 | 0 | 510 | 19 | 11.6 | 1.64 | Comparative Example |
| 253 | 3.31 | 0.20 | 83 | 3.0 | 1 | 520 | 18 | 11.7 | 1.64 | Comparative Example |
| 254 | 3.33 | 0.20 | 82 | 2.9 | 1 | 540 | 9 | 11.4 | 1.65 | Comparative Example |
| 255 | 2.01 | 0.20 | 83 | 2.7 | 102 | 580 | 17 | 12.3 | 1.74 | Comparative Example |
| 256 | 4.97 | 0.20 | | | Fractured | | | | | Comparative Example |
| 257 | 3.52 | 0.20 | 61 | 2.8 | 103 | 630 | 17 | 15.3 | 1.64 | Comparative Example |
| 258 | 0.99 | 0.20 | 42 | 2.9 | 104 | 680 | 15 | 15.6 | 1.61 | Comparative Example |
| 259 | 9.83 | 0.20 | | | Fractured | | | | | Comparative Example |
| 260 | 3.48 | 0.20 | 83 | 2.8 | 97 | 590 | 15 | 10.3 | 1.61 | Comparative Example |
| 261 | 3.33 | 0.20 | | | Fractured | | | | | Comparative Example |

TABLE 4-continued

| No. | Q | Sheet thickness mm | Grain size μm | {100} intensity | Number of Cu particles (<100 nm)/10 μm² | TS MPa | EL % | W10/400 W/kg | B50 T | Note |
|---|---|---|---|---|---|---|---|---|---|---|
| 262 | 3.34 | 0.20 | <u>39</u> | 2.9 | 97 | 690 | 15 | 15.3 | 1.67 | Comparative Example |
| 263 | 3.40 | 0.20 | 80 | 2.8 | 101 | 640 | 15 | 15.3 | 1.64 | Comparative Example |
| 264 | 3.33 | 0.20 | <u>315</u> | 2.9 | 97 | 580 | 8 | 11.3 | 1.66 | Comparative Example |
| 265 | 2.50 | 0.20 | 84 | 2.8 | 95 | 640 | 14 | 9.9 | 1.63 | Invention Example |
| 266 | 5.74 | 0.20 | 80 | 2.7 | 100 | 640 | 13 | 9.8 | 1.64 | Invention Example |
| 267 | 3.41 | 0.20 | 81 | 2.9 | 101 | 660 | 15 | 10.4 | 1.66 | Invention Example |
| 268 | 3.26 | 0.20 | 82 | 2.8 | 252 | 720 | 14 | 10.4 | 1.65 | Invention Example |
| 269 | 3.45 | 0.20 | 85 | 2.8 | 99 | 670 | 13 | 9.8 | 1.65 | Invention Example |
| 270 | 3.39 | 0.20 | 151 | 2.8 | 98 | 590 | 14 | 9.7 | 1.66 | Invention Example |

As shown in Tables 3 and 4, in Sample Nos. 203 to 208 and Nos. 265 to 270, since the chemical composition was within the range of the present invention and other conditions were within the ranges of the present invention, good results were obtained in magnetic characteristics and mechanical properties.

In Sample Nos. 201 and 202, since the Ni content was too small, the total elongation (EL) was insufficient.

In Sample No. 209, since the Ni content was too large, the total elongation (EL) was insufficient.

In Sample Nos. 210 to 218, since the {100} crystal orientation intensity I was too low, the magnetic flux density B50 was insufficient.

In Sample Nos. 219 to 227, since substantially no coarse precipitate forming element was contained, the iron loss W10/400 was deteriorated.

In Sample Nos. 228 to 236, since the Cu content was too small, the tensile strength (TS) was insufficient.

In Sample Nos. 237 to 245, since the Cu content was too small and the {100} crystal orientation intensity I was too low, the tensile strength (TS) and the magnetic flux density B50 were insufficient.

In Sample Nos. 246 to 254, since substantially no coarse precipitate forming element was contained and the Cu content was too small, the iron loss W10/400 was deteriorated, and the tensile strength (TS) was insufficient.

In Sample No. 255, since the Si content was small, the iron loss W10/400 was high.

In Sample No. 256, since the Si content was large, fracture had occurred during the test.

In Sample No. 257, since the Mn content was small, the iron loss W10/400 was high.

In Sample No. 258, since the Mn content was large, the iron loss W10/400 was high, and as a result, the magnetic flux density B50 was inferior.

In Sample No. 259, since the Al content was large, fracture had occurred during the test.

In Sample No. 260, since the P content was small, the tensile strength (TS) was low, and as a result, the magnetic flux density B50 was inferior.

In Sample No. 261, since the P content was large, fracture had occurred during the test.

In Sample No. 262, since the S content was large, the iron loss W10/400 was high.

In Sample No. 263, since the Mg content was large, the iron loss W10/400 was high.

In Sample No. 264, since the average grain size was large, the tensile strength (TS) and the total elongation EL were low, and the iron loss W10/400 was high.

(Third Test)

A 30 mm thick slab having the chemical composition shown in Table 5 was prepared.

Next, the slab was subjected to hot rolling to produce hot-rolled sheets having a thickness of 6.5 mm and a thickness of 2.0 mm. A slab reheating temperature was 1200° C., a finishing temperature was 850° C., and a winding temperature was 650° C. Thereafter, scale on the surface layer was removed by pickling. Thereafter, the hot-rolled sheets were cold-rolled to a thickness of 0.20 mm or 0.65 mm. In final annealing, the steel strip was heated at a temperature rising rate of 20° C./sec, and after 1000° C. was reached, soaked for 15 seconds and air-cooled. Furthermore, as a Cu precipitation treatment, the steel sheet was heated to 600° C., soaked for 1 minute, and then air-cooled.

In Sample No. 312, the Cu precipitation treatment was omitted. For each of the non-oriented electrical steel sheets, the number of particles of simple Cu having a diameter of less than 100 nm per 10 μm², the {100} crystal orientation intensity I, and the average grain size r were measured. The results are shown in Table 6. In addition, the iron loss W10/400, the magnetic flux density, the tensile strength (TS), and the total elongation (EL) were also measured by the same procedure as in the first test. The results are shown in Table 6.

TABLE 5

| No. | C mass % | Si mass % | Mn mass % | Al mass % | P mass % | S mass % | Cu mass % | Ni mass % | Mg mass % | Ca mass % |
|---|---|---|---|---|---|---|---|---|---|---|
| 301 | 0.0021 | 2.97 | 0.20 | 0.28 | 0.014 | 0.0017 | 1.5 | 0.11 | 0.0041 | — |
| 302 | 0.0021 | 2 98 | 0 20 | 0.31 | 0.011 | 0.0018 | 1 4 | 0.11 | — | 0.0042 |
| 303 | 0.0020 | 2.97 | 0.24 | 0.32 | 0.013 | 0.0016 | 1.4 | 0.10 | — | — |
| 304 | 0.0019 | 2.99 | 0.23 | 0.30 | 0.014 | 0.0015 | 1.5 | 0.11 | — | — |
| 305 | 0.0020 | 2.97 | 0.18 | 0.30 | 0.013 | 0.0017 | 1.4 | 0.11 | — | — |
| 306 | 0.0019 | 2.98 | 0.21 | 0.26 | 0.011 | 0.0016 | 1.4 | 0.10 | — | — |
| 307 | 0.0020 | 2.99 | 0.20 | 0.32 | 0.013 | 0.0017 | 1.5 | 0.11 | — | — |
| 308 | 0.0019 | 2.99 | 0.22 | 0.30 | 0.012 | 0.0016 | 1.4 | 0.10 | — | — |
| 309 | 0.0019 | 2.98 | 0.18 | 0.29 | 0.014 | 0.0015 | 1.4 | 0.12 | — | — |
| 310 | 0.0020 | 2.98 | 0.23 | 0.27 | 0.012 | 0.0017 | 1.5 | 0.12 | — | — |
| 311 | 0.0020 | 2 98 | 0.21 | 0.25 | 0.012 | 0.0017 | 1 5 | 0.12 | — | — |
| 312 | 0.0020 | 2.98 | 0.25 | 0.33 | 0.012 | 0.0014 | <u>0.8</u> | 0.11 | 0.0049 | — |

TABLE 5-continued

| No. | | | | | | | | | | |
|---|---|---|---|---|---|---|---|---|---|---|
| 313 | 0.0020 | 2.98 | 0.22 | 0.33 | 0.013 | 0.0015 | <u>3.4</u> | 0.12 | 0.0041 | — |
| 314 | 0.0021 | 2.99 | 0.16 | 0.32 | 0.012 | 0.0016 | 1.4 | 0.12 | 0.0046 | — |
| 315 | 0.0019 | 2.97 | 0.23 | 0.32 | 0.014 | 0.0015 | 1.5 | 0.10 | 0.0042 | — |
| 316 | 0.0019 | 2.99 | 0.23 | 0.31 | 0.012 | 0.0015 | 1.4 | 0.11 | 0.0047 | — |
| 317 | 0.0020 | 2.97 | 0.21 | 0.30 | 0.012 | 0.0015 | 1.5 | 0.10 | 0.0045 | — |
| 318 | 0.0020 | 2.03 | 0.10 | — | 0.012 | 0.0016 | 1.5 | 0.12 | 0.0050 | — |
| 319 | 0.0021 | 2.95 | 0.23 | 0.30 | 0.011 | 0.0016 | 1.4 | 0.11 | 0.0050 | 0.0042 |
| 320 | 0.0019 | <u>1.52</u> | 0.16 | 0.32 | 0.013 | 0.0015 | 1.6 | 0.11 | 0.0055 | — |
| 321 | 0.0020 | <u>4.51</u> | 0.20 | 0.28 | 0.011 | 0.0013 | 1.6 | 0.12 | 0.0047 | — |
| 322 | 0.0019 | 2.97 | <u>0.05</u> | 0.32 | 0.014 | 0.0014 | 1.6 | 0.11 | 0.0052 | — |
| 323 | 0.0018 | 2.98 | <u>2.54</u> | 0.28 | 0.013 | 0.0013 | 1.5 | 0.12 | 0.0043 | — |
| 324 | 0.0022 | 2.96 | 0.23 | 3.51 | 0.013 | 0.0016 | 1.6 | 0.11 | 0.0044 | — |
| 325 | 0.0019 | 2.98 | 0.25 | 0.29 | <u>0.001</u> | 0.0015 | 1.5 | 0.11 | 0.0047 | — |
| 326 | 0.0018 | 2.96 | 0.20 | 0.31 | <u>0.305</u> | 0.0015 | 1.6 | 0.10 | 0.0048 | — |
| 327 | 0.0021 | 2.98 | 0.20 | 0.35 | 0.013 | <u>0.0045</u> | 1.6 | 0.11 | 0.0046 | — |
| 328 | 0.0018 | 2.99 | 0.21 | 0.27 | 0.013 | 0.0015 | 1.5 | 0.11 | <u>0.0200</u> | — |
| 329 | 0.0021 | 2.98 | 0.24 | 0.29 | 0.012 | 0.0015 | 1.6 | 0.12 | 0.0052 | — |
| 330 | 0.0021 | 2.97 | 0.18 | 0.33 | 0.012 | 0.0013 | 1.6 | 0.12 | 0.0046 | — |
| 331 | 0.0018 | 2.97 | 0.20 | 0.33 | 0.012 | 0.0015 | 1.5 | 0.12 | 0.0051 | — |
| 332 | 0.0020 | 2.96 | 1.02 | 0.29 | 0.012 | 0.0014 | 1.5 | 0.11 | 0.0044 | — |
| 333 | 0.0020 | 2.96 | 0.16 | 1.50 | 0.011 | 0.0014 | 1.5 | 0.11 | 0.0041 | — |
| 334 | 0.0022 | 2.99 | 0.20 | 0.29 | 0.104 | 0.0015 | 1.6 | 0.12 | 0.0054 | — |
| 335 | 0.0018 | 2.98 | 0.25 | 0.30 | 0.011 | 0.0013 | 1.9 | 0.12 | 0.0048 | — |
| 336 | 0.0019 | 2.98 | 0.20 | 0.32 | 0.014 | 0.0015 | 1.5 | 1.54 | 0.0046 | — |
| 337 | 0.0021 | 2.97 | 0.21 | 0.30 | 0.014 | 0.0016 | 1.6 | 0.11 | 0.0041 | — |
| 338 | 0.0030 | 2.95 | 0.18 | 0.32 | 0.011 | 0.0014 | 1.4 | 0.11 | 0.0049 | — |
| 339 | 0.0020 | 2.95 | 0.18 | 0.09 | 0.013 | 0.0016 | 1.5 | 0.11 | 0.0049 | — |
| 340 | 0.0020 | 2.97 | 0.19 | 2.94 | 0.012 | 0.0013 | 1.4 | 0.11 | 0.0047 | — |
| 341 | 0.0020 | 3.96 | 0.21 | 0.32 | 0.013 | 0.0016 | 1.5 | 0.11 | 0.0046 | — |
| 342 | 0.0020 | 3.50 | 1.88 | 0.32 | 0.011 | 0.0016 | 1.6 | 0.11 | 0.0045 | — |
| 343 | 0.0021 | 2.97 | 0.17 | 0.33 | 0.012 | 0.0014 | 2.8 | 0.11 | 0.0043 | — |
| 344 | 0.0020 | 2.95 | 0.21 | 0.29 | 0.012 | 0.0016 | 1.5 | 2.90 | 0.0046 | — |

| No. | Sr mass % | Ba mass % | Ce mass % | La mass % | Nd mass % | Pr mass % | Zn mass % | Cd mass % | Sn mass % | Cr mass % |
|---|---|---|---|---|---|---|---|---|---|---|
| 301 | — | — | — | — | — | — | — | — | — | — |
| 302 | — | — | — | — | — | — | — | — | — | — |
| 303 | 0.0040 | — | — | — | — | — | — | — | — | — |
| 304 | — | 0.0041 | — | — | — | — | — | — | — | — |
| 305 | — | — | 0.0050 | — | — | — | — | — | — | — |
| 306 | — | — | — | 0.0046 | — | — | — | — | — | — |
| 307 | — | — | — | — | 0.0041 | — | — | — | — | — |
| 308 | — | — | — | — | — | 0.0047 | — | — | — | — |
| 309 | — | — | — | — | — | — | 0.0044 | — | — | — |
| 310 | — | — | — | — | — | — | — | 0.0042 | — | — |
| 311 | — | — | — | — | — | — | — | — | — | — |
| 312 | — | — | — | — | — | — | — | — | — | — |
| 313 | — | — | — | — | — | — | — | — | — | — |
| 314 | — | — | — | — | — | — | — | — | — | — |
| 315 | — | — | — | — | — | — | — | — | 0.10 | — |
| 316 | — | — | — | — | — | — | — | — | — | 3.0 |
| 317 | — | — | — | — | — | — | — | — | — | — |
| 318 | — | — | — | — | — | — | — | — | — | — |
| 319 | — | — | — | — | — | — | — | — | — | — |
| 320 | — | — | — | — | — | — | — | — | — | — |
| 321 | — | — | — | — | — | — | — | — | — | — |
| 322 | — | — | — | — | — | — | — | — | — | — |
| 323 | — | — | — | — | — | — | — | — | — | — |
| 324 | — | — | — | — | — | — | — | — | — | — |
| 325 | — | — | — | — | — | — | — | — | — | — |
| 326 | — | — | — | — | — | — | — | — | — | — |
| 327 | — | — | — | — | — | — | — | — | — | — |
| 328 | — | — | — | — | — | — | — | — | — | — |
| 329 | — | — | — | — | — | — | — | — | <u>0.50</u> | — |
| 330 | — | — | — | — | — | — | — | — | — | <u>11.0</u> |
| 331 | — | — | — | — | — | — | — | — | — | — |
| 332 | — | — | — | — | — | — | — | — | — | — |
| 333 | — | — | — | — | — | — | — | — | — | — |
| 334 | — | — | — | — | — | — | — | — | — | — |
| 335 | — | — | — | — | — | — | — | — | — | — |
| 336 | — | — | — | — | — | — | — | — | — | — |
| 337 | — | — | — | — | — | — | — | — | — | — |
| 338 | — | — | — | — | — | — | — | — | — | — |
| 339 | — | — | — | — | — | — | — | — | — | — |
| 340 | — | — | — | — | — | — | — | — | — | — |
| 341 | — | — | — | — | — | — | — | — | — | — |
| 342 | — | — | — | — | — | — | — | — | — | — |

TABLE 5-continued

| No. | | | | | | | | | | |
|---|---|---|---|---|---|---|---|---|---|---|
| 343 | — | — | — | — | — | — | — | — | — | — |
| 344 | — | — | — | — | — | — | — | — | — | — |

TABLE 6

| No. | Q | Sheet thickness mm | Grain size μm | {100} intensity | Number of Cu Particles (<100 nm)/10 μm² | TS MPa | EL % | W10/400 W/kg | B50 T | Note |
|---|---|---|---|---|---|---|---|---|---|---|
| 301 | 3.33 | 0.20 | 79 | 2.9 | 92 | 600 | 14 | 10.5 | 1.65 | Invention Example |
| 302 | 3.40 | 0.20 | 78 | 2.9 | 95 | 600 | 12 | 10.2 | 1.64 | Invention Example |
| 303 | 3.37 | 0.20 | 80 | 2.7 | 106 | 610 | 12 | 10.3 | 1.64 | Invention Example |
| 304 | 3.36 | 0.20 | 79 | 3.0 | 91 | 610 | 12 | 10.4 | 1.64 | Invention Example |
| 305 | 3.39 | 0.20 | 80 | 2.8 | 99 | 610 | 15 | 10.6 | 1.65 | Invention Example |
| 306 | 3.29 | 0.20 | 80 | 2.8 | 92 | 600 | 13 | 10.4 | 1.65 | Invention Example |
| 307 | 3.43 | 0.20 | 78 | 2.8 | 104 | 610 | 13 | 10.0 | 1.65 | Invention Example |
| 308 | 3.37 | 0.20 | 78 | 3.0 | 109 | 600 | 14 | 10.0 | 1.65 | Invention Example |
| 309 | 3.38 | 0.20 | 79 | 2.8 | 95 | 610 | 14 | 10.0 | 1.65 | Invention Example |
| 310 | 3.29 | 0.20 | 78 | 3.0 | 93 | 610 | 12 | 10.1 | 1.65 | Invention Example |
| 311 | 3.27 | 0.20 | 40 | 2.8 | 98 | 630 | 12 | 11.8 | 1.64 | Comparative Example |
| 312 | 3.39 | 0.20 | 79 | 2.8 | 3 | 490 | 12 | 10.2 | 1.65 | Comparative Example |
| 313 | 3.42 | | | | Fractured | | | | | Comparative Example |
| 314 | 3.47 | 0.20 | 78 | 2.8 | 104 | 630 | 14 | 10.3 | 1.65 | Invention Example |
| 315 | 3.38 | 0.20 | 79 | 2.8 | 105 | 620 | 12 | 10.3 | 1.64 | Invention Example |
| 316 | 3.38 | 0.20 | 79 | 2.9 | 99 | 620 | 12 | 10.5 | 1.65 | Invention Example |
| 317 | 3.36 | 0.65 | 79 | 2.7 | 93 | 630 | 14 | 51.3 | 1.65 | Comparative Example |
| 318 | 1.93 | 0.20 | 93 | 0.2 | 40 | 560 | 14 | 12.7 | 1.63 | Comparative Example |
| 319 | 3.32 | 0.20 | 83 | 2.7 | 98 | 620 | 13 | 10.4 | 1.65 | Invention Example |
| 320 | 2.00 | 0.20 | 84 | 2.7 | 102 | 580 | 17 | 12.4 | 1.74 | Comparative Example |
| 321 | 4.87 | 0.20 | | | Fractured | | | | | Comparative Example |
| 322 | 3.56 | 0.20 | 60 | 2.7 | 101 | 640 | 18 | 15.4 | 1.64 | Comparative Example |
| 323 | 1.00 | 0.20 | 40 | 2.8 | 102 | 680 | 14 | 15.2 | 1.62 | Comparative Example |
| 324 | 9.75 | 0.20 | | | Fractured | | | | | Comparative Example |
| 325 | 3.31 | 0.20 | 82 | 2.9 | 99 | 580 | 16 | 10.3 | 1.62 | Comparative Example |
| 326 | 3.38 | 0.20 | | | Fractured | | | | | Comparative Example |
| 327 | 3.48 | 0.20 | 40 | 2.7 | 101 | 690 | 15 | 15.1 | 1.66 | Comparative Example |
| 328 | 3.32 | 0.20 | 83 | 2.8 | 102 | 630 | 15 | 15 | 1.65 | Comparative Example |
| 329 | 3.32 | 0.20 | | | Fractured | | | | | Comparative Example |
| 330 | 3.45 | 0.20 | 82 | 2.9 | 96 | 670 | 9 | 12.5 | 1.60 | Comparative Example |
| 331 | 3.43 | 0.20 | 303 | 2.8 | 97 | 580 | 8 | 11.5 | 1.66 | Comparative Example |
| 332 | 2.52 | 0.20 | 81 | 2.8 | 98 | 630 | 14 | 9.9 | 1.63 | Invention Example |
| 333 | 5.80 | 0.20 | 82 | 2.8 | 99 | 650 | 13 | 9.8 | 1.63 | Invention Example |
| 334 | 3.37 | 0.20 | 80 | 2.7 | 99 | 670 | 14 | 10.4 | 1.66 | Invention Example |
| 335 | 3.33 | 0.20 | 84 | 2.8 | 250 | 720 | 15 | 10.3 | 1.63 | Invention Example |
| 336 | 3.42 | 0.20 | 83 | 2.8 | 97 | 680 | 14 | 9.9 | 1.65 | Invention Example |
| 337 | 3.36 | 0.20 | 151 | 2.8 | 98 | 590 | 12 | 9.8 | 1.66 | Invention Example |
| 338 | 3.41 | 0.20 | 83 | 2.8 | 108 | 610 | 14 | 10.5 | 1.65 | Invention Example |
| 339 | 2.95 | 0.20 | 73 | 2.8 | 100 | 600 | 15 | 11.0 | 1.65 | Invention Example |
| 340 | 8.66 | 0.20 | 82 | 2.8 | 97 | 700 | 15 | 9.6 | 1.63 | Invention Example |
| 341 | 4.39 | 0.20 | 81 | 2.7 | 98 | 660 | 13 | 9.7 | 1.63 | Invention Example |
| 342 | 2.26 | 0.20 | 79 | 2.9 | 107 | 750 | 14 | 9.3 | 1.63 | Invention Example |
| 343 | 3.46 | 0.20 | 83 | 2.8 | 499 | 790 | 13 | 10.4 | 1.63 | Invention Example |
| 344 | 3.32 | 0.20 | 80 | 2.9 | 102 | 760 | 15 | 9.5 | 1.63 | Invention Example |

As shown in Tables 5 and 6, in Sample Nos. 301 to 310, Nos. 314 to 316, No. 319, and Nos. 332 to 344, since the chemical composition was within the range of the present invention and other conditions were within the ranges of the present invention, good results were obtained in magnetic characteristics and mechanical properties.

In Sample No. 311, since substantially no coarse precipitate forming element was contained, the iron loss W10/400 was high.

In Sample No. 312, since the Cu content was too small, the tensile strength (TS) was insufficient.

In Sample No. 313, since the Cu content was too large, fracture had occurred during the test.

In Sample No. 317, since the sheet thickness was too thick, the iron loss W10/400 was high.

In Sample No. 318, since Al was not contained in a specified amount and the parameter Q was less than 2.00, the tensile strength (TS) was low, and the iron loss W10/400 was high.

In Sample No. 320, since the Si content was small, the iron loss W10/400 was high.

In Sample No. 321, since the Si content was large, fracture had occurred during the test.

In Sample No. 322, since the Mn content was small, the iron loss W10/400 was high.

In Sample No. 323, since the Mn content was large, the iron loss W10/400 was high, and as a result, the magnetic flux density B50 was inferior.

In Sample No. 324, since the Al content was large, fracture had occurred during the test.

In Sample No. 325, since the P content was small, the tensile strength (TS) was low, and as a result, the magnetic flux density B50 was inferior.

In Sample No. 326, since the P content was large, fracture had occurred during the test.

In Sample No. 327, since the S content was large, the iron loss W10/400 was high.

In Sample No. 328, since the Mg content was large, the iron loss W10/400 was high.

In Sample No. 329, since the Sn content was too large, fracture had occurred during the test.

In Sample No. 330, since the Cr content was too large, the total elongation EL was low, the iron loss W10/400 was high, and as a result, the magnetic flux density B50 was inferior.

In Sample No. 331, since the average grain size was large, the tensile strength (TS) and the total elongation EL were low, and the iron loss W10/400 was high.

(Fourth Test)

In a fourth test, a 30 mm thick slab having the chemical composition shown in Table 7 was prepared.

Next, the slab was subjected to hot rolling to produce a hot-rolled sheet having a thickness of 2.0 mm A slab reheating temperature at this time was 1200° C., a finishing temperature was 850° C., and a winding temperature was 650° C. Thereafter, scale on the surface layer was removed by pickling. Thereafter, the hot-rolled sheet was cold-rolled to 0.20 mm.

By variously changing manufacturing conditions, non-oriented electrical steel sheets having different {100} crystal orientation intensities I were produced. For each of the non-oriented electrical steel sheets, the number of particles of simple Cu having a diameter of less than 100 nm per 10 µm², the {100} crystal orientation intensity I, and the average grain size r were measured. The results are shown in Table 8.

In addition, the iron loss W10/400, the magnetic flux density, the tensile strength (TS), and the total elongation (EL) were also measured by the same procedure as in the first test. The results are shown in Table 8.

TABLE 7

| No. | C mass % | Si mass % | Mn mass % | Al mass % | P mass % | S mass % | Mg mass % | Cu mass % | Ni mass % |
|---|---|---|---|---|---|---|---|---|---|
| 401 | 0.0021 | 2.97 | 0.22 | 0.26 | 0.014 | 0.0013 | 0.0045 | 1.5 | 0.01 |
| 402 | 0.0020 | 2.98 | 0.24 | 0.33 | 0.015 | 0.0014 | 0.0046 | 1.5 | 0.05 |
| 403 | 0.0019 | 2.99 | 0.22 | 0.33 | 0.014 | 0.0014 | 0.0045 | 1.5 | 0.12 |
| 404 | 0.0020 | 2.96 | 0.23 | 0.32 | 0.015 | 0.0014 | 0.0042 | 1.5 | 0.20 |
| 405 | 0.0020 | 2.95 | 0.16 | 0.31 | 0.014 | 0.0014 | 0.0043 | 1.6 | 0.52 |
| 406 | 0.0020 | 2.95 | 0.17 | 0.29 | 0.014 | 0.0014 | 0.0047 | 1.5 | 1.02 |
| 407 | 0.0021 | 2.95 | 0.19 | 0.29 | 0.015 | 0.0013 | 0.0041 | 1.5 | 1.53 |
| 408 | 0.0021 | 2.97 | 0.18 | 0.34 | 0.013 | 0.0015 | 0.0043 | 1.5 | 3.01 |
| 409 | 0.0021 | 2.97 | 0.16 | 0.29 | 0.015 | 0.0014 | 0.0046 | 1.5 | 5.01 |
| 410 | 0.0020 | 2.98 | 0.18 | 0.25 | 0.013 | 0.0013 | 0.0044 | 1.5 | 0.01 |
| 411 | 0.0019 | 2.96 | 0.20 | 0.32 | 0.013 | 0.0014 | 0.0042 | 1.5 | 0.05 |
| 412 | 0.0019 | 2.97 | 0.17 | 0.34 | 0.014 | 0.0014 | 0.0041 | 1.6 | 0.12 |
| 413 | 0.0019 | 2.99 | 0.19 | 0.34 | 0.014 | 0.0014 | 0.0041 | 1.6 | 0.23 |
| 414 | 0.0020 | 2.95 | 0.18 | 0.32 | 0.014 | 0.0013 | 0.0048 | 1.5 | 0.50 |
| 415 | 0.0020 | 2.96 | 0.24 | 0.28 | 0.013 | 0.0013 | 0.0047 | 1.6 | 1.03 |
| 416 | 0.0019 | 2.96 | 0.17 | 0.29 | 0.013 | 0.0013 | 0.0047 | 1.6 | 1.52 |
| 417 | 0.0019 | 2.97 | 0.22 | 0.28 | 0.015 | 0.0015 | 0.0048 | 1.5 | 3.01 |
| 418 | 0.0020 | 2.98 | 0.21 | 0.27 | 0.014 | 0.0014 | 0.0049 | 1.6 | 5.00 |
| 419 | 0.0020 | 2.99 | 0.16 | 0.31 | 0.015 | 0.0014 | — | 1.5 | 0.01 |
| 420 | 0.0020 | 2.95 | 0.20 | 0.31 | 0.014 | 0.0013 | — | 1.5 | 0.05 |
| 421 | 0.0020 | 2.98 | 0.23 | 0.31 | 0.014 | 0.0014 | — | 1.5 | 0.10 |
| 422 | 0.0020 | 2.97 | 0.25 | 0.29 | 0.014 | 0.0015 | — | 1.5 | 0.21 |
| 423 | 0.0020 | 2.96 | 0.20 | 0.28 | 0.014 | 0.0013 | — | 1.6 | 0.53 |
| 424 | 0.0020 | 2.99 | 0.18 | 0.35 | 0.014 | 0.0014 | — | 1.5 | 1.00 |
| 425 | 0.0020 | 2.98 | 0.19 | 0.34 | 0.013 | 0.0014 | — | 1.5 | 1.51 |
| 426 | 0.0019 | 2.97 | 0.18 | 0.31 | 0.015 | 0.0013 | — | 1.6 | 3.02 |
| 427 | 0.0020 | 2.98 | 0.21 | 0.30 | 0.014 | 0.0014 | — | 1.5 | 5.02 |
| 428 | 0.0020 | 2.99 | 0.17 | 0.31 | 0.015 | 0.0015 | 0.0050 | 0.1 | 0.01 |
| 429 | 0.0020 | 2.97 | 0.19 | 0.32 | 0.015 | 0.0014 | 0.0043 | 0.1 | 0.05 |
| 430 | 0.0019 | 2.96 | 0.19 | 0.33 | 0.014 | 0.0015 | 0.0047 | 0.1 | 0.10 |
| 431 | 0.0019 | 2.96 | 0.23 | 0.31 | 0.014 | 0.0014 | 0.0046 | 0.1 | 0.23 |
| 432 | 0.0019 | 2.96 | 0.22 | 0.29 | 0.014 | 0.0014 | 0.0043 | 0.1 | 0.53 |
| 433 | 0.0019 | 2.98 | 0.15 | 0.27 | 0.013 | 0.0013 | 0.0047 | 0.1 | 1.01 |
| 434 | 0.0020 | 2.96 | 0.20 | 0.27 | 0.014 | 0.0014 | 0.0044 | 0.1 | 1.51 |
| 435 | 0.0020 | 2.96 | 0.20 | 0.30 | 0.015 | 0.0014 | 0.0044 | 0.1 | 3.02 |
| 436 | 0.0020 | 2.98 | 0.16 | 0.32 | 0.014 | 0.0013 | 0.0045 | 0.1 | 5.01 |
| 437 | 0.0019 | 2.98 | 0.20 | 0.28 | 0.013 | 0.0014 | 0.0044 | 0.1 | 0.01 |
| 438 | 0.0019 | 2.98 | 0.21 | 0.33 | 0.014 | 0.0014 | 0.0042 | 0.1 | 0.05 |
| 439 | 0.0020 | 2.98 | 0.16 | 0.29 | 0.015 | 0.0015 | 0.0049 | 0.1 | 0.12 |
| 440 | 0.0019 | 2.95 | 0.22 | 0.31 | 0.014 | 0.0014 | 0.0046 | 0.1 | 0.20 |
| 441 | 0.0019 | 2.98 | 0.20 | 0.26 | 0.013 | 0.0014 | 0.0040 | 0.1 | 0.53 |
| 442 | 0.0020 | 2.99 | 0.17 | 0.34 | 0.014 | 0.0014 | 0.0045 | 0.1 | 1.03 |
| 443 | 0.0020 | 2.96 | 0.23 | 0.29 | 0.015 | 0.0014 | 0.0049 | 0.1 | 1.51 |
| 444 | 0.0019 | 2.96 | 0.20 | 0.27 | 0.014 | 0.0014 | 0.0041 | 0.1 | 3.03 |
| 445 | 0.0019 | 2.99 | 0.25 | 0.26 | 0.014 | 0.0014 | 0.0046 | 0.1 | 5.01 |
| 446 | 0.0020 | 2.95 | 0.24 | 0.31 | 0.014 | 0.0013 | — | 0.1 | 0.01 |
| 447 | 0.0021 | 2.97 | 0.20 | 0.28 | 0.014 | 0.0014 | — | 0.1 | 0.05 |
| 448 | 0.0020 | 2.98 | 0.18 | 0.31 | 0.014 | 0.0014 | — | 0.1 | 0.12 |
| 449 | 0.0019 | 2.98 | 0.16 | 0.26 | 0.015 | 0.0014 | — | 0.1 | 0.21 |
| 450 | 0.0019 | 2.97 | 0.18 | 0.25 | 0.015 | 0.0013 | — | 0.1 | 0.53 |
| 451 | 0.0021 | 2.95 | 0.21 | 0.30 | 0.014 | 0.0014 | — | 0.1 | 1.02 |

TABLE 7-continued

| No. | C mass % | Si mass % | Mn mass % | Al mass % | P mass % | S mass % | Mg mass % | Cu mass % | Ni mass % |
|---|---|---|---|---|---|---|---|---|---|
| 452 | 0.0020 | 2.97 | 0.24 | 0.34 | 0.013 | 0.0014 | — | 0.1 | 1.51 |
| 453 | 0.0021 | 2.99 | 0.18 | 0.34 | 0.015 | 0.0013 | — | 0.1 | 3.02 |
| 454 | 0.0019 | 2.96 | 0.22 | 0.27 | 0.014 | 0.0014 | — | 0.1 | 5.03 |
| 455 | 0.0020 | 1.51 | 0.15 | 0.32 | 0.012 | 0.0016 | 0.0041 | 1.6 | 0.11 |
| 456 | 0.0019 | 4.53 | 0.21 | 0.31 | 0.013 | 0.0014 | 0.0054 | 1.5 | 0.10 |
| 457 | 0.0021 | 2.95 | 0.06 | 0.30 | 0.012 | 0.0015 | 0.0049 | 1.6 | 0.11 |
| 458 | 0.0020 | 2.97 | 2.52 | 0.31 | 0.011 | 0.0014 | 0.0054 | 1.6 | 0.12 |
| 459 | 0.0019 | 2.98 | 0.23 | 3.51 | 0.013 | 0.0015 | 0.0044 | 1.5 | 0.12 |
| 460 | 0.0018 | 2.97 | 0.18 | 0.26 | 0.001 | 0.0016 | 0.0042 | 1.5 | 0.11 |
| 461 | 0.0019 | 2.99 | 0.21 | 0.32 | 0.302 | 0.0014 | 0.0045 | 1.5 | 0.11 |
| 462 | 0.0020 | 2.99 | 0.18 | 0.27 | 0.013 | 0.0046 | 0.0042 | 1.5 | 0.11 |
| 463 | 0.0022 | 2.98 | 0.21 | 0.26 | 0.012 | 0.0013 | 0.0200 | 1.5 | 0.11 |
| 464 | 0.0020 | 2.96 | 0.24 | 0.33 | 0.012 | 0.0016 | 0.0045 | 1.6 | 0.11 |
| 465 | 0.0019 | 2.95 | 1.01 | 0.30 | 0.012 | 0.0016 | 0.0045 | 1.5 | 0.11 |
| 466 | 0.0019 | 2.96 | 0.23 | 1.54 | 0.013 | 0.0015 | 0.0053 | 1.5 | 0.12 |
| 467 | 0.0020 | 2.98 | 0.24 | 0.29 | 0.100 | 0.0016 | 0.0050 | 1.6 | 0.12 |
| 468 | 0.0020 | 2.98 | 0.24 | 0.26 | 0.013 | 0.0013 | 0.0050 | 1.8 | 0.11 |
| 469 | 0.0021 | 2.98 | 0.16 | 0.31 | 0.013 | 0.0015 | 0.0044 | 1.5 | 1.54 |
| 470 | 0.0021 | 2.98 | 0.19 | 0.30 | 0.011 | 0.0015 | 0.0053 | 1.5 | 0.11 |

TABLE 8

| No. | Q | Sheet thickness mm | Grain size μm | {100} intensity | Number or Cu particles (<100 nm)/10 μm² | TS MPa | EL % | W10/400 W/kg | B50 T | Note |
|---|---|---|---|---|---|---|---|---|---|---|
| 401 | 3.27 | 0.20 | 82 | 2.8 | 104 | 600 | 3 | 10.6 | 1.65 | Comparative Example |
| 402 | 3.40 | 0.20 | 81 | 2.8 | 103 | 600 | 6 | 10.5 | 1.64 | Comparative Example |
| 403 | 3.43 | 0.20 | 82 | 2.8 | 105 | 610 | 13 | 10.4 | 1.65 | Invention Example |
| 404 | 3.37 | 0.20 | 84 | 2.9 | 99 | 610 | 15 | 10.5 | 1.64 | Invention Example |
| 405 | 3.41 | 0.20 | 80 | 2.8 | 107 | 610 | 17 | 10.3 | 1.64 | Invention Example |
| 406 | 3.36 | 0.20 | 82 | 2.9 | 102 | 610 | 19 | 10.3 | 1.65 | Invention Example |
| 407 | 3.34 | 0.20 | 82 | 2.8 | 100 | 630 | 18 | 10.5 | 1.65 | Invention Example |
| 408 | 3.47 | 0.20 | 81 | 2.7 | 99 | 640 | 14 | 10.5 | 1.64 | Invention Example |
| 409 | 3.39 | 0.20 | 84 | 2.8 | 104 | 650 | 8 | 10.4 | 1.65 | Comparative Example |
| 410 | 3.30 | 0.20 | 81 | 1.8 | 108 | 600 | 13 | 10.4 | 1.59 | Comparative Example |
| 411 | 3.40 | 0.20 | 83 | 1.7 | 107 | 610 | 13 | 10.4 | 1.59 | Comparative Example |
| 412 | 3.48 | 0.20 | 83 | 1.8 | 101 | 610 | 14 | 10.6 | 1.59 | Comparative Example |
| 413 | 3.48 | 0.20 | 81 | 1.9 | 102 | 610 | 18 | 10.4 | 1.60 | Comparative Example |
| 414 | 3.41 | 0.20 | 84 | 1.8 | 101 | 600 | 18 | 10.4 | 1.59 | Comparative Example |
| 415 | 3.28 | 0.20 | 83 | 1.8 | 99 | 600 | 20 | 10.4 | 1.59 | Comparative Example |
| 416 | 3.37 | 0.20 | 85 | 1.8 | 101 | 620 | 20 | 10.4 | 1.60 | Comparative Example |
| 417 | 3.31 | 0 20 | 80 | 1.8 | 105 | 630 | 18 | 10.4 | 1.59 | Comparative Example |
| 418 | 3.31 | 0.20 | 84 | 1.9 | 99 | 660 | 10 | 10.5 | 1.60 | Comparative Example |
| 419 | 3.45 | 0.20 | 80 | 2.9 | 95 | 610 | 12 | 11.6 | 1.64 | Comparative Example |
| 420 | 3.37 | 0.20 | 84 | 2.9 | 109 | 600 | 13 | 11.4 | 1.64 | Comparative Example |
| 421 | 3.37 | 0.20 | 83 | 2.8 | 104 | 610 | 15 | 11.6 | 1.65 | Comparative Example |
| 422 | 3.30 | 0.20 | 82 | 2.9 | 106 | 600 | 17 | 11.6 | 1.64 | Comparative Example |
| 423 | 3.32 | 0.20 | 82 | 2.9 | 98 | 610 | 19 | 11.3 | 1.64 | Comparative Example |
| 424 | 3.51 | 0.20 | 84 | 2.8 | 107 | 620 | 19 | 11.4 | 1.65 | Comparative Example |
| 425 | 3.47 | 0.20 | 85 | 2.8 | 99 | 630 | 19 | 11.4 | 1.64 | Comparative Example |
| 426 | 3.41 | 0.20 | 83 | 2.9 | 106 | 640 | 15 | 11.4 | 1.65 | Comparative Example |
| 427 | 3.37 | 0.20 | 82 | 2.8 | 96 | 660 | 10 | 11.5 | 1.64 | Comparative Example |
| 428 | 3.44 | 0.20 | 82 | 1.8 | 2 | 510 | 17 | 10.5 | 1.60 | Comparative Example |
| 429 | 3.42 | 0.20 | 85 | 1.7 | 1 | 490 | 18 | 10.6 | 1.60 | Comparative Example |
| 430 | 3.43 | 0.20 | 84 | 1.8 | 2 | 490 | 20 | 10.4 | 1.59 | Comparative Example |
| 431 | 3.35 | 0.20 | 81 | 1.8 | 2 | 500 | 20 | 10.4 | 1.59 | Comparative Example |
| 432 | 3.32 | 0.20 | 80 | 1.8 | 0 | 500 | 21 | 10.6 | 1.59 | Comparative Example |
| 433 | 3.37 | 0.20 | 85 | 1.8 | 2 | 510 | 20 | 10.3 | 1.59 | Comparative Example |
| 434 | 3.30 | 0.20 | 85 | 1.9 | 1 | 510 | 18 | 10.4 | 1.59 | Comparative Example |
| 435 | 3.36 | 0.20 | 80 | 1.8 | 0 | 520 | 16 | 10.6 | 1.59 | Comparative Example |
| 436 | 3.46 | 0.20 | 82 | 1.8 | 2 | 540 | 9 | 10.6 | 1.59 | Comparative Example |
| 437 | 3.34 | 0.20 | 83 | 2.8 | 1 | 490 | 19 | 10.5 | 1.65 | Comparative Example |
| 438 | 3.43 | 0.20 | 84 | 2.8 | 2 | 500 | 20 | 10.6 | 1.65 | Comparative Example |
| 439 | 3.40 | 0.20 | 83 | 2.8 | 1 | 500 | 19 | 10.5 | 1.65 | Comparative Example |
| 440 | 3.35 | 0.20 | 82 | 2.8 | 1 | 500 | 21 | 10.5 | 1.65 | Comparative Example |
| 441 | 3.30 | 0.20 | 82 | 2.8 | 2 | 500 | 21 | 10.4 | 1.65 | Comparative Example |
| 442 | 3.50 | 0.20 | 84 | 2.8 | 0 | 510 | 20 | 10.6 | 1.64 | Comparative Example |
| 443 | 3.31 | 0.20 | 82 | 2.7 | 0 | 510 | 19 | 10.5 | 1.64 | Comparative Example |
| 444 | 3.30 | 0.20 | 82 | 2.8 | 1 | 530 | 15 | 10.5 | 1.64 | Comparative Example |
| 445 | 3.26 | 0.20 | 80 | 2.9 | 2 | 550 | 9 | 10.5 | 1.64 | Comparative Example |
| 446 | 3.33 | 0.20 | 80 | 1.7 | 2 | 490 | 20 | 11.6 | 1.59 | Comparative Example |
| 447 | 3.33 | 0.20 | 82 | 1.7 | 1 | 500 | 20 | 11.5 | 1.59 | Comparative Example |
| 448 | 3.42 | 0.20 | 82 | 1.7 | 2 | 490 | 19 | 11.3 | 1.59 | Comparative Example |

TABLE 8-continued

| No. | Q | Sheet thickness mm | Grain size μm | {100} intensity | Number or Cu particles (<100 nm)/10 μm² | TS MPa | EL % | W10/400 W/kg | B50 T | Note |
|---|---|---|---|---|---|---|---|---|---|---|
| 449 | 3.34 | 0.20 | 81 | 1.7 | 1 | 500 | 20 | 11.5 | 1.59 | Comparative Example |
| 450 | 3.29 | 0.20 | 84 | 1.7 | 2 | 490 | 20 | 11.4 | 1.59 | Comparative Example |
| 451 | 3.34 | 0.20 | 85 | 1.7 | 1 | 510 | 21 | 11.3 | 1.59 | Comparative Example |
| 452 | 3.41 | 0.20 | 81 | 1.7 | 1 | 520 | 19 | 11.3 | 1.60 | Comparative Example |
| 453 | 3.49 | 0.20 | 84 | 1.7 | 1 | 520 | 17 | 11.6 | 1.60 | Comparative Example |
| 454 | 3.28 | 0.20 | 84 | 1.9 | 0 | 550 | 9 | 11.5 | 1.60 | Comparative Example |
| 455 | 2.08 | 0.20 | 84 | 2.7 | 104 | 580 | 17 | 12.3 | 1.74 | Comparative Example |
| 456 | 4.94 | 0.20 | | | Fractured | | | | | Comparative Example |
| 457 | 3.49 | 0.20 | 60 | 2.8 | 101 | 640 | 18 | 15.2 | 1.64 | Comparative Example |
| 458 | 1.07 | 0.20 | 40 | 2.8 | 103 | 680 | 14 | 15.5 | 1.62 | Comparative Example |
| 459 | 9.77 | 0.20 | | | Fractured | | | | | Comparative Example |
| 460 | 3.31 | 0.20 | 80 | 2.9 | 103 | 580 | 16 | 10.3 | 1.62 | Comparative Example |
| 461 | 3.42 | 0.20 | | | Fractured | | | | | Comparative Example |
| 462 | 3.35 | 0.20 | 40 | 2.9 | 104 | 690 | 15 | 15.1 | 1.66 | Comparative Example |
| 463 | 3.29 | 0.20 | 82 | 2.8 | 101 | 630 | 15 | 15.0 | 1.65 | Comparative Example |
| 464 | 3.38 | 0.20 | 302 | 2.8 | 100 | 580 | 8 | 11.8 | 1.66 | Comparative Example |
| 465 | 2.54 | 0.20 | 84 | 2.8 | 105 | 630 | 14 | 9.7 | 1.63 | Invention Example |
| 466 | 5.81 | 0.20 | 83 | 2.7 | 104 | 650 | 13 | 9.8 | 1.63 | Invention Example |
| 467 | 3.32 | 0.20 | 80 | 2.7 | 95 | 670 | 14 | 10.4 | 1.65 | Invention Example |
| 468 | 3.26 | 0.20 | 83 | 2.8 | 254 | 720 | 15 | 10.4 | 1.64 | Invention Example |
| 469 | 3.44 | 0.20 | 81 | 2.7 | 101 | 680 | 4 | 9.8 | 1.66 | Invention Example |
| 470 | 3.39 | 0.20 | 153 | 2.9 | 96 | 590 | 2 | 9.7 | 1.66 | Invention Example |

As shown in Tables 7 and 8, in Sample Nos. 403 to 408, and Nos. 465 to 470, since the chemical composition was within the range of the present invention and other conditions were within the ranges of the present invention, good results were obtained in magnetic characteristics and mechanical properties.

In Sample Nos. 401 and 402, since the Ni content was too small, the total elongation (EL) was insufficient.

In Sample No. 409, since the Ni content was too large, the total elongation (EL) was insufficient.

In Sample Nos. 410 to 418, since the {100} crystal orientation intensity I was too low, the magnetic flux density B50 was insufficient.

In Sample Nos. 419 to 427, since substantially no coarse precipitate forming element was contained, the iron loss W10/400 was deteriorated.

In Sample Nos. 428 to 436, since the Cu content was too small and the {100} crystal orientation intensity I was too low, the tensile strength (TS) and the magnetic flux density B50 were insufficient.

In Sample Nos. 437 to 445, since the Cu content was too small, the tensile strength (TS) was insufficient.

In Sample Nos. 446 to 454, since substantially no coarse precipitate forming element was contained and the Cu content was too small, the iron loss W10/400 was deteriorated, and the tensile strength (TS) and the magnetic flux density B50 were insufficient.

In Sample No. 455, since the Si content was small, the iron loss W10/400 was high.

In Sample No. 456, since the Si content was large, fracture had occurred during the test.

In Sample No. 457, since the Mn content was small, the iron loss W10/400 was high.

In Sample No. 458, since the Mn content was large, the iron loss W10/400 was high, and as a result, the magnetic flux density B50 was inferior.

In Sample No. 459, since the Al content was large, fracture had occurred during the test.

In Sample No. 460, since the P content was small, the tensile strength (TS) was low, and as a result, the magnetic flux density B50 was inferior.

In Sample No. 461, since the P content was large, fracture had occurred during the test.

In Sample No. 462, since the S content was large, the iron loss W10/400 was high.

In Sample No. 463, since the Mg content was large, the iron loss W10/400 was high.

In Sample No. 464, since the average grain size was large, the tensile strength (TS) and the total elongation EL were low, and the iron loss W10/400 was high.

(Fifth Test)

A 250 mm thick slab having the chemical composition shown in Table 9 was prepared. Next, the slab was subjected to hot rolling to produce hot-rolled sheets having a thickness of 6.5 mm and a thickness of 2.0 mm, respectively.

A slab reheating temperature was 1200° C., a finishing temperature was 850° C., and a winding temperature was 650° C. During the hot rolling, lubrication rolling was performed by adding 10% of oil to the cooling water. After annealing the hot-rolled sheets at 950° C. for 1 minute, scale on the surface layer was removed by pickling.

Thereafter, the hot-rolled sheets were cold-rolled to 0.65 mm and 0.20 mm, respectively. A cold rolling reduction was set to 90% for any of the hot-rolled sheets. In final annealing, the steel strip was heated at a temperature rising rate of 20° C./sec, and after 1000° C. was reached, soaked for 15 seconds and air-cooled. Furthermore, as a Cu precipitation treatment, the steel sheet was heated to 600° C., soaked for 1 minute, and then air-cooled.

In Sample No. 512, the Cu precipitation treatment was omitted.

For each of the non-oriented electrical steel sheets, the number of particles of simple Cu having a diameter of less than 100 nm per 10 μm², the {100} crystal orientation intensity I, and the average grain size r were measured. The results are shown in Table 10. In addition, the iron loss W10/400, the magnetic flux density, the tensile strength (TS), and the total elongation (EL) were also measured by the same procedure as in the first test. The results are shown in Table 10.

TABLE 9

| No. | C mass % | Si mass % | Mn mass % | Al mass % | P mass % | S mass % | Cu mass % | Ni mass % | Mg mass % | Ca mass % |
|---|---|---|---|---|---|---|---|---|---|---|
| 501 | 0.0021 | 2.95 | 0.17 | 0.33 | 0.012 | 0.0016 | 1.4 | 0.12 | 0.0052 | — |
| 502 | 0.0021 | 2.98 | 0.23 | 0.28 | 0.012 | 0.0015 | 1.4 | 0.10 | — | 0.0048 |
| 503 | 0.0020 | 2.96 | 0.22 | 0.30 | 0.011 | 0.0014 | 1.5 | 0.11 | — | — |
| 504 | 0.0020 | 2.97 | 0.19 | 0.29 | 0.011 | 0.0014 | 1.5 | 0.11 | — | — |
| 505 | 0.0021 | 2.96 | 0.24 | 0.28 | 0.011 | 0.0017 | 1.5 | 0.12 | — | — |
| 506 | 0.0019 | 2.95 | 0.21 | 0.30 | 0.011 | 0.0015 | 1.5 | 0.12 | — | — |
| 507 | 0.0021 | 2.97 | 0.16 | 0.33 | 0.012 | 0.0015 | 1.5 | 0.12 | — | — |
| 508 | 0.0019 | 2.95 | 0.21 | 0.20 | 0.012 | 0.0015 | 1.5 | 0.11 | — | — |
| 509 | 0.0019 | 2.97 | 0.17 | 0.31 | 0.011 | 0.0016 | 1.4 | 0.11 | — | — |
| 510 | 0.0020 | 2.97 | 0.23 | 0.34 | 0.012 | 0.0017 | 1.4 | 0.11 | — | — |
| 511 | 0.0019 | 2.98 | 0.18 | 0.30 | 0.012 | 0.0015 | 1.5 | 0.10 | — | — |
| 512 | 0.0021 | 2.98 | 0.24 | 0.33 | 0.013 | 0.0016 | 0.9 | 0.12 | 0.0046 | — |
| 513 | 0.0020 | 2.96 | 0.25 | 0.32 | 0.012 | 0.0015 | 3.2 | 0.12 | 0.0048 | — |
| 514 | 0.0021 | 2.95 | 0.22 | 0.29 | 0.012 | 0.0016 | 1.5 | 0.11 | 0.0047 | — |
| 515 | 0.0019 | 2.97 | 0.23 | 0.28 | 0.011 | 0.0017 | 1.4 | 0.12 | 0.0047 | — |
| 516 | 0.0021 | 2.97 | 0.17 | 0.27 | 0.013 | 0.0016 | 1.5 | 0.11 | 0.0041 | — |
| 517 | 0.0019 | 2.98 | 0.23 | 0.31 | 0.011 | 0.0014 | 1.4 | 0.12 | 0.0047 | — |
| 518 | 0.0020 | 2.02 | 0.10 | — | 0.012 | 0.0015 | 1.5 | 0.11 | 0.0050 | — |
| 519 | 0.0020 | 2.96 | 0.18 | 0.31 | 0.011 | 0.0015 | 1.4 | 0.11 | 0.0040 | 0.0050 |
| 520 | 0.0020 | 1.51 | 0.15 | 0.28 | 0.011 | 0.0015 | 1.5 | 0.10 | 0.0055 | — |
| 521 | 0.0019 | 4.51 | 0.24 | 0.26 | 0.012 | 0.0015 | 1.5 | 0.12 | 0.0050 | — |
| 522 | 0.0019 | 2.97 | 0.08 | 0.28 | 0.012 | 0.0014 | 1.6 | 0.12 | 0.0044 | — |
| 523 | 0.0018 | 2.96 | 2.53 | 0.29 | 0.014 | 0.0013 | 1.5 | 0.10 | 0.0045 | — |
| 524 | 0.0021 | 2.98 | 0.22 | 3.51 | 0.014 | 0.0014 | 1.6 | 0.11 | 0.0046 | — |
| 525 | 0 0022 | 2.98 | 0.20 | 0.34 | 0.001 | 0.0015 | 1.6 | 0.10 | 0.0043 | — |
| 526 | 0.0019 | 2.97 | 0.22 | 0.30 | 0.304 | 0.0014 | 1.6 | 0.12 | 0.0053 | — |
| 527 | 0.0022 | 2.96 | 0.23 | 0.31 | 0.013 | 0.0044 | 1.6 | 0.10 | 0.0052 | — |
| 528 | 0.0020 | 2.95 | 0.21 | 0.33 | 0.013 | 0.0013 | 1.6 | 0.10 | 0.0200 | — |
| 529 | 0.0021 | 2.98 | 0.15 | 0.29 | 0.014 | 0.0015 | 1 6 | 0 11 | 0.0041 | — |
| 530 | 0.0020 | 2.97 | 0.18 | 0.31 | 0.013 | 0.0015 | 1.5 | 0.10 | 0.0053 | — |
| 531 | 0.0020 | 2.96 | 0.19 | 0.34 | 0.013 | 0.0013 | 1.6 | 0.10 | 0.0042 | — |
| 532 | 0.0021 | 2 98 | 1 03 | 0.31 | 0.012 | 0.0016 | 1.5 | 0.12 | 0.0041 | — |
| 533 | 0.0022 | 2.96 | 0.16 | 1.52 | 0.014 | 0.0014 | 1.6 | 0.12 | 0.0053 | — |
| 534 | 0.0019 | 2.97 | 0.17 | 0.34 | 0.101 | 0.0016 | 1.6 | 0.11 | 0.0053 | — |
| 535 | 0.0019 | 2.99 | 0.24 | 0.28 | 0.011 | 0.0015 | 1.8 | 0.10 | 0.0041 | — |
| 536 | 0.0021 | 2.95 | 0.21 | 0.28 | 0.012 | 0.0014 | 1.5 | 1.53 | 0.0046 | — |
| 537 | 0.0019 | 2.98 | 0.21 | 0.33 | 0.011 | 0.0015 | 1.5 | 0.11 | 0.0049 | — |
| 538 | 0.0030 | 2.95 | 0.19 | 0.33 | 0.011 | 0.0014 | 1.4 | 0.11 | 0.0043 | — |
| 539 | 0.0019 | 2.96 | 0.22 | 0.10 | 0.012 | 0.0015 | 1.6 | 0.12 | 0.0052 | — |
| 540 | 0.0021 | 2.96 | 0.21 | 2.95 | 0.012 | 0.0013 | 1.4 | 0.10 | 0.0049 | — |
| 541 | 0.0019 | 3.94 | 0.18 | 0.32 | 0.012 | 0.0016 | 1.6 | 0.11 | 0.0049 | — |
| 542 | 0.0021 | 3.51 | 1.92 | 0.31 | 0.012 | 0.0014 | 1.4 | 0.12 | 0.0052 | — |
| 543 | 0.0020 | 2.96 | 0.23 | 0.27 | 0.012 | 0.0016 | 2.9 | 0.11 | 0.0048 | — |
| 544 | 0.0020 | 2.95 | 0.23 | 0.28 | 0.013 | 0.0013 | 1.5 | 2.00 | 0.0051 | — |

| No. | Sr mass % | Ba mass % | Ce mass % | La mass % | Nd mass % | Pr mass % | Zn mass % | Cd mass % | Sn mass % | Cr mass % |
|---|---|---|---|---|---|---|---|---|---|---|
| 501 | — | — | — | — | — | — | — | — | — | — |
| 502 | — | — | — | — | — | — | — | — | — | — |
| 503 | 0.0046 | — | — | — | — | — | — | — | — | — |
| 504 | — | 0.0042 | — | — | — | — | — | — | — | — |
| 505 | — | — | 0.0046 | — | — | — | — | — | — | — |
| 506 | — | — | — | 0.0042 | — | — | — | — | — | — |
| 507 | — | — | — | — | 0.0049 | — | — | — | — | — |
| 508 | — | — | — | — | — | 0.0042 | — | — | — | — |
| 509 | — | — | — | — | — | — | 0.0047 | — | — | — |
| 510 | — | — | — | — | — | — | — | 0.0044 | — | — |
| 511 | — | — | — | — | — | — | — | — | — | — |
| 512 | — | — | — | — | — | — | — | — | — | — |
| 513 | — | — | — | — | — | — | — | — | — | — |
| 514 | — | — | — | — | — | — | — | — | — | — |
| 515 | — | — | — | — | — | — | — | — | 0.10 | — |
| 516 | — | — | — | — | — | — | — | — | — | 3.0 |
| 517 | — | — | — | — | — | — | — | — | — | — |
| 518 | — | — | — | — | — | — | — | — | — | — |
| 519 | — | — | — | — | — | — | — | — | — | — |
| 520 | — | — | — | — | — | — | — | — | — | — |
| 521 | — | — | — | — | — | — | — | — | — | — |
| 522 | — | — | — | — | — | — | — | — | — | — |
| 523 | — | — | — | — | — | — | — | — | — | — |
| 524 | — | — | — | — | — | — | — | — | — | — |
| 525 | — | — | — | — | — | — | — | — | — | — |
| 526 | — | — | — | — | — | — | — | — | — | — |
| 527 | — | — | — | — | — | — | — | — | — | — |
| 528 | — | — | — | — | — | — | — | — | — | — |
| 529 | — | — | — | — | — | — | — | — | 0.50 | — |

TABLE 9-continued

| 530 | — | — | — | — | — | — | — | — | — | 11.0 |
| 531 | — | — | — | — | — | — | — | — | — | — |
| 532 | — | — | — | — | — | — | — | — | — | — |
| 533 | — | — | — | — | — | — | — | — | — | — |
| 534 | — | — | — | — | — | — | — | — | — | — |
| 535 | — | — | — | — | — | — | — | — | — | — |
| 536 | — | — | — | — | — | — | — | — | — | — |
| 537 | — | — | — | — | — | — | — | — | — | — |
| 538 | — | — | — | — | — | — | — | — | — | — |
| 539 | — | — | — | — | — | — | — | — | — | — |
| 540 | — | — | — | — | — | — | — | — | — | — |
| 541 | — | — | — | — | — | — | — | — | — | — |
| 542 | — | — | — | — | — | — | — | — | — | — |
| 543 | — | — | — | — | — | — | — | — | — | — |
| 544 | — | — | — | — | — | — | — | — | — | — |

TABLE 10

| No. | Q | Sheet thickness mm | Grain size μm | {100} intensity | Number of Cn particles (<100 nm)/10 μm$^2$ | TS MPa | EL % | W10/400 W/kg | B50 T | Note |
|---|---|---|---|---|---|---|---|---|---|---|
| 501 | 3.44 | 0.20 | 82 | 2.7 | 103 | 610 | 13 | 10.5 | 1.64 | Invention Example |
| 502 | 3.31 | 0.20 | 80 | 2.8 | 99 | 610 | 14 | 10.3 | 1.65 | Invention Example |
| 503 | 3.34 | 0.20 | 80 | 2.9 | 100 | 610 | 14 | 10.2 | 1.64 | Invention Example |
| 504 | 3.36 | 0.20 | 81 | 2.9 | 94 | 600 | 14 | 10.3 | 1.65 | Invention Example |
| 505 | 3.28 | 0.20 | 79 | 2.8 | 91 | 610 | 13 | 10.3 | 1.64 | Invention Example |
| 506 | 3.34 | 0.20 | 81 | 2.9 | 92 | 600 | 15 | 10.6 | 1.64 | Invention Example |
| 507 | 3.47 | 0.20 | 80 | 2.7 | 99 | 610 | 14 | 10.3 | 1.65 | Invention Example |
| 508 | 3.30 | 0.20 | 80 | 2.8 | 102 | 600 | 13 | 10.3 | 1.64 | Invention Example |
| 509 | 3.42 | 0.20 | 79 | 2.9 | 96 | 600 | 13 | 10.4 | 1.64 | Invention Example |
| 510 | 3.42 | 0.20 | 81 | 3.0 | 105 | 610 | 15 | 10.4 | 1.64 | Invention Example |
| 511 | 3.40 | 0.20 | 37 | 2.7 | 99 | 620 | 14 | 11.7 | 1.65 | Comparative Example |
| 512 | 3.40 | 0.20 | 80 | 2.9 | 2 | 480 | 14 | 10.4 | 1.64 | Comparative Example |
| 513 | 3.35 | | | | | | | | | Comparative Example |
| 514 | 3.31 | 0.20 | 81 | 2.8 | 101 | 630 | 14 | 10.6 | 1.64 | Invention Example |
| 515 | 3.30 | 0.20 | 81 | 2.7 | 93 | 630 | 11 | 10.4 | 1.65 | Invention Example |
| 516 | 3.34 | 0.20 | 81 | 2.9 | 96 | 630 | 11 | 10.4 | 1.64 | Invention Example |
| 517 | 3.37 | 0.65 | 81 | 2.8 | 104 | 620 | 14 | 51.4 | 1.64 | Comparative Example |
| 518 | 1.92 | 0.20 | 91 | 0.3 | 44 | 550 | 16 | 12.2 | 1.63 | Comparative Example |
| 519 | 3.40 | 0.20 | 82 | 2.8 | 98 | 630 | 13 | 10.3 | 1.65 | Invention Example |
| 520 | 1.92 | 0.20 | 84 | 2.9 | 102 | 580 | 17 | 12.5 | 1.75 | Comparative Example |
| 521 | 4.79 | 0.20 | | | Fractured | | | | | Comparative Example |
| 522 | 3.45 | 0.20 | 60 | 2.8 | 98 | 640 | 18 | 15.6 | 1.65 | Comparative Example |
| 523 | 1.01 | 0.20 | 40 | 2.9 | 100 | 680 | 14 | 15.5 | 1.62 | Comparative Example |
| 524 | 9.78 | 0.20 | | | Fractured | | | | | Comparative Example |
| 525 | 3.46 | 0.20 | 82 | 2.8 | 104 | 580 | 16 | 10.4 | 1.62 | Comparative Example |
| 526 | 3.35 | 0.20 | | | Fractured | | | | | Comparative Example |
| 527 | 3.35 | 0.20 | 40 | 2.8 | 105 | 690 | 15 | 15.4 | 1.66 | Comparative Example |
| 528 | 3.40 | 0.20 | 80 | 2.9 | 99 | 630 | 15 | 15.6 | 1.65 | Comparative Example |
| 529 | 3.41 | 0.20 | | | Fractured | | | | | Comparative Example |
| 530 | 3.41 | 0.20 | 80 | 2.7 | 100 | 670 | 9 | 12.3 | 1.61 | Comparative Example |
| 531 | 3.45 | 0.20 | 301 | 2.9 | 96 | 580 | 8 | 11.4 | 1.66 | Comparative Example |
| 532 | 2.57 | 0.20 | 82 | 2.8 | 104 | 630 | 14 | 9.9 | 1.63 | Invention Example |
| 533 | 5.84 | 0.20 | 82 | 2.7 | 103 | 650 | 13 | 9.8 | 1.63 | Invention Example |
| 534 | 3.48 | 0.20 | 84 | 2.7 | 104 | 670 | 14 | 10.4 | 1.65 | Invention Example |
| 535 | 3.31 | 0.20 | 82 | 2.8 | 251 | 720 | 15 | 10.4 | 1.64 | Invention Example |
| 536 | 3.30 | 0.20 | 81 | 2.8 | 100 | 680 | 14 | 9.7 | 1.66 | Invention Example |
| 537 | 3.43 | 0.20 | 154 | 2.8 | 101 | 590 | 12 | 9.7 | 1.65 | Invention Example |
| 538 | 3.42 | 0.20 | 80 | 2.7 | 102 | 610 | 14 | 10.5 | 1.65 | Invention Example |
| 539 | 2.94 | 0.20 | 71 | 2.8 | 110 | 600 | 15 | 10.9 | 1.65 | Invention Example |
| 540 | 8.65 | 0.20 | 80 | 2.8 | 101 | 710 | 13 | 9.7 | 1.63 | Invention Example |
| 541 | 4.40 | 0.20 | 82 | 2.9 | 102 | 660 | 13 | 9.6 | 1.63 | Invention Example |
| 542 | 2.21 | 0.20 | 81 | 2.7 | 103 | 750 | 15 | 9.2 | 1.63 | Invention Example |
| 543 | 3.27 | 0.20 | 81 | 2.7 | 492 | 790 | 14 | 10.3 | 1.63 | Invention Example |
| 544 | 3.28 | 0.20 | 80 | 2.8 | 107 | 750 | 14 | 9.6 | 1.63 | Invention Example |

As shown in Tables 9 and 10, in Sample Nos. 501 to 510, Nos. 514 to 516, No. 519, and Nos. 532 to 544, since the chemical composition was within the range of the present invention and other conditions were within the ranges of the present invention, good results were obtained in magnetic characteristics and mechanical properties.

In Sample No. 511, since substantially no coarse precipitate forming element was contained, the iron loss W10/400 was high.

In Sample No. 512, since the Cu content was too small, the tensile strength (TS) was insufficient.

In Sample No. 513, since the Cu content was too large, fracture had occurred during the test.

In Sample No. 517, since the sheet thickness was too thick, the iron loss W10/400 was high.

In Sample No. 518, since Al was not contained in a specified amount and the parameter Q was less than 2.00, the tensile strength (TS) was low, and the iron loss W10/400 was high.

In Sample No. 520, since the Si content was small, the iron loss W10/400 was high.

In Sample No. 521, since the Si content was large, fracture had occurred during the test.

In Sample No. 522, since the Mn content was small, the iron loss W10/400 was high.

In Sample No. 523, since the Mn content was large, the iron loss W10/400 was high, and as a result, the magnetic flux density B50 was inferior.

In Sample No. 524, since the Al content was large, fracture had occurred during the test.

In Sample No. 525, since the P content was small, the tensile strength (TS) was low, and as a result, the magnetic flux density B50 was inferior.

In Sample No. 526, since the P content was large, fracture had occurred during the test.

In Sample No. 527, since the S content was large, the iron loss W10/400 was high.

In Sample No. 528, since the Mg content was large, the iron loss W10/400 was high.

In Sample No. 529, since the Sn content was too large, fracture had occurred during the test.

In Sample No. 530, since the Cr content was too large, the total elongation EL was low, the iron loss W10/400 was high, and as a result, the magnetic flux density B50 was inferior.

In Sample No. 531, since the average grain size was large, the tensile strength (TS) and the total elongation EL were low, and the iron loss W10/400 was high.

(Sixth Test)

In a sixth test, a 250 mm thick slab having the chemical composition shown in Table 11 was prepared. Next, the slab was subjected to hot rolling to produce a hot-rolled sheet having a thickness of 2.0 mm A slab reheating temperature at this time was 1200° C., a finishing temperature was 850° C., and a winding temperature was 650° C.

During the hot rolling, lubrication rolling was performed by adding 10% of oil to the cooling water. After annealing the hot-rolled sheet at 950° C. for 1 minute, scale on the surface layer was removed by pickling Thereafter, the hot-rolled sheet was cold-rolled to 0.20 mm. A cold rolling reduction at this time was set to 90% in any of the hot-rolled sheets. In final annealing, the steel strip was heated at a temperature rising rate of 20° C./sec, and after 1000° C. was reached, soaked for 15 seconds and air-cooled. Furthermore, as a Cu precipitation treatment, the steel sheet was heated to 600° C., soaked for 1 minute, and then air-cooled.

At this time, by variously changing manufacturing conditions, non-oriented electrical steel sheets having different {100} crystal orientation intensities I were produced. For each of the non-oriented electrical steel sheets, the number of particles of simple Cu having a diameter of less than 100 nm per 10 $\mu m^2$, the {100} crystal orientation intensity I, and the average grain size r were measured. The results are shown in Table 12.

In addition, the iron loss W10/400, the magnetic flux density, the tensile strength (TS), and the total elongation (EL) were also measured by the same procedure as in the first test. The results are shown in Table 12.

TABLE 11

| No. | C mass % | Si mass % | Mn mass % | Al mass % | P mass % | S mass % | Mg mass % | Cu mass % | Ni mass % |
|---|---|---|---|---|---|---|---|---|---|
| 601 | 0.0019 | 2.98 | 0.16 | 0.31 | 0.014 | 0.0013 | 0.0041 | 1.6 | 0.01 |
| 602 | 0.0020 | 2.96 | 0.23 | 0.28 | 0.013 | 0.0014 | 0.0049 | 1.6 | 0.05 |
| 603 | 0.0021 | 2.98 | 0.22 | 0.29 | 0.014 | 0.0015 | 0.0051 | 1.5 | 0.12 |
| 604 | 0.0021 | 2.98 | 0.24 | 0.30 | 0.014 | 0.0014 | 0.0047 | 1.6 | 0.21 |
| 605 | 0.0021 | 2.95 | 0.20 | 0.30 | 0.013 | 0.0015 | 0.0043 | 1.6 | 0.51 |
| 606 | 0.0019 | 2.95 | 0.23 | 0.35 | 0.014 | 0.0014 | 0.0050 | 1.6 | 1.01 |
| 607 | 0.0020 | 2.95 | 0.21 | 0.27 | 0.014 | 0.0015 | 0.0052 | 1.5 | 1.50 |
| 608 | 0.0020 | 2.97 | 0.19 | 0.28 | 0.013 | 0.0014 | 0.0047 | 1.5 | 3.02 |
| 609 | 0.0020 | 2.97 | 0.16 | 0.30 | 0.014 | 0.0013 | 0.0041 | 1.6 | 5.01 |
| 610 | 0.0020 | 2.99 | 0.19 | 0.26 | 0.014 | 0.0013 | 0.0049 | 1.6 | 0.01 |
| 611 | 0.0020 | 2.96 | 0.18 | 0.28 | 0.014 | 0.0014 | 0.0050 | 1.6 | 0.05 |
| 612 | 0.0021 | 2.97 | 0.22 | 0.33 | 0.013 | 0.0015 | 0.0040 | 1.5 | 0.12 |
| 613 | 0.0021 | 2.99 | 0.20 | 0.29 | 0.014 | 0.0013 | 0.0040 | 1.5 | 0.22 |
| 614 | 0.0020 | 2.99 | 0.21 | 0.28 | 0.014 | 0.0015 | 0.0053 | 1.5 | 0.52 |
| 615 | 0.0019 | 2.96 | 0.21 | 0.26 | 0.014 | 0.0014 | 0.0043 | 1.5 | 1.03 |
| 616 | 0.0021 | 2.96 | 0.24 | 0.26 | 0.013 | 0.0015 | 0.0047 | 1.6 | 1.51 |
| 617 | 0.0019 | 2.98 | 0.20 | 0.28 | 0.013 | 0.0013 | 0.0054 | 1.6 | 3.01 |
| 618 | 0.0020 | 2.98 | 0.20 | 0.28 | 0.014 | 0.0016 | 0.0048 | 1.6 | 5.03 |
| 619 | 0.0020 | 2.98 | 0.15 | 0.33 | 0.013 | 0.0013 | — | 1.6 | 0.01 |
| 620 | 0.0019 | 2.98 | 0.16 | 0.31 | 0.014 | 0.0015 | — | 1.6 | 0.05 |
| 621 | 0.0021 | 2.98 | 0.22 | 0.33 | 0.014 | 0.0015 | — | 1.5 | 0.12 |
| 622 | 0.0020 | 2.99 | 0.17 | 0.28 | 0.014 | 0.0014 | — | 1.6 | 0.21 |
| 623 | 0.0020 | 2.99 | 0.24 | 0.29 | 0.014 | 0.0015 | — | 1.6 | 0.52 |
| 624 | 0.0020 | 2.97 | 0.20 | 0.25 | 0.013 | 0.0015 | — | 1.5 | 1.03 |
| 625 | 0.0020 | 2.97 | 0.19 | 0.35 | 0.014 | 0.0013 | — | 1.5 | 1.51 |
| 626 | 0.0019 | 2.96 | 0.16 | 0.30 | 0.014 | 0.0015 | — | 1.5 | 3.01 |
| 627 | 0.0019 | 2.97 | 0.15 | 0.26 | 0.014 | 0.0014 | — | 1.6 | 5.02 |
| 628 | 0.0021 | 2.96 | 0.17 | 0.27 | 0.014 | 0.0015 | 0.0053 | 0.1 | 0.01 |
| 629 | 0.0021 | 2.97 | 0.22 | 0.34 | 0.013 | 0.0015 | 0.0041 | 0.1 | 0.05 |
| 630 | 0.0020 | 2.99 | 0.20 | 0.32 | 0.014 | 0.0015 | 0.0041 | 0.1 | 0.11 |
| 631 | 0.0020 | 2.99 | 0.17 | 0.28 | 0.014 | 0.0015 | 0.0045 | 0.1 | 0.23 |
| 632 | 0.0019 | 2.97 | 0.21 | 0.34 | 0.014 | 0.0016 | 0.0045 | 0.1 | 0.51 |
| 633 | 0.0020 | 2.98 | 0.18 | 0.28 | 0.013 | 0.0016 | 0.0052 | 0.1 | 1.03 |
| 634 | 0.0020 | 2.97 | 0.20 | 0.35 | 0.013 | 0.0015 | 0.0043 | 0.1 | 1.52 |
| 635 | 0.0019 | 2.98 | 0.22 | 0.31 | 0.013 | 0.0013 | 0.0048 | 0.1 | 3.01 |

TABLE 11-continued

| No. | C mass % | Si mass % | Mn mass % | Al mass % | P mass % | S mass % | Mg mass % | Cu mass % | Ni mass % |
|---|---|---|---|---|---|---|---|---|---|
| 636 | 0.0021 | 2.98 | 0.19 | 0.30 | 0.014 | 0.0016 | 0.0041 | 0.1 | 5.00 |
| 637 | 0.0019 | 2.98 | 0.18 | 0.32 | 0.013 | 0.0013 | 0.0054 | 0.1 | 0.01 |
| 638 | 0.0019 | 2.97 | 0.18 | 0.35 | 0.014 | 0.0013 | 0.0053 | 0.1 | 0.05 |
| 639 | 0.0020 | 2.97 | 0.23 | 0.26 | 0 014 | 0.0014 | 0.0053 | 0.1 | 0.11 |
| 640 | 0.0019 | 2.99 | 0.25 | 0.33 | 0.014 | 0.0015 | 0.0045 | 0.1 | 0.23 |
| 641 | 0.0020 | 2.96 | 0.24 | 0.31 | 0.014 | 0.0015 | 0.0046 | 0.1 | 0.51 |
| 642 | 0.0020 | 2.95 | 0.19 | 0.30 | 0.013 | 0.0016 | 0.0043 | 0.1 | 1.01 |
| 643 | 0.0020 | 2.98 | 0.16 | 0.34 | 0.013 | 0.0013 | 0.0048 | 0.1 | 1.51 |
| 644 | 0.0020 | 2.98 | 0.22 | 0.27 | 0.013 | 0.0014 | 0.0043 | 0.1 | 3.02 |
| 645 | 0.0020 | 2.98 | 0.17 | 0.26 | 0.014 | 0.0014 | 0.0052 | 0.1 | 5.01 |
| 646 | 0.0020 | 2.97 | 0.22 | 0.30 | 0.013 | 0.0014 | — | 0.1 | 0.01 |
| 647 | 0.0020 | 2.96 | 0.21 | 0.25 | 0.014 | 0.0015 | — | 0.1 | 0.05 |
| 648 | 0.0021 | 2.96 | 0.21 | 0.34 | 0.013 | 0.0014 | — | 0.1 | 0.12 |
| 649 | 0.0021 | 2.97 | 0.23 | 0.30 | 0.013 | 0.0015 | — | 0.1 | 0.22 |
| 650 | 0.0021 | 2.95 | 0.25 | 0.28 | 0.013 | 0.0015 | — | 0.1 | 0.52 |
| 651 | 0.0020 | 2.98 | 0.21 | 0.33 | 0.013 | 0.0014 | — | 0.1 | 1.00 |
| 652 | 0.0021 | 2.96 | 0.23 | 0.31 | 0.014 | 0.0015 | — | 0.1 | 1.51 |
| 653 | 0.0019 | 2.97 | 0.24 | 0.33 | 0.014 | 0.0014 | — | 0.1 | 3.01 |
| 654 | 0.0020 | 2.95 | 0.16 | 0.28 | 0.013 | 0.0015 | — | 0.1 | 5.00 |
| 655 | 0.0021 | 1.50 | 0.25 | 0.31 | 0.012 | 0.0013 | 0.0043 | 1.6 | 0.10 |
| 656 | 0.0021 | 4.51 | 0.19 | 0.30 | 0.014 | 0.0015 | 0.0045 | 1.5 | 0.10 |
| 657 | 0.0019 | 2.98 | 0.07 | 0.29 | 0.011 | 0.0014 | 0.0051 | 1.6 | 0.11 |
| 658 | 0.0020 | 2.97 | 2.53 | 0.34 | 0.014 | 0.0015 | 0.0052 | 1.5 | 0.11 |
| 659 | 0.0019 | 2.96 | 0.18 | 3.51 | 0.012 | 0.0015 | 0.0053 | 1.6 | 0.12 |
| 660 | 0.0018 | 2.97 | 0.21 | 0.31 | 0.001 | 0.0015 | 0.0049 | 1.6 | 0.11 |
| 661 | 0.0020 | 2.98 | 0.17 | 0.33 | 0.306 | 0.0015 | 0.0041 | 1.6 | 0.11 |
| 662 | 0.0021 | 2.98 | 0.16 | 0.33 | 0.012 | 0.0044 | 0.0049 | 1.6 | 0.10 |
| 663 | 0.0022 | 2.96 | 0.22 | 0.26 | 0.012 | 0.0014 | 0.0200 | 1.6 | 0.11 |
| 664 | 0.0019 | 2.97 | 0.19 | 0.25 | 0.012 | 0.0014 | 0.0048 | 1.5 | 0 10 |
| 665 | 0.0022 | 2.98 | 1.02 | 0.25 | 0.012 | 0.0015 | 0.0047 | 1.5 | 0.11 |
| 666 | 0.0020 | 2.99 | 0.18 | 1.51 | 0.012 | 0.0015 | 0.0055 | 1.6 | 0.11 |
| 667 | 0.0021 | 2.96 | 0.22 | 0.27 | 0.103 | 0.0015 | 0.0047 | 1.5 | 0.11 |
| 668 | 0.0020 | 2.98 | 0.24 | 0.27 | 0.011 | 0.0016 | 0.0051 | 1.8 | 0.12 |
| 669 | 0.0019 | 2.99 | 0.15 | 0.25 | 0.012 | 0.0014 | 0.0046 | 1.5 | 1.50 |
| 670 | 0.0020 | 2.96 | 0.21 | 0.28 | 0.011 | 0.0015 | 0.0044 | 1.6 | 0.12 |

TABLE 12

| No. | Q | Sheet thickness mm | Grain size μm | {100} intensity | Number of Cu particles (<100 nm)/μm$^2$ | TS MPa | EL % | W10/400 W/kg | B50 T | Note |
|---|---|---|---|---|---|---|---|---|---|---|
| 601 | 3.44 | 0.20 | 83 | 2.9 | 97 | 610 | 3 | 10.4 | 1.65 | Comparative Example |
| 602 | 3.29 | 0.20 | 80 | 2.7 | 99 | 610 | 5 | 10.5 | 1.64 | Comparative Example |
| 603 | 3.34 | 0.20 | 81 | 2.9 | 97 | 620 | 12 | 10.4 | 1.64 | Invention Example |
| 604 | 3.34 | 0.20 | 83 | 2.8 | 106 | 600 | 16 | 10.5 | 1.65 | Invention Example |
| 605 | 3.35 | 0.20 | 82 | 2.9 | 106 | 620 | 17 | 10.5 | 1.64 | Invention Example |
| 606 | 3.42 | 0.20 | 82 | 2.8 | 103 | 610 | 20 | 10.5 | 1.64 | Invention Example |
| 607 | 3.28 | 0.20 | 84 | 2.9 | 104 | 620 | 19 | 10.3 | 1.65 | Invention Example |
| 608 | 3.34 | 0.20 | 83 | 2.8 | 97 | 630 | 15 | 10.5 | 1.65 | Invention Example |
| 609 | 3.41 | 0.20 | 80 | 2.7 | 102 | 660 | 8 | 10.4 | 1.64 | Comparative Example |
| 610 | 3.32 | 0.20 | 80 | 1.9 | 102 | 600 | 14 | 10.6 | 1.59 | Comparative Example |
| 611 | 3.34 | 0.20 | 83 | 1.7 | 97 | 600 | 13 | 10.5 | 1.60 | Comparative Example |
| 612 | 3.41 | 0.20 | 81 | 1.7 | 100 | 610 | 14 | 10.6 | 1.59 | Comparative Example |
| 613 | 3.37 | 0.20 | 82 | 1.8 | 101 | 600 | 17 | 10.3 | 1.60 | Comparative Example |
| 614 | 3.34 | 0.20 | 82 | 1.9 | 103 | 610 | 18 | 10.5 | 1.60 | Comparative Example |
| 615 | 3.27 | 0.20 | 81 | 1.8 | 106 | 610 | 21 | 10.4 | 1.59 | Comparative Example |
| 616 | 3.24 | 0.20 | 84 | 1.8 | 104 | 620 | 20 | 10.5 | 1.59 | Comparative Example |
| 617 | 3.34 | 0.20 | 81 | 1.8 | 96 | 640 | 17 | 10.4 | 1.60 | Comparative Example |
| 618 | 3.34 | 0.20 | 80 | 1.8 | 99 | 650 | 10 | 10.5 | 1.60 | Comparative Example |
| 619 | 3.49 | 0.20 | 81 | 2.8 | 101 | 600 | 11 | 11.6 | 1.65 | Comparative Example |
| 620 | 3.44 | 0.20 | 82 | 2.8 | 98 | 610 | 12 | 11.3 | 1.64 | Comparative Example |
| 621 | 3.42 | 0.20 | 83 | 2.8 | 101 | 610 | 14 | 11.5 | 1.65 | Comparative Example |
| 622 | 3.38 | 0.20 | 83 | 2.7 | 107 | 610 | 17 | 11.3 | 1.64 | Comparative Example |
| 623 | 3.33 | 0.20 | 85 | 2.9 | 110 | 620 | 20 | 11.4 | 1.64 | Comparative Example |
| 624 | 3.27 | 0.20 | 82 | 2.8 | 100 | 620 | 19 | 11.4 | 1.64 | Comparative Example |
| 625 | 3.48 | 0.20 | 83 | 2.8 | 107 | 620 | 18 | 11.5 | 1.65 | Comparative Example |
| 626 | 3.40 | 0.20 | 84 | 2.8 | 98 | 640 | 15 | 11.5 | 1.65 | Comparative Example |
| 627 | 3.34 | 0.20 | 84 | 2.9 | 97 | 650 | 10 | 11.4 | 1.65 | Comparative Example |
| 628 | 3.33 | 0.20 | 85 | 1.8 | 1 | 510 | 17 | 10.5 | 1.60 | Comparative Example |
| 629 | 3.43 | 0.20 | 83 | 1.8 | 1 | 490 | 18 | 10.3 | 1.60 | Comparative Example |
| 630 | 3.43 | 0.20 | 82 | 1.8 | 0 | 500 | 20 | 10.5 | 1.60 | Comparative Example |
| 631 | 3.38 | 0.20 | 84 | 1.7 | 2 | 500 | 19 | 10.6 | 1.60 | Comparative Example |
| 632 | 3.44 | 0.20 | 82 | 1.7 | 0 | 500 | 21 | 10.4 | 1.59 | Comparative Example |

TABLE 12-continued

| No. | Q | Sheet thickness mm | Grain size μm | {100} intensity | Number of Cu particles (<100 nm)/μm² | TS MPa | EL % | W10/400 W/kg | B50 T | Note |
|---|---|---|---|---|---|---|---|---|---|---|
| 633 | 3.36 | 0.20 | 83 | 1.7 | 0 | 500 | 20 | 10.6 | 1.60 | Comparative Example |
| 634 | 3.47 | 0.20 | 81 | 1.8 | 1 | 510 | 19 | 10.5 | 1.60 | Comparative Example |
| 635 | 3.38 | 0.20 | 84 | 1.9 | 1 | 520 | 15 | 10.6 | 1.60 | Comparative Example |
| 636 | 3.39 | 0.20 | 84 | 1.8 | 1 | 540 | 8 | 10.4 | 1.60 | Comparative Example |
| 637 | 3.44 | 0.20 | 84 | 2.9 | 0 | 490 | 18 | 10.5 | 1.64 | Comparative Example |
| 638 | 3.49 | 0.20 | 81 | 2.8 | 1 | 500 | 20 | 10.5 | 1.64 | Comparative Example |
| 639 | 3.26 | 0.20 | 82 | 2.9 | 1 | 500 | 19 | 10.5 | 1.65 | Comparative Example |
| 640 | 3.40 | 0.20 | 84 | 2.8 | 1 | 500 | 20 | 10.3 | 1.65 | Comparative Example |
| 641 | 3.34 | 0.20 | 83 | 2.8 | 0 | 490 | 21 | 10.6 | 1.64 | Comparative Example |
| 642 | 3.36 | 0.20 | 80 | 2.8 | 0 | 510 | 21 | 10.5 | 1.64 | Comparative Example |
| 643 | 3.50 | 0.20 | 84 | 2.8 | 0 | 520 | 19 | 10.4 | 1.65 | Comparative Example |
| 644 | 3.30 | 0.20 | 81 | 2.8 | 0 | 520 | 15 | 10.4 | 1.64 | Comparative Example |
| 645 | 3.33 | 0.20 | 81 | 2.8 | 1 | 550 | 9 | 10.3 | 1.64 | Comparative Example |
| 646 | 3.35 | 0.20 | 80 | 1.8 | 1 | 490 | 20 | 11.4 | 1.59 | Comparative Example |
| 647 | 3.25 | 0.20 | 83 | 1.7 | 2 | 490 | 20 | 11.5 | 1.60 | Comparative Example |
| 648 | 3.43 | 0.20 | 83 | 1.8 | 2 | 490 | 19 | 11.4 | 1.60 | Comparative Example |
| 649 | 3.34 | 0.20 | 85 | 1.8 | 0 | 510 | 21 | 11.3 | 1.60 | Comparative Example |
| 650 | 3.26 | 0.20 | 84 | 1.7 | 2 | 500 | 21 | 11.6 | 1.59 | Comparative Example |
| 651 | 3.43 | 0.20 | 82 | 1.9 | 1 | 510 | 20 | 11.6 | 1.59 | Comparative Example |
| 652 | 3.35 | 0.20 | 82 | 1.8 | 0 | 510 | 19 | 11.6 | 1.60 | Comparative Example |
| 653 | 3.39 | 0.20 | 80 | 1.8 | 1 | 520 | 17 | 11.5 | 1.59 | Comparative Example |
| 654 | 3.35 | 0.20 | 81 | 1.9 | 1 | 550 | 10 | 11.4 | 1.69 | Comparative Example |
| 655 | 1.87 | 0.20 | 84 | 2.9 | 96 | 580 | 17 | 12.6 | 1.74 | Comparative Example |
| 656 | 4.92 | 0.20 | | | Fractured | | | | | Comparative Example |
| 657 | 3.49 | 0.20 | 60 | 2.9 | 97 | 640 | 18 | 15.7 | 1.65 | Comparative Example |
| 658 | 1.12 | 0.20 | 40 | 2.8 | 105 | 680 | 14 | 15.4 | 1.64 | Comparative Example |
| 659 | 9.80 | 0.20 | | | Fractured | | | | | Comparative Example |
| 660 | 3.38 | 0.20 | 83 | 2.9 | 102 | 580 | 16 | 10.4 | 1.62 | Comparative Example |
| 661 | 3.47 | 0.20 | | | Fractured | | | | | Comparative Example |
| 662 | 3.48 | 0.20 | 40 | 2.8 | 100 | 690 | 15 | 15.7 | 1.66 | Comparative Example |
| 663 | 3.26 | 0.20 | 82 | 2.9 | 97 | 630 | 15 | 15.2 | 1.65 | Comparative Example |
| 664 | 3.28 | 0.20 | 302 | 2.7 | 101 | 580 | 8 | 11.5 | 1.65 | Comparative Example |
| 665 | 2.46 | 0.20 | 83 | 2.8 | 100 | 630 | 14 | 9.8 | 1.63 | Invention Example |
| 666 | 5.83 | 0.20 | 80 | 2.8 | 98 | 650 | 13 | 9.9 | 1.63 | Invention Example |
| 667 | 3.28 | 0.20 | 83 | 2.8 | 101 | 670 | 14 | 10.4 | 1.65 | Invention Example |
| 668 | 3.28 | 0.20 | 83 | 2.9 | 261 | 720 | 15 | 10.4 | 1.64 | Invention Example |
| 669 | 3.34 | 0.20 | 82 | 2.8 | 97 | 680 | 14 | 9.9 | 1.65 | Invention Example |
| 670 | 3.31 | 0.20 | 154 | 2.8 | 100 | 590 | 12 | 9.8 | 1.66 | Invention Example |

As shown in Tables 11 and 12, in Sample Nos. 603 to 608 and Nos. 665 to 670, since the chemical composition was within the range of the present invention and other conditions were within the ranges of the present invention, good results were obtained in magnetic characteristics and mechanical properties.

In Sample Nos. 601 and 602, since the Ni content was too small, the total elongation (EL) was insufficient.

In Sample No. 609, since the Ni content was too large, the total elongation (EL) was insufficient.

In Sample Nos. 610 and 618, since the {100} crystal orientation intensity I was too low, the magnetic flux density B50 was insufficient.

In Sample Nos. 619 to 627, since substantially no coarse precipitate forming element was contained, the iron loss W10/400 was deteriorated.

In Sample Nos. 628 to 636, since the Cu content was too small and the {100} crystal orientation intensity I was too low, the tensile strength (TS) and the magnetic flux density B50 were insufficient.

In Sample Nos. 637 to 645, since the Cu content was too small, the tensile strength (TS) was insufficient.

In Sample Nos. 646 to 654, since substantially no coarse precipitate forming element was contained, the Cu content was too small, and the {100} crystal orientation intensity I was too low, the iron loss W10/400 was deteriorated, and the tensile strength TS and the magnetic flux density B50 were insufficient.

In Sample No. 655, since the Si content was small, the iron loss W10/400 was high.

In Sample No. 656, since the Si content was large, fracture had occurred during the test.

In Sample No. 657, since the Mn content was small, the iron loss W10/400 was high.

In Sample No. 658, since the Mn content was large, the iron loss W10/400 was high, and as a result, the magnetic flux density B50 was inferior.

In Sample No. 659, since the Al content was large, fracture had occurred during the test.

In Sample No. 660, since the P content was small, the tensile strength (TS) was low, and as a result, the magnetic flux density B50 was inferior.

In Sample No. 661, since the P content was large, fracture had occurred during the test.

In Sample No. 662, since the S content was large, the iron loss W10/400 was high.

In Sample No. 663, since the Mg content was large, the iron loss W10/400 was high.

In Sample No. 664, since the average grain size was large, the tensile strength (TS) and the total elongation EL were low, and the iron loss W10/400 was high.

(Seventh Test)

1.0 mm thick and 3.25 mm thick hot-rolled coils having the chemical compositions shown in Table 13 below were prepared. This hot-rolled coil was produced by causing molten steel to flow between a pair of rolls and solidify, and a steel strip having a proportion of columnar crystals of 80% or more in terms of area fraction and an average grain size of 0.1 mm or more was obtained. Next, for the hot-rolled coils, scale on the surface layer was removed by pickling.

Thereafter, the hot-rolled coils were cold-rolled to 0.20 mm and 0.65 mm. In final annealing, the steel strip was heated at a temperature rising rate of 20° C./sec, and after 1000° C. was reached, soaked for 15 seconds and air-cooled. Furthermore, as a Cu precipitation treatment, the steel sheet was heated to 600° C., soaked for 1 minute, and then air-cooled. In Sample No. 712, the Cu precipitation treatment was omitted.

For each of the non-oriented electrical steel sheets, the number of particles of simple Cu having a diameter of less than 100 nm per 10 $\mu m^2$, the {100} crystal orientation intensity I, and the average grain size r were measured. The results are shown in Table 14. In addition, the iron loss W10/400, the magnetic flux density, the tensile strength (TS), and the total elongation (EL) were also measured by the same procedure as in the first test. The results are shown in Table 14.

TABLE 13

| No. | C mass % | Si mass % | Mn mass % | Al mass % | P mass % | S mass % | Cu mass % | Ni mass % | Mg mass % | Ca mass % |
|---|---|---|---|---|---|---|---|---|---|---|
| 701 | 0.0019 | 2.96 | 0.20 | 0.30 | 0.013 | 0.0020 | 1.5 | 0.12 | 0.0050 | — |
| 702 | 0.0020 | 2.97 | 0.20 | 0.30 | 0.012 | 0.0020 | 1.5 | 0.10 | — | 0.0040 |
| 703 | 0.0021 | 2.95 | 0.20 | 0.30 | 0.011 | 0.0010 | 1.4 | 0.11 | — | — |
| 704 | 0.0020 | 2.95 | 0.20 | 0.30 | 0.013 | 0.0010 | 1.5 | 1.12 | — | — |
| 705 | 0.0019 | 2.97 | 0.20 | 0.30 | 0.012 | 0.0020 | 1.4 | 0.10 | — | — |
| 706 | 0.0020 | 2.95 | 0.20 | 0.30 | 0.011 | 0.0020 | 1.5 | 0.12 | — | — |
| 707 | 0.0019 | 2.96 | 0.20 | 0.30 | 0.013 | 0.0020 | 1.4 | 0.12 | — | — |
| 708 | 0.0021 | 2.97 | 0.20 | 0.30 | 0.013 | 0.0020 | 1.5 | 0.10 | — | — |
| 709 | 0.0020 | 2.97 | 0.20 | 0.30 | 0.011 | 0.0020 | 1.5 | 0.11 | — | — |
| 710 | 0.0019 | 2.95 | 0.20 | 0.30 | 0.012 | 0.0010 | 1.4 | 0.10 | — | — |
| 711 | 0.0019 | 2.96 | 0.20 | 0.30 | 0.013 | 0.0020 | 1.5 | 0.12 | — | — |
| 712 | 0.0020 | 2.95 | 0.20 | 0.30 | 0.011 | 0.0020 | 0.9 | 0.12 | 0.0050 | — |
| 713 | 0.0019 | 2.96 | 0.20 | 0.30 | 0.012 | 0.0020 | 3.3 | 0.11 | 0.0040 | — |
| 714 | 0.0020 | 2.96 | 0.20 | 0.30 | 0.012 | 0.0010 | 1.5 | 0.10 | 0.0040 | — |
| 715 | 0.0020 | 2.96 | 0.20 | 0.30 | 0.013 | 0.0020 | 1.5 | 0.12 | 0.0040 | — |
| 716 | 0.0019 | 2.98 | 0.20 | 0.30 | 0.011 | 0.0010 | 1.4 | 0.11 | 0.0040 | — |
| 717 | 0.0021 | 2.95 | 0.20 | 0.30 | 0.011 | 0.0020 | 1.4 | 0.12 | 0.0040 | — |
| 718 | 0.0020 | 2.01 | 0.10 | — | 0.012 | 0 0015 | 1.5 | 0.12 | 0.0046 | — |
| 719 | 0.0021 | 2.95 | 0.18 | 0.30 | 0.011 | 0.0014 | 1.4 | 0.11 | 0.0052 | 0.0040 |
| 720 | 0.0019 | 1.51 | 0.23 | 0.33 | 0.014 | 0.0014 | 1.5 | 0.10 | 0.0053 | — |
| 721 | 0.0021 | 4.51 | 0.23 | 0.27 | 0.011 | 0.0013 | 1.6 | 0.10 | 0.0047 | — |
| 722 | 0.0019 | 2.98 | 0.06 | 0.27 | 0.012 | 0.0014 | 1.5 | 0.12 | 0.0047 | — |
| 723 | 0.0019 | 2.98 | 2.53 | 0.30 | 0.013 | 0.0013 | 1.6 | 0.12 | 0.0053 | — |
| 724 | 0.0020 | 2.97 | 0.24 | 3.50 | 0.011 | 0.0015 | 1.6 | 0.11 | 0.0048 | — |
| 725 | 0.0020 | 2.98 | 0.23 | 0.27 | 0.001 | 0.0014 | 1.6 | 0.11 | 0.0041 | — |
| 726 | 0.0018 | 2.98 | 0.18 | 0.29 | 0.306 | 0.0013 | 1.5 | 0.10 | 0.0049 | — |
| 727 | 0.0021 | 2.96 | 0.19 | 0.29 | 0.013 | 0.0041 | 1.6 | 0.11 | 0.0050 | — |
| 728 | 0.0018 | 2.96 | 0.18 | 0.26 | 0.014 | 0.0016 | 1.5 | 0.12 | 0.0200 | — |
| 729 | 0.0019 | 2.98 | 0.22 | 0.32 | 0.012 | 0.0014 | 1.6 | 0.11 | 0.0052 | — |
| 730 | 0.0019 | 2.98 | 0.23 | 0.25 | 0.011 | 0.0015 | 1.6 | 0.11 | 0.0048 | — |
| 731 | 0.0021 | 2.95 | 0.21 | 0.34 | 0.011 | 0.0015 | 1.5 | 0.11 | 0.0046 | — |
| 732 | 0.0022 | 2.95 | 1.00 | 0.33 | 0.014 | 0.0013 | 1.5 | 0.11 | 0.0051 | — |
| 733 | 0.0022 | 2.99 | 0.16 | 1.54 | 0.012 | 0.0014 | 1.6 | 0.10 | 0.0044 | — |
| 734 | 0.0019 | 2.98 | 0.21 | 0.31 | 0.101 | 0.0015 | 1.6 | 0.11 | 0.0046 | — |
| 735 | 0.0019 | 2.95 | 0.20 | 0.29 | 0.011 | 0.0013 | 1.8 | 0.11 | 0.0054 | — |
| 736 | 0.0020 | 2.97 | 0.24 | 0.27 | 0.012 | 0.0015 | 1.6 | 1.53 | 0.0047 | — |
| 737 | 0.0019 | 2.95 | 0.15 | 0.26 | 0.013 | 0.0014 | 1.5 | 0.10 | 0.0044 | — |
| 738 | 0.0030 | 2.97 | 0.22 | 0.32 | 0.013 | 0.0015 | 1.6 | 0.10 | 0.0047 | — |
| 739 | 0.0020 | 2.96 | 0.22 | 0.09 | 0.011 | 0.0015 | 1.5 | 0.11 | 0.0046 | — |
| 740 | 0.0019 | 2.96 | 0.17 | 2.93 | 0.010 | 0.0015 | 1.4 | 0.10 | 0.0049 | — |
| 741 | 0.0020 | 3.97 | 0.17 | 0.30 | 0.013 | 0.0015 | 1.4 | 0.11 | 0.0051 | — |
| 742 | 0.0019 | 3.51 | 1.89 | 0.27 | 0.013 | 0.0014 | 1.4 | 0.10 | 0.0049 | — |
| 743 | 0.0019 | 2.95 | 0.20 | 0.28 | 0.012 | 0.0015 | 2.8 | 0.10 | 0.0046 | — |
| 744 | 0.0020 | 2.97 | 0.20 | 0.31 | 0.012 | 0.0015 | 1.5 | 2.80 | 0.0047 | — |

| No. | Sr mass % | Ba mass % | Ce mass % | La mass % | Nd mass % | Pr mass % | Zn mass % | Cd mass % | Sn mass % | Cr mass % |
|---|---|---|---|---|---|---|---|---|---|---|
| 701 | — | — | — | — | — | — | — | — | — | — |
| 702 | — | — | — | — | — | — | — | — | — | — |
| 703 | 0.0040 | — | — | — | — | — | — | — | — | — |
| 704 | — | 0.0060 | — | — | — | — | — | — | — | — |
| 705 | — | — | 0.0040 | — | — | — | — | — | — | — |
| 706 | — | — | — | 0.0050 | — | — | — | — | — | — |
| 707 | — | — | — | — | 0.0050 | — | — | — | — | — |
| 708 | — | — | — | — | — | 0.0050 | — | — | — | — |
| 709 | — | — | — | — | — | — | 0.0040 | — | — | — |
| 710 | — | — | — | — | — | — | — | 0.0050 | — | — |
| 711 | — | — | — | — | — | — | — | — | — | — |
| 712 | — | — | — | — | — | — | — | — | — | — |
| 713 | — | — | — | — | — | — | — | — | — | — |
| 714 | — | — | — | — | — | — | — | — | — | — |
| 715 | — | — | — | — | — | — | — | — | 0.10 | — |

TABLE 13-continued

| 716 | — | — | — | — | — | — | — | — | — | 3.0 |
| 717 | — | — | — | — | — | — | — | — | — | — |
| 718 | — | — | — | — | — | — | — | — | — | — |
| 719 | — | — | — | — | — | — | — | — | — | — |
| 720 | — | — | — | — | — | — | — | — | — | — |
| 721 | — | — | — | — | — | — | — | — | — | — |
| 722 | — | — | — | — | — | — | — | — | — | — |
| 723 | — | — | — | — | — | — | — | — | — | — |
| 724 | — | — | — | — | — | — | — | — | — | — |
| 725 | — | — | — | — | — | — | — | — | — | — |
| 726 | — | — | — | — | — | — | — | — | — | — |
| 727 | — | — | — | — | — | — | — | — | — | — |
| 728 | — | — | — | — | — | — | — | — | — | — |
| 729 | — | — | — | — | — | — | — | — | 0.50 | — |
| 730 | — | — | — | — | — | — | — | — | — | 11.0 |
| 731 | — | — | — | — | — | — | — | — | — | — |
| 732 | — | — | — | — | — | — | — | — | — | — |
| 733 | — | — | — | — | — | — | — | — | — | — |
| 734 | — | — | — | — | — | — | — | — | — | — |
| 735 | — | — | — | — | — | — | — | — | — | — |
| 736 | — | — | — | — | — | — | — | — | — | — |
| 737 | — | — | — | — | — | — | — | — | — | — |
| 738 | — | — | — | — | — | — | — | — | — | — |
| 739 | — | — | — | — | — | — | — | — | — | — |
| 740 | — | — | — | — | — | — | — | — | — | — |
| 741 | — | — | — | — | — | — | — | — | — | — |
| 742 | — | — | — | — | — | — | — | — | — | — |
| 743 | — | — | — | — | — | — | — | — | — | — |
| 744 | — | — | — | — | — | — | — | — | — | — |

TABLE 14

| No. | Q | Sheet thickness mm | Grain size μm | {100} intensity | Number of Cu particles (<100 nm)/10 μm² | TS MPa | EL % | W10/400 W/kg | B50 T | Note |
|---|---|---|---|---|---|---|---|---|---|---|
| 701 | 3.36 | 0.20 | 81 | 2.7 | 102 | 600 | 14 | 10.3 | 1.65 | Invention Example |
| 702 | 3.37 | 0.20 | 80 | 2.8 | 95 | 610 | 13 | 10.4 | 1.64 | Invention Example |
| 703 | 3.35 | 0.20 | 80 | 2.8 | 91 | 600 | 13 | 10.5 | 1.64 | Invention Example |
| 704 | 3.35 | 0.20 | 81 | 2.9 | 103 | 610 | 14 | 10.3 | 1.65 | Invention Example |
| 705 | 3.37 | 0.20 | 81 | 2.7 | 100 | 610 | 13 | 10.5 | 1.65 | Invention Example |
| 706 | 3.35 | 0.20 | 81 | 2.8 | 101 | 610 | 14 | 10.3 | 1.64 | Invention Example |
| 707 | 3.36 | 0.20 | 79 | 2.8 | 92 | 610 | 15 | 10.6 | 1.64 | Invention Example |
| 708 | 3.37 | 0.20 | 80 | 2.7 | 97 | 610 | 14 | 1.04 | 1.65 | Invention Example |
| 709 | 3.37 | 0.20 | 81 | 2.8 | 104 | 610 | 13 | 10.3 | 1.64 | Invention Example |
| 710 | 3.35 | 0.20 | 79 | 2.7 | 103 | 600 | 14 | 10.5 | 1.64 | Invention Example |
| 711 | 3.36 | 0.20 | 39 | 2.9 | 99 | 630 | 13 | 11.7 | 1.65 | Comparative Example |
| 712 | 3.35 | 0.20 | 80 | 2.8 | 2 | 480 | 13 | 10.5 | 1.64 | Comparative Example |
| 713 | 3.36 | | | | Fractured | | | | | Comparative Example |
| 714 | 3.36 | 0.20 | 80 | 2.9 | 92 | 620 | 14 | 10.6 | 1.64 | Invention Example |
| 715 | 3.36 | 0.20 | 81 | 2.9 | 103 | 620 | 11 | 10.4 | 1.65 | Invention Example |
| 716 | 3.37 | 0.20 | 80 | 2.8 | 104 | 630 | 11 | 10.2 | 1.65 | Invention Example |
| 717 | 3.35 | 0.65 | 79 | 2.9 | 98 | 620 | 15 | 51.1 | 1.64 | Comparative Example |
| 718 | 1.91 | 0.20 | 93 | 0.3 | 43 | 550 | 15 | 12.3 | 1.63 | Comparative Example |
| 719 | 3.37 | 0.20 | 82 | 2.8 | 98 | 620 | 13 | 10.3 | 1.64 | Invention Example |
| 720 | 1.94 | 0.20 | 81 | 2.9 | 103 | 590 | 15 | 12.4 | 1.75 | Comparative Example |
| 721 | 4.82 | 0.20 | | | Fractured | | | | | Comparative Example |
| 722 | 3.46 | 0.20 | 61 | 2.8 | 96 | 630 | 17 | 15.1 | 1.65 | Comparative Example |
| 723 | 1.05 | 0.20 | 43 | 2.8 | 96 | 680 | 14 | 15.4 | 1.60 | Comparative Example |
| 724 | 9.73 | 0.20 | | | Fractured | | | | | Comparative Example |
| 725 | 3.29 | 0.20 | 82 | 2.7 | 97 | 580 | 16 | 10.5 | 1.62 | Comparative Example |
| 726 | 3.38 | 0.20 | | | Fractured | | | | | Comparative Example |
| 727 | 3.35 | 0.20 | 44 | 2.9 | 104 | 680 | 15 | 15.5 | 1.65 | Comparative Example |
| 728 | 3.29 | 0.20 | 84 | 2.8 | 103 | 630 | 14 | 15.6 | 1.65 | Comparative Example |
| 729 | 3.40 | 0.20 | | | Fractured | | | | | Comparative Example |
| 730 | 3.25 | 0.20 | 83 | 2.8 | 104 | 670 | 9 | 12.3 | 1.60 | Comparative Example |
| 731 | 3.42 | 0.20 | 302 | 2.7 | 101 | 580 | 8 | 11.6 | 1.66 | Comparative Example |
| 732 | 2.61 | 0.20 | 83 | 2.8 | 98 | 630 | 14 | 9.8 | 1.63 | Invention Example |
| 733 | 5.91 | 0.20 | 81 | 2.8 | 98 | 650 | 13 | 9.8 | 1.63 | Invention Example |
| 734 | 3.39 | 0.20 | 82 | 2.9 | 104 | 670 | 14 | 10.5 | 1.66 | Invention Example |
| 735 | 3.33 | 0.20 | 83 | 2.9 | 251 | 720 | 15 | 10.3 | 1.64 | Invention Example |
| 736 | 3.27 | 0.20 | 81 | 2.7 | 101 | 680 | 14 | 9.9 | 1.65 | Invention Example |
| 737 | 3.32 | 0.20 | 149 | 2.9 | 101 | 590 | 12 | 9.7 | 1.65 | Invention Example |
| 738 | 3.39 | 0.20 | 83 | 2.7 | 104 | 600 | 15 | 10.4 | 1.65 | Invention Example |
| 739 | 2.92 | 0.20 | 71 | 2.8 | 100 | 610 | 14 | 11.0 | 1.65 | Invention Example |
| 740 | 8.65 | 0.20 | 82 | 2.9 | 98 | 710 | 15 | 9.6 | 1.63 | Invention Example |

TABLE 14-continued

| No. | Q | Sheet thickness mm | Grain size μm | {100} intensity | Number of Cu particles (<100 nm)/10 μm² | TS MPa | EL % | W10/400 W/kg | B50 T | Note |
|---|---|---|---|---|---|---|---|---|---|---|
| 741 | 4.40 | 0.20 | 81 | 2.7 | 92 | 660 | 15 | 9.5 | 1.63 | Invention Example |
| 742 | 2.16 | 0.20 | 81 | 2.7 | 106 | 750 | 13 | 9.2 | 1.63 | Invention Example |
| 743 | 3.31 | 0.20 | 80 | 2.7 | 513 | 780 | 14 | 10.4 | 1.63 | Invention Example |
| 744 | 3.39 | 0.20 | 83 | 2.7 | 93 | 750 | 14 | 9.7 | 1.63 | Invention Example |

As shown in Tables 13 and 14, in Sample Nos. 701 to 710, Nos. 714 to 716, No. 719, and Nos. 732 to 744, since the chemical composition was within the range of the present invention and other conditions were within the ranges of the present invention, good results were obtained in magnetic characteristics and mechanical properties.

In Sample No. 711, since substantially no coarse precipitate forming element was contained, the iron loss W10/400 was high.

In Sample No. 712, since the Cu content was too small, the tensile strength (TS) was insufficient.

In Sample No. 713, since the Cu content was too large, fracture had occurred during the test.

In Sample No. 717, since the sheet thickness was too thick, the iron loss W10/400 was high.

In Sample No. 718, since Al was not contained in a specified amount and the parameter Q was less than 2.00, the tensile strength (TS) was low, and the iron loss W10/400 was high.

In Sample No. 720, since the Si content was small, the iron loss W10/400 was high.

In Sample No. 721, since the Si content was large, fracture had occurred during the test.

In Sample No. 722, since the Mn content was small, the iron loss W10/400 was high.

In Sample No. 723, since the Mn content was large, the iron loss W10/400 was high, and as a result, the magnetic flux density B50 was inferior.

In Sample No. 724, since the Al content was large, fracture had occurred during the test.

In Sample No. 725, since the P content was small, the tensile strength (TS) was low, and as a result, the magnetic flux density B50 was inferior.

In Sample No. 726, since the P content was large, fracture had occurred during the test.

In Sample No. 727, since the S content was large, the iron loss W10/400 was high.

Sample No. 728, since the Mg content was large, the iron loss W10/400 was high.

In Sample No. 729, since the Sn content was too large, fracture had occurred during the test.

In Sample No. 730, since the Cr content was too large, the total elongation EL was low, the iron loss W10/400 was high, and as a result, the magnetic flux density B50 was inferior.

In Sample No. 731, since the average grain size was large, the tensile strength (TS) and the total elongation EL were low, and the iron loss W10/400 was high.

(Eighth Test)

In an eighth test, a 1.0 mm thick hot-rolled coil having the chemical composition shown in Table 15 was prepared. Regarding this hot-rolled coil, molten steel was caused to flow between a pair of rolls and solidify, and a steel strip having a proportion of columnar crystals of 80% or more in terms of area fraction and an average grain size of 0.1 mm or more was obtained. Next, for the hot-rolled coil, scale on the surface layer was removed by pickling.

Thereafter, the hot-rolled coil was cold-rolled to 0.20 mm. In final annealing, the steel strip was heated at a temperature rising rate of 20° C./sec, and after 1000° C. was reached, soaked for 15 seconds and air-cooled. Furthermore, as a Cu precipitation treatment, the steel sheet was heated to 600° C., soaked for 1 minute, and then air-cooled.

At this time, by variously changing manufacturing conditions, non-oriented electrical steel sheets having different {100} crystal orientation intensities I were produced. For each of the non-oriented electrical steel sheets, the number of particles of simple Cu having a diameter of less than 100 nm per 10 μm², the {100} crystal orientation intensity I, and the average grain size r were measured. The results are shown in Table 16.

In addition, the iron loss W10/400, the magnetic flux density, the tensile strength (TS), and the total elongation (EL) were also measured by the same procedure as in the first test. The results are shown in Table 16.

TABLE 15

| No. | C mass % | Si mass % | Mn mass % | Al mass % | P mass % | S mass % | Mg mass % | Cu mass % | Ni mass % |
|---|---|---|---|---|---|---|---|---|---|
| 801 | 0.0021 | 2.96 | 0.20 | 0.30 | 0.014 | 0.0010 | 0.0040 | 1.6 | 0.01 |
| 802 | 0.0021 | 2.95 | 0.20 | 0.30 | 0.013 | 0.0010 | 0.0040 | 1.5 | 0.05 |
| 803 | 0.0021 | 2.95 | 0.20 | 0.30 | 0.014 | 0.0020 | 0.0050 | 1.5 | 0.10 |
| 804 | 0.0021 | 2.96 | 0.20 | 0.30 | 0.013 | 0.0010 | 0.0050 | 1.6 | 0.20 |
| 805 | 0.0021 | 2.95 | 0.20 | 0.30 | 0.015 | 0.0010 | 0.0040 | 1.5 | 0.52 |
| 806 | 0.0021 | 2.96 | 0.20 | 0.30 | 0.014 | 0.0010 | 0.0040 | 1.5 | 1.01 |
| 807 | 0.0020 | 2.97 | 0.20 | 0.30 | 0.013 | 0.0010 | 0.0040 | 1.6 | 1.53 |
| 808 | 0.0021 | 2.96 | 0.20 | 0.30 | 0.014 | 0.0010 | 0.0040 | 1.6 | 3.03 |
| 809 | 0.0021 | 2.96 | 0.20 | 0.30 | 0.014 | 0.0010 | 0.0050 | 1.6 | 5.01 |
| 810 | 0.0020 | 2.97 | 0.20 | 0.30 | 0.014 | 0.0010 | 0.0050 | 1.6 | 0.01 |
| 811 | 0.0020 | 2.97 | 0.20 | 0.30 | 0.014 | 0.0010 | 0.0040 | 1.6 | 0.05 |
| 812 | 0.0021 | 2.96 | 0.20 | 0.30 | 0.014 | 0.0020 | 0.0050 | 1.6 | 0.10 |
| 813 | 0.0021 | 2.97 | 0.20 | 0.30 | 0.013 | 0.0020 | 0.0050 | 1.5 | 0.20 |
| 814 | 0.0020 | 2.97 | 0.20 | 0.30 | 0.013 | 0.0010 | 0.0040 | 1.6 | 0.51 |
| 815 | 0.0020 | 2.95 | 0.20 | 0.30 | 0.015 | 0.0010 | 0.0050 | 1.6 | 1.03 |
| 816 | 0.0021 | 2.95 | 0.20 | 0.30 | 0.014 | 0.0010 | 0.0050 | 1.6 | 1.53 |

TABLE 15-continued

| No. | C mass % | Si mass % | Mn mass % | Al mass % | P mass % | S mass % | Mg mass % | Cu mass % | Ni mass % |
|---|---|---|---|---|---|---|---|---|---|
| 817 | 0.0021 | 2.97 | 0.20 | 0.30 | 0.015 | 0.0010 | 0.0040 | 1.6 | 3.01 |
| 818 | 0.0021 | 2.97 | 0.20 | 0.30 | 0.014 | 0.0020 | 0.0050 | 1.5 | 5.04 |
| 819 | 0.0020 | 2.96 | 0.20 | 0.30 | 0.014 | 0.0010 | — | 1.6 | 0.01 |
| 820 | 0.0021 | 2.96 | 0.20 | 0.30 | 0.014 | 0.0020 | — | 1.6 | 0.05 |
| 821 | 0.0020 | 2.96 | 0.20 | 0.30 | 0.015 | 0.0010 | — | 1.5 | 0.10 |
| 822 | 0.0021 | 2.96 | 0.20 | 0.30 | 0.015 | 0.0010 | — | 1.5 | 0.20 |
| 823 | 0.0021 | 2.97 | 0.20 | 0.30 | 0.014 | 0.0010 | — | 1.5 | 0.51 |
| 824 | 0.0021 | 2.96 | 0.20 | 0.30 | 0.015 | 0.0010 | — | 1.6 | 1.01 |
| 825 | 0.0021 | 2.95 | 0.20 | 0.30 | 0.013 | 0.0010 | — | 1.6 | 1.51 |
| 826 | 0.0021 | 2.96 | 0.20 | 0.30 | 0.014 | 0.0010 | — | 1.5 | 3.00 |
| 827 | 0.0020 | 2.96 | 0.20 | 0.30 | 0.015 | 0.0010 | — | 1.6 | 5.04 |
| 828 | 0.0021 | 2.97 | 0.20 | 0.30 | 0.014 | 0.0010 | 0.0040 | 0.1 | 0.01 |
| 829 | 0.0020 | 2.97 | 0.20 | 0.30 | 0.015 | 0.0010 | 0.0050 | 0.1 | 0.05 |
| 830 | 0.0021 | 2.95 | 0.20 | 0.30 | 0.014 | 0.0010 | 0.0040 | 0.1 | 0.10 |
| 831 | 0.0021 | 2.95 | 0.20 | 0.30 | 0.014 | 0.0020 | 0.0050 | 0.1 | 0.20 |
| 832 | 0.0021 | 2.97 | 0.20 | 0.30 | 0.015 | 0.0010 | 0.0050 | 0.1 | 0.51 |
| 833 | 0.0021 | 2.97 | 0.20 | 0.30 | 0.015 | 0.0020 | 0.0050 | 0.1 | 1.02 |
| 834 | 0.0021 | 2.96 | 0.20 | 0.30 | 0.015 | 0.0010 | 0.0050 | 0.1 | 1.51 |
| 835 | 0.0021 | 2.95 | 0.20 | 0.30 | 0.014 | 0.0010 | 0.0040 | 0.1 | 3.03 |
| 836 | 0.0020 | 2 96 | 0.20 | 0.30 | 0.014 | 0.0010 | 0.0040 | 0.1 | 5.00 |
| 837 | 0.0020 | 2.95 | 0.20 | 0.30 | 0.014 | 0.0010 | 0.0040 | 0.1 | 0.01 |
| 838 | 0.0020 | 2.97 | 0.20 | 0.30 | 0.014 | 0.0010 | 0.0040 | 0.1 | 0.05 |
| 839 | 0.0020 | 2.96 | 0.20 | 0.30 | 0.013 | 0.0020 | 0.0050 | 0.1 | 0.10 |
| 840 | 0.0021 | 2.96 | 0.20 | 0.30 | 0.014 | 0.0010 | 0.0050 | 0.1 | 0.20 |
| 841 | 0.0021 | 2.96 | 0.20 | 0.30 | 0.014 | 0.0020 | 0.0040 | 0.1 | 0.53 |
| 842 | 0.0021 | 2.97 | 0.20 | 0.30 | 0.015 | 0.0020 | 0.0040 | 0.1 | 1.02 |
| 843 | 0.0020 | 2.97 | 0.20 | 0.30 | 0.013 | 0.0020 | 0.0040 | 0.1 | 1.50 |
| 844 | 0.0020 | 2.97 | 0.20 | 0.30 | 0.015 | 0.0010 | 0.0050 | 0.1 | 3.02 |
| 845 | 0.0021 | 2.96 | 0.20 | 0.30 | 0.014 | 0.0010 | 0.0050 | 0.1 | 5.03 |
| 846 | 0.0021 | 2.96 | 0.20 | 0.30 | 0.013 | 0.0010 | — | 0.1 | 0.01 |
| 847 | 0.0021 | 2.95 | 0.20 | 0.30 | 0.014 | 0.0020 | — | 0.1 | 0.05 |
| 848 | 0.0020 | 2.95 | 0.20 | 0.30 | 0.015 | 0.0020 | — | 0.1 | 0.10 |
| 849 | 0.0021 | 2.95 | 0.20 | 0.30 | 0.013 | 0.0020 | — | 0.1 | 0.20 |
| 850 | 0.0021 | 2.97 | 0.20 | 0.30 | 0.015 | 0.0010 | — | 0.1 | 0.51 |
| 851 | 0.0021 | 2.96 | 0.20 | 0.30 | 0.013 | 0.0010 | — | 0.1 | 1.03 |
| 852 | 0.0021 | 2.97 | 0.20 | 0.30 | 0.014 | 0.0010 | — | 0.1 | 1.52 |
| 853 | 0.0021 | 2.97 | 0.20 | 0.30 | 0.014 | 0.0010 | — | 0.1 | 3.03 |
| 854 | 0.0020 | 2.95 | 0.20 | 0.30 | 0.014 | 0.0010 | — | 0.1 | 5.04 |
| 855 | 0.0022 | 1.50 | 0.19 | 0.20 | 0.012 | 0.0015 | 0.0051 | 1.6 | 0.10 |
| 856 | 0.0021 | 4.52 | 0.20 | 0.33 | 0.012 | 0.0015 | 0.0049 | 1.5 | 0.12 |
| 857 | 0.0021 | 2.97 | 0.08 | 0.34 | 0.012 | 0.0016 | 0.0054 | 1.6 | 0.12 |
| 858 | 0.0019 | 2.96 | 2.53 | 0.29 | 0.011 | 0.0013 | 0.0046 | 1.6 | 0.12 |
| 859 | 0.0019 | 2.99 | 0.18 | 3.51 | 0.014 | 0.0014 | 0.0044 | 1.6 | 0.11 |
| 860 | 0.0022 | 2.99 | 0.17 | 0.27 | 0.001 | 0.0016 | 0.0053 | 1.6 | 0.10 |
| 801 | 0.0018 | 2.98 | 0.15 | 0.32 | 0.301 | 0.0014 | 0.0049 | 1.6 | 0.12 |
| 862 | 0.0021 | 2.97 | 0.17 | 0.32 | 0.013 | 0.0043 | 0.0045 | 1.6 | 0.12 |
| 863 | 0.0022 | 2.97 | 0.22 | 0.34 | 0.014 | 0.0013 | 0.0200 | 1.6 | 0.11 |
| 864 | 0.0022 | 2.97 | 0.24 | 0.31 | 0.012 | 0.0013 | 0.0050 | 1.6 | 0.10 |
| 865 | 0.0020 | 2.98 | 1.04 | 0.28 | 0.014 | 0.0013 | 0.0050 | 1.5 | 0.10 |
| 866 | 0.0019 | 2.98 | 0.25 | 1.52 | 0.013 | 0.0014 | 0.0045 | 1.6 | 0.12 |
| 867 | 0.0021 | 2.99 | 0.21 | 0.28 | 0.102 | 0.0015 | 0.0042 | 1.6 | 0.11 |
| 868 | 0.0019 | 2.99 | 0.15 | 0.27 | 0.013 | 0.0016 | 0.0054 | 1.9 | 0.11 |
| 869 | 0.0022 | 2.96 | 0.18 | 0.29 | 0.013 | 0.0016 | 0.0042 | 1.6 | 1.52 |
| 870 | 0.0022 | 2.98 | 0.25 | 0.28 | 0.014 | 0.0015 | 0.0042 | 1.6 | 0.11 |

TABLE 16

| No. | Q | Sheet thickness mm | Grain size μm | {100} intensity | Number of Cu particles (<100 nm)/10 μm² | TS MPa | EL % | W10/400 W/kg | B50 T | Note |
|---|---|---|---|---|---|---|---|---|---|---|
| 801 | 3.36 | 0.20 | 81 | 2.9 | 101 | 600 | 3 | 10.5 | 1.65 | Comparative Example |
| 802 | 3.35 | 0.20 | 80 | 2.8 | 101 | 600 | 5 | 10.5 | 1.64 | Comparative Example |
| 803 | 3.35 | 0.20 | 83 | 2.7 | 100 | 610 | 12 | 10.6 | 1.65 | Invention Example |
| 804 | 3.36 | 0.20 | 81 | 2.8 | 105 | 600 | 15 | 10.3 | 1.64 | Invention Example |
| 805 | 3.35 | 0.20 | 83 | 2.9 | 98 | 610 | 17 | 10.6 | 1.64 | Invention Example |
| 806 | 3.36 | 0.20 | 80 | 2.9 | 104 | 610 | 19 | 10.7 | 1.64 | Invention Example |
| 807 | 3.37 | 0.20 | 82 | 2.9 | 104 | 620 | 18 | 10.5 | 1.65 | Invention Example |
| 808 | 3.36 | 0.20 | 83 | 2.8 | 96 | 630 | 14 | 10.5 | 1.64 | Invention Example |
| 809 | 3.36 | 0.20 | 81 | 2.8 | 101 | 650 | 8 | 10.5 | 1.64 | Comparative Example |
| 810 | 3.37 | 0.20 | 80 | 1.8 | 103 | 600 | 13 | 10.3 | 1.59 | Comparative Example |
| 811 | 3.37 | 0.20 | 84 | 1.8 | 101 | 600 | 13 | 10.4 | 1.60 | Comparative Example |
| 812 | 3.36 | 0.20 | 80 | 1.9 | 97 | 610 | 14 | 10.6 | 1.60 | Comparative Example |
| 813 | 3.37 | 0.20 | 82 | 1.7 | 98 | 600 | 17 | 10.4 | 1.59 | Comparative Example |

TABLE 16-continued

| No. | Q | Sheet thickness mm | Grain size μm | {100} intensity | Number of Cu particles (<100 nm)/10 μm² | TS MPa | EL % | W10/400 W/kg | B50 T | Note |
|---|---|---|---|---|---|---|---|---|---|---|
| 814 | 3.37 | 0.20 | 84 | 1.8 | 98 | 600 | 18 | 10.4 | 1.59 | Comparative Example |
| 815 | 3.35 | 0.20 | 84 | 1.9 | 104 | 610 | 20 | 10.5 | 1.60 | Comparative Example |
| 816 | 3.35 | 0.20 | 81 | 1.8 | 98 | 620 | 20 | 10.6 | 1.60 | Comparative Example |
| 817 | 3.37 | 0.20 | 83 | 1.9 | 102 | 630 | 17 | 10.5 | 1.59 | Comparative Example |
| 818 | 3.37 | 0.20 | 80 | 1.8 | 97 | 650 | 9 | 10.4 | 1.59 | Comparative Example |
| 819 | 3.36 | 0.20 | 83 | 2.8 | 99 | 600 | 11 | 11.5 | 1.65 | Comparative Example |
| 820 | 3.36 | 0.20 | 83 | 2.8 | 104 | 600 | 12 | 11.5 | 1.64 | Comparative Example |
| 821 | 3.36 | 0.20 | 80 | 2.9 | 104 | 610 | 14 | 11.3 | 1.64 | Comparative Example |
| 822 | 3.36 | 0.20 | 82 | 2.8 | 101 | 600 | 16 | 11.6 | 1.65 | Comparative Example |
| 823 | 3.37 | 0.20 | 80 | 2.9 | 102 | 610 | 19 | 11.5 | 1.65 | Comparative Example |
| 824 | 3.36 | 0.20 | 81 | 2.9 | 104 | 610 | 19 | 11.5 | 1.65 | Comparative Example |
| 825 | 3.35 | 0.20 | 82 | 2.9 | 98 | 620 | 18 | 11.4 | 1.64 | Comparative Example |
| 826 | 3.36 | 0.20 | 82 | 2.7 | 100 | 630 | 15 | 11.4 | 1.65 | Comparative Example |
| 827 | 3.36 | 0.20 | 83 | 2.8 | 99 | 650 | 9 | 11.3 | 1.65 | Comparative Example |
| 828 | 3.37 | 0.20 | 84 | 2.8 | 1 | 500 | 17 | 10.7 | 1.65 | Comparative Example |
| 829 | 3.37 | 0.20 | 80 | 2.7 | 0 | 490 | 18 | 10.5 | 1.65 | Comparative Example |
| 830 | 3.35 | 0.20 | 82 | 2.7 | 0 | 490 | 19 | 10.3 | 1.64 | Comparative Example |
| 831 | 3.35 | 0.20 | 81 | 2.7 | 1 | 490 | 19 | 10.4 | 1.64 | Comparative Example |
| 832 | 3.37 | 0.20 | 82 | 2.8 | 0 | 490 | 21 | 10.5 | 1.65 | Comparative Example |
| 833 | 3.37 | 0.20 | 82 | 2.7 | 0 | 500 | 20 | 10.6 | 1.65 | Comparative Example |
| 834 | 3.36 | 0.20 | 83 | 2.9 | 0 | 510 | 18 | 10.4 | 1.65 | Comparative Example |
| 835 | 3.35 | 0.20 | 81 | 2.8 | 2 | 520 | 15 | 10.6 | 1.64 | Comparative Example |
| 836 | 3.36 | 0.20 | 83 | 2.8 | 2 | 540 | 8 | 10.3 | 1.64 | Comparative Example |
| 837 | 3.35 | 0.20 | 83 | 1.7 | 0 | 490 | 18 | 10.7 | 1.59 | Comparative Example |
| 838 | 3.37 | 0.20 | 81 | 1.7 | 0 | 500 | 19 | 10.3 | 1.60 | Comparative Example |
| 839 | 3.36 | 0.20 | 82 | 1.7 | 0 | 500 | 19 | 10.7 | 1.60 | Comparative Example |
| 840 | 3.36 | 0.20 | 82 | 1.7 | 1 | 490 | 20 | 10.6 | 1.59 | Comparative Example |
| 841 | 3.36 | 0.20 | 82 | 1.8 | 0 | 490 | 20 | 10.5 | 1.59 | Comparative Example |
| 842 | 3.37 | 0.20 | 82 | 1.9 | 1 | 500 | 20 | 10.7 | 1.60 | Comparative Example |
| 843 | 3.37 | 0.20 | 81 | 1.8 | 0 | 510 | 19 | 10.5 | 1.60 | Comparative Example |
| 844 | 3.37 | 0.20 | 81 | 1.8 | 0 | 520 | 15 | 10.7 | 1.59 | Comparative Example |
| 845 | 3.36 | 0.20 | 81 | 1.8 | 1 | 540 | 9 | 10.7 | 1.59 | Comparative Example |
| 846 | 3.36 | 0.20 | 81 | 2.8 | 2 | 490 | 19 | 10.5 | 1.65 | Comparative Example |
| 847 | 3.35 | 0.20 | 83 | 2.9 | 0 | 490 | 19 | 10.3 | 1.64 | Comparative Example |
| 848 | 3.35 | 0.20 | 82 | 2.9 | 1 | 490 | 19 | 11.5 | 1.64 | Comparative Example |
| 849 | 3.35 | 0.20 | 80 | 2.8 | 0 | 500 | 20 | 11.5 | 1.65 | Comparative Example |
| 850 | 3.37 | 0.20 | 83 | 2.7 | 0 | 490 | 20 | 11.4 | 1.65 | Comparative Example |
| 851 | 3.36 | 0.20 | 81 | 2.9 | 1 | 500 | 20 | 11.6 | 1.65 | Comparative Example |
| 852 | 3.37 | 0.20 | 81 | 2.8 | 0 | 510 | 19 | 11.5 | 1.65 | Comparative Example |
| 853 | 3.37 | 0.20 | 82 | 2.8 | 1 | 520 | 17 | 11.7 | 1.65 | Comparative Example |
| 854 | 3.35 | 0.20 | 81 | 2.8 | 0 | 540 | 9 | 11.4 | 1.65 | Comparative Example |
| 855 | 1.89 | 0.20 | 83 | 2.8 | 96 | 580 | 17 | 12.2 | 1.74 | Comparative Example |
| 856 | 4.98 | 0.20 | | | Fractured | | | | | Comparative Example |
| 857 | 5.57 | 0.20 | 60 | 2.8 | 98 | 640 | 18 | 15.2 | 1.64 | Comparative Example |
| 858 | 1.01 | 0.20 | 40 | 2.8 | 101 | 680 | 14 | 15 | 1.61 | Comparative Example |
| 859 | 9.83 | 0.20 | | | Fractured | | | | | Comparative Example |
| 860 | 3.36 | 0.20 | 82 | 2.7 | 101 | 580 | 16 | 10.5 | 1.61 | Comparative Example |
| 861 | 3.47 | 0.20 | | | Fractured | | | | | Comparative Example |
| 862 | 3.44 | 0.20 | 40 | 2.8 | 99 | 690 | 15 | 15.4 | 1.66 | Comparative Example |
| 863 | 3.43 | 0.20 | 82 | 2.7 | 97 | 630 | 15 | 15.4 | 1.66 | Comparative Example |
| 864 | 3.35 | 0.20 | 301 | 2.9 | 99 | 580 | 8 | 11.3 | 1.65 | Comparative Example |
| 865 | 2.50 | 0.20 | 82 | 2.9 | 98 | 630 | 14 | 9.7 | 1.63 | Invention Example |
| 866 | 5.77 | 0.20 | 83 | 2.8 | 102 | 650 | 13 | 9.8 | 1.63 | Invention Example |
| 867 | 3.34 | 0.20 | 80 | 2.8 | 96 | 670 | 14 | 10.5 | 1.65 | Invention Example |
| 868 | 3.38 | 0.20 | 83 | 2.8 | 249 | 720 | 15 | 10.5 | 1.64 | Invention Example |
| 869 | 3.36 | 0.20 | 81 | 2.8 | 100 | 680 | 14 | 9.8 | 1.66 | Invention Example |
| 870 | 3.29 | 0.20 | 152 | 2.7 | 104 | 590 | 12 | 9.8 | 1.65 | Invention Example |

As shown in Tables 15 and 16, in Sample Nos. 803 to 808 and Nos. 865 to 870, since the chemical composition was within the range of the present invention and other conditions were within the ranges of the present invention, good results were obtained in magnetic characteristics and mechanical properties.

In Sample Nos. 801 and 802, since the Ni content was too small, the total elongation (EL) was insufficient.

In Sample No. 809, since the Ni content was too large, the total elongation (EL) was insufficient.

In Sample Nos. 810 to 818, since the {100} crystal orientation intensity I was too low, the magnetic flux density B50 was insufficient.

In Sample Nos. 819 to 827, since substantially no coarse precipitate forming element was contained, the iron loss W10/400 was deteriorated.

In Sample Nos. 828 to 836, since the Cu content was too small, the tensile strength (TS) was insufficient.

In Sample Nos. 837 to 845, since the Cu content was too small and the {100} crystal orientation intensity I was too low, the tensile strength (TS) and the magnetic flux density B50 were insufficient.

In Sample Nos. 846 to 854, since substantially no coarse precipitate forming element was contained, and the Cu content was too small, the iron loss W10/400 was deteriorated, and the tensile strength TS was insufficient.

In Sample No. 855, since the Si content was small, the iron loss W10/400 was high.

In Sample No. 856, since the Si content was large, fracture had occurred during the test.

In Sample No. 857, since the Mn content was small, the iron loss W10/400 was high.

In Sample No. 858, since the Mn content was large, the iron loss W10/400 was high, and as a result, the magnetic flux density B50 was inferior.

In Sample No. 859, since the Al content was large, fracture had occurred during the test.

In Sample No. 860, since the P content was small, the tensile strength (TS) was low, and as a result, the magnetic flux density B50 was inferior.

In Sample No. 861, since the P content was large, fracture had occurred during the test.

In Sample No. 862, since the S content was large, the iron loss W10/400 was high.

In Sample No. 863, since the Mg content was large, the iron loss W10/400 was high.

In Sample No. 864, since the average grain size was large, the tensile strength (TS) and the total elongation EL were low, and the iron loss W10/400 was high.

(Ninth Test)

In a ninth test, molten steel having the chemical composition shown in Table 17 was cast to produce a slab, and the slab was hot-rolled to obtain a steel strip having a proportion of columnar crystals of 80% or more in terms of area fraction and an average grain size of 0.1 mm or more.

Next, the steel strip was subjected to cold rolling, final annealing, and a Cu precipitation treatment, whereby various non-oriented electrical steel sheets having thicknesses of 0.20 mm and 0.65 mm were produced. The cold rolling was performed at a cold rolling temperature of 50° C. with a cold rolling reduction of 80%, and in the final annealing, the steel strip was heated at a temperature rising rate of 20° C./sec, and after 1000° C. was reached, soaked for 15 seconds and air-cooled. Furthermore, as the Cu precipitation treatment, the steel sheet was heated to 600° C., soaked for 1 minute, and then air-cooled. In Sample No. 912, the Cu precipitation treatment was omitted. For each of the non-oriented electrical steel sheets, the number of particles of simple Cu of less than 100 nm per 10 $\mu m^2$, the $\{100\}$ crystal orientation intensity I, and the average grain size r were measured. The results are shown in Table 18.

Then, the magnetic characteristics and mechanical properties of each of the non-oriented electrical steel sheets were measured. For this measurement, a ring test piece having an outer diameter of 5 inches and an inner diameter of 4 inches was used. That is, a ring magnetism measurement was measured. The results are shown in Table 18. An iron loss W10/400 equal to or less than an evaluation criterion W0 (W/kg) represented by Formula 2 indicates an excellent value. That is, in a case where the thickness was 0.20 mm, an iron loss of 11.0 (W/kg) or less was evaluated as excellent, and in a case where the thickness was 0.65 mm, an iron loss of 46.7 (W/kg) or less was evaluated as excellent. A magnetic flux density B50 of 1.63 T or more was evaluated as excellent.

$$W0=11\times[0.45+0.55\times\{0.5\times(t/0.20)+0.5\times(t/0.20)^2\}] \quad \text{(Formula 2)}$$

Here, the mechanical properties were tested by the method described in JIS. The test piece used was a JIS No. 5 test piece in which a parallel portion of the test piece was aligned with the rolling direction of the steel sheet.

In particular, in order for a non-oriented electrical steel sheet used in an HEV motor to withstand an ultra-high-speed rotation of nearly 10,000 rpm, TS≥590 MPa and EL≥10% were taken as good criteria.

TABLE 17

| No. | C mass % | Si mass % | Mn mass % | Al mass % | P mass % | S mass % | Cu mass % | Ni mass % | Mg mass % | Ca mass % |
|---|---|---|---|---|---|---|---|---|---|---|
| 901 | 0.0021 | 2.95 | 0.20 | 0.30 | 0.011 | 0.0010 | 1.4 | 0.11 | 0.0040 | — |
| 902 | 0.0020 | 2.94 | 0.20 | 0.30 | 0.012 | 0.0020 | 1.5 | 0.10 | — | 0.0050 |
| 903 | 0.0021 | 2.96 | 0.20 | 0.30 | 0.012 | 0.0020 | 1.5 | 0.12 | — | — |
| 904 | 0.0019 | 2.96 | 0.20 | 0.30 | 0.011 | 0.0010 | 1.4 | 0.12 | — | — |
| 905 | 0.0020 | 2.94 | 0.20 | 0.30 | 0.011 | 0.0010 | 1.5 | 0.10 | — | — |
| 906 | 0.0021 | 2.96 | 0.20 | 0.30 | 0.012 | 0.0020 | 1.4 | 0.11 | — | — |
| 907 | 0.0020 | 2.95 | 0.20 | 0.30 | 0.014 | 0.0020 | 1.4 | 0.10 | — | — |
| 908 | 0.0020 | 2.95 | 0.20 | 0.30 | 0.012 | 0.0010 | 1.4 | 0.10 | — | — |
| 909 | 0.0021 | 2.94 | 0.20 | 0.30 | 0.011 | 0.0010 | 1.5 | 0.11 | — | — |
| 910 | 0.0021 | 2.95 | 0.20 | 0.30 | 0.012 | 0.0010 | 1.5 | 0.12 | — | — |
| 911 | 0.0021 | 2.96 | 0.20 | 0.30 | 0.013 | 0.0020 | 1.5 | 0.10 | — | — |
| 912 | 0.0020 | 2.95 | 0.20 | 0.30 | 0.012 | 0.0020 | 0.9 | 0.10 | 0.0050 | — |
| 913 | 0.0021 | 2.96 | 0.20 | 0.30 | 0.011 | 0.0020 | 3.2 | 0.11 | 0.0040 | — |
| 914 | 0.0019 | 2.94 | 0.20 | 0.30 | 0.012 | 0.0020 | 1.5 | 0.10 | 0.0050 | — |
| 915 | 0.0021 | 2.95 | 0.20 | 0.30 | 0.011 | 0.0020 | 1.4 | 0.12 | 0.0050 | — |
| 916 | 0.0019 | 2.97 | 0.20 | 0.30 | 0.012 | 0.0020 | 1.5 | 0.12 | 0.0040 | — |
| 917 | 0.0021 | 2.95 | 0.20 | 0.30 | 0.011 | 0.0010 | 1.4 | 0.11 | 0.0040 | — |

| No. | Sr mass % | Ba mass % | Ce mass % | La mass % | Nd mass % | Pr mass % | Zn mass % | Cd mass % | Sn mass % | Cr mass % |
|---|---|---|---|---|---|---|---|---|---|---|
| 901 | — | — | — | — | — | — | — | — | — | — |
| 902 | — | — | — | — | — | — | — | — | — | — |
| 903 | 0.0040 | — | — | — | — | — | — | — | — | — |
| 904 | — | 0.0050 | — | — | — | — | — | — | — | — |
| 905 | — | — | 0.0040 | — | — | — | — | — | — | — |
| 906 | — | — | — | 0.0040 | — | — | — | — | — | — |
| 907 | — | — | — | — | 0.0060 | — | — | — | — | — |
| 908 | — | — | — | — | — | 0.0050 | — | — | — | — |
| 909 | — | — | — | — | — | — | 0.0040 | — | — | — |
| 910 | — | — | — | — | — | — | — | 0.0050 | — | — |
| 911 | — | — | — | — | — | — | — | — | — | — |
| 912 | — | — | — | — | — | — | — | — | — | — |

TABLE 17-continued

| No. | | | | | | | | | | |
|-----|---|---|---|---|---|---|---|---|---|---|
| 913 | — | — | — | — | — | — | — | — | — | — |
| 914 | — | — | — | — | — | — | — | — | — | — |
| 915 | — | — | — | — | — | — | — | — | 0.10 | — |
| 916 | — | — | — | — | — | — | — | — | — | 3.0 |
| 917 | — | — | — | — | — | — | — | — | — | — |

TABLE 18

| No. | Q | Sheet thickness mm | Grain size μm | {100} intensity | Number of Cu particles (<100 nm)/10 μm² | TS MPa | EL % | W10/400 W/kg | B50 T | Note |
|---|---|---|---|---|---|---|---|---|---|---|
| 901 | 3.35 | 0.20 | 82 | 2.8 | 95 | 600 | 13 | 10.5 | 1.65 | Invention Example |
| 902 | 3.34 | 0.20 | 81 | 2.8 | 91 | 620 | 14 | 10.3 | 1.64 | Invention Example |
| 903 | 3.36 | 0.20 | 80 | 2.7 | 101 | 610 | 13 | 10.5 | 1.64 | Invention Example |
| 904 | 3.36 | 0.20 | 80 | 2.8 | 105 | 610 | 12 | 10.4 | 1.64 | Invention Example |
| 905 | 3.34 | 0.20 | 81 | 2.7 | 92 | 620 | 12 | 10.5 | 1.64 | Invention Example |
| 906 | 3.36 | 0.20 | 81 | 2.7 | 95 | 600 | 13 | 10.3 | 1.64 | Invention Example |
| 907 | 3.35 | 0.20 | 82 | 2.8 | 91 | 610 | 12 | 10.5 | 1.65 | Invention Example |
| 908 | 3.35 | 0.20 | 82 | 2.8 | 100 | 600 | 14 | 10.3 | 1.64 | Invention Example |
| 909 | 3.34 | 0.20 | 80 | 2.7 | 102 | 610 | 13 | 10.4 | 1.64 | Invention Example |
| 910 | 3.35 | 0.20 | 81 | 2.7 | 109 | 600 | 12 | 10.6 | 1.64 | Invention Example |
| 911 | 3.36 | 0.20 | 40 | 2.8 | 91 | 630 | 13 | 11.5 | 1.65 | Comparative Example |
| 912 | 3.35 | 0.20 | 80 | 2.8 | 2 | 490 | 17 | 10.5 | 1.64 | Comparative Example |
| 913 | 3.36 | 0.20 | | | Fractured | | | | | Comparative Example |
| 914 | 3.34 | 0.20 | 82 | 2.8 | 91 | 630 | 14 | 10.4 | 1.64 | Invention Example |
| 915 | 3.35 | 0.20 | 81 | 2.9 | 99 | 630 | 11 | 10.5 | 1.65 | Invention Example |
| 916 | 3.37 | 0.20 | 80 | 2.8 | 106 | 630 | 13 | 10.6 | 1.64 | Invention Example |
| 917 | 3.35 | 0.65 | 81 | 2.8 | 98 | 610 | 13 | 51.5 | 1.65 | Comparative Example |

As shown in Tables 17 and 18, in Sample Nos. 901 to 910, and Nos. 914 to 916, since the chemical composition was within the range of the present invention and other conditions were within the ranges of the present invention, good results were obtained in magnetic characteristics and mechanical properties.

In Sample No. 911, since substantially no coarse precipitate forming element was contained, the iron loss W10/400 was high.

In Sample No. 912, since the Cu content was too small, the tensile strength (TS) was insufficient.

In Sample No. 913, since the Cu content was too large, fracture had occurred during the test.

In Sample No. 917, since the sheet thickness was too thick, the iron loss W10/400 was high.

(Tenth Test)

In a tenth test, molten steel having the chemical composition shown in Table 19 was cast to produce a slab, and the slab was hot-rolled to obtain a steel strip having a proportion of columnar crystals of 80% or more in terms of area fraction and an average grain size of 0.1 mm or more. The remainder is Fe and impurities. Next, the steel strip was subjected to cold rolling, final annealing, and a Cu precipitation treatment, whereby various non-oriented electrical steel sheets having a thickness of 0.20 mm were produced. At this time, by variously changing manufacturing conditions, non-oriented electrical steel sheets having different {100} crystal orientation intensities I were produced. For each of the non-oriented electrical steel sheets, the number of particles of simple Cu of less than 100 nm per 10 μm², the {100} crystal orientation intensity I, and the average grain size r were measured. The results are shown in Table 20.

In addition, the iron loss W10/400, the magnetic flux density B50, the tensile strength (TS), and the total elongation (EL) were also measured by the same procedure as in the ninth test. The results are shown in Table 20.

TABLE 19

| No. | C mass % | Si mass % | Mn mass % | Al mass % | P mass % | S mass % | Mg mass % | Cu mass % | Ni mass % |
|---|---|---|---|---|---|---|---|---|---|
| 921 | 0.0021 | 2.95 | 0.20 | 0.30 | 0.013 | 0.0010 | 0.0040 | 1.6 | 0.01 |
| 922 | 0.0020 | 2.96 | 0.20 | 0.30 | 0.014 | 0.0020 | 0.0050 | 1.5 | 0.05 |
| 923 | 0.0022 | 2.95 | 0.20 | 0.30 | 0.015 | 0.0020 | 0.0040 | 1.5 | 0.10 |
| 924 | 0.0021 | 2.97 | 0.20 | 0.30 | 0.013 | 0.0010 | 0.0040 | 1.5 | 0.20 |
| 925 | 0.0021 | 2.96 | 0.20 | 0.30 | 0.014 | 0.0010 | 0.0040 | 1.5 | 0.53 |
| 926 | 0.0022 | 2.96 | 0.20 | 0.30 | 0.014 | 0.0010 | 0.0050 | 1.6 | 1.02 |
| 927 | 0.0020 | 2.95 | 0.20 | 0.30 | 0.015 | 0.0020 | 0.0040 | 1.6 | 1.51 |
| 928 | 0.0021 | 2.95 | 0.20 | 0.30 | 0.013 | 0.0010 | 0.0040 | 1.6 | 3.01 |
| 929 | 0.0022 | 2.96 | 0.20 | 0.30 | 0.014 | 0.0010 | 0.0040 | 1.5 | 5.03 |
| 930 | 0.0021 | 2.97 | 0.20 | 0.30 | 0.014 | 0.0020 | 0.0040 | 1.5 | 0.01 |
| 931 | 0.0022 | 2.96 | 0.20 | 0.30 | 0.015 | 0.0010 | 0.0040 | 1.5 | 0.05 |
| 932 | 0.0020 | 2.95 | 0.20 | 0.30 | 0.013 | 0.0010 | 0.0050 | 1.5 | 0.10 |
| 933 | 0.0021 | 2.95 | 0.20 | 0.30 | 0.013 | 0.0020 | 0.0040 | 1.5 | 0.20 |
| 934 | 0.0022 | 2.97 | 0.20 | 0.30 | 0.013 | 0.0010 | 0.0040 | 1.5 | 0.52 |
| 935 | 0.0021 | 2.97 | 0.20 | 0.30 | 0.014 | 0.0020 | 0.0040 | 1.5 | 1.01 |

TABLE 19-continued

| No. | C mass % | Si mass % | Mn mass % | Al mass % | P mass % | S mass % | Mg mass % | Cu mass % | Ni mass % |
|---|---|---|---|---|---|---|---|---|---|
| 936 | 0.0021 | 2.95 | 0.20 | 0.30 | 0.014 | 0.0010 | 0.0050 | 1.5 | 1.51 |
| 937 | 0.0020 | 2.96 | 0.20 | 0.30 | 0.013 | 0.0020 | 0.0050 | 1.5 | 3.02 |
| 938 | 0.0021 | 2.95 | 0.20 | 0.30 | 0.014 | 0.0010 | 0.0040 | 1.5 | 5.02 |
| 939 | 0.0021 | 2.97 | 0.20 | 0.30 | 0.014 | 0.0020 | — | 1.6 | 0.of |
| 940 | 0.0022 | 2.95 | 0.20 | 0.30 | 0.013 | 0.0010 | — | 1.6 | 0.05 |
| 941 | 0.0022 | 2.97 | 0.20 | 0.30 | 0.013 | 0.0010 | — | 1.5 | 0.10 |
| 942 | 0.0022 | 2.95 | 0.20 | 0.30 | 0.014 | 0.0010 | — | 1.5 | 0.20 |
| 943 | 0.0021 | 2.96 | 0.20 | 0.30 | 0.015 | 0.0010 | — | 1.5 | 0.50 |
| 944 | 0.0020 | 2.96 | 0.20 | 0.30 | 0.013 | 0.0020 | — | 1.6 | 1.04 |
| 945 | 0.0020 | 2.96 | 0.20 | 0.30 | 0.014 | 0.0010 | — | 1.6 | 1.52 |
| 946 | 0.0021 | 2.97 | 0.20 | 0.30 | 0.015 | 0.0020 | — | 1.5 | 3.01 |
| 947 | 0.0022 | 2.95 | 0.20 | 0.30 | 0.014 | 0.0010 | — | 1.5 | 5.01 |
| 948 | 0.0022 | 2.97 | 0.20 | 0.30 | 0.014 | 0.0020 | 0.0040 | 0.1 | 0.01 |
| 949 | 0.0021 | 2.95 | 0.20 | 0.30 | 0.015 | 0.0010 | 0.0040 | 0.1 | 0.05 |
| 950 | 0.0022 | 2.97 | 0.20 | 0.30 | 0.013 | 0.0020 | 0.0050 | 0.1 | 0.10 |
| 951 | 0.0020 | 2.95 | 0.20 | 0.30 | 0.014 | 0.0010 | 0.0050 | 0.1 | 0.20 |
| 952 | 0.0021 | 2.95 | 0.20 | 0.30 | 0.015 | 0.0020 | 0.0040 | 0.1 | 0.51 |
| 953 | 0.0021 | 2.95 | 0.20 | 0.30 | 0.013 | 0.0020 | 0.0040 | 0.1 | 1.03 |
| 954 | 0.0022 | 2.95 | 0.20 | 0.30 | 0.014 | 0.0010 | 0.0040 | 0.1 | 1.53 |
| 955 | 0.0020 | 2.95 | 0.20 | 0.30 | 0.014 | 0.0010 | 0.0050 | 0.1 | 3.02 |
| 956 | 0.0021 | 2.95 | 0.20 | 0.30 | 0.013 | 0.0020 | 0.0050 | 0.1 | 5.01 |
| 957 | 0.0022 | 2.95 | 0.20 | 0.30 | 0.014 | 0.0010 | 0.0040 | 0.1 | 0.01 |
| 958 | 0.0021 | 2.96 | 0.20 | 0.30 | 0.013 | 0.0010 | 0.0040 | 0.1 | 0.05 |
| 959 | 0.0020 | 2.95 | 0.20 | 0.30 | 0.015 | 0.0020 | 0.0040 | 0.1 | 0.10 |
| 960 | 0.0020 | 2.96 | 0.20 | 0.30 | 0.013 | 0.0010 | 0.0050 | 0.1 | 0.20 |
| 961 | 0.0022 | 2.95 | 0.20 | 0.30 | 0.015 | 0.0020 | 0.0040 | 0.1 | 0.51 |
| 962 | 0.0021 | 2.95 | 0.20 | 0.30 | 0.014 | 0.0010 | 0.0040 | 0.1 | 1.02 |
| 963 | 0.0022 | 2.95 | 0.20 | 0.30 | 0.014 | 0.0020 | 0.0050 | 0.1 | 1.51 |
| 964 | 0.0022 | 2.95 | 0.20 | 0.30 | 0.013 | 0.0010 | 0.0040 | 0.1 | 3.03 |
| 965 | 0.0022 | 2.96 | 0.20 | 0.30 | 0.014 | 0.0010 | 0.0040 | 0.1 | 5.01 |
| 966 | 0.0022 | 2.95 | 0.20 | 0.30 | 0.014 | 0.0020 | — | 0.1 | 0.01 |
| 967 | 0.0021 | 2.96 | 0.20 | 0.30 | 0.013 | 0.0010 | — | 0.1 | 0.05 |
| 968 | 0.0021 | 2.95 | 0.20 | 0.30 | 0.015 | 0.0010 | — | 0.1 | 0.10 |
| 969 | 0.0022 | 2.95 | 0.20 | 0.30 | 0.014 | 0.0020 | — | 0.1 | 0.20 |
| 970 | 0.0020 | 2.97 | 0.20 | 0.30 | 0.014 | 0.0020 | — | 0.1 | 0.52 |
| 971 | 0.0021 | 2.95 | 0.20 | 0.30 | 0.014 | 0.0010 | — | 0.1 | 1.02 |
| 972 | 0.0020 | 2.95 | 0.20 | 0.30 | 0.013 | 0.0010 | — | 0.1 | 1.51 |
| 973 | 0.0022 | 2.96 | 0.20 | 0.30 | 0.015 | 0.0010 | — | 0.1 | 3.03 |
| 974 | 0.0021 | 2.96 | 0.20 | 0.30 | 0.013 | 0.0020 | — | 0.1 | 5.02 |

TABLE 20

| No. | Q | Sheet thickness mm | Grain size μm | {100} intensity | Number of Cu particles (<100 nm)/10 μm² | TS MPa | EL % | W10/400 W/kg | B50 T | Note |
|---|---|---|---|---|---|---|---|---|---|---|
| 921 | 3.35 | 0.20 | 83 | 2.9 | 100 | 600 | 3 | 10.5 | 1.65 | Comparative Example |
| 922 | 3.36 | 0.20 | 83 | 2.9 | 95 | 610 | 5 | 10.5 | 1.64 | Comparative Example |
| 923 | 3.35 | 0.20 | 81 | 2.9 | 103 | 600 | 12 | 10.6 | 1.64 | Invention Example |
| 924 | 3.37 | 0.20 | 81 | 2.8 | 99 | 600 | 16 | 10.6 | 1.65 | Invention Example |
| 925 | 3.36 | 0.20 | 82 | 2.9 | 102 | 610 | 18 | 10.6 | 1.64 | Invention Example |
| 926 | 3.36 | 0.20 | 83 | 2.9 | 101 | 610 | 19 | 10.3 | 1.64 | Invention Example |
| 927 | 3.35 | 0.20 | 83 | 2.9 | 99 | 620 | 18 | 10.7 | 1.64 | Invention Example |
| 928 | 3.35 | 0.20 | 81 | 2.8 | 97 | 630 | 15 | 10.7 | 1.64 | Invention Example |
| 929 | 3.36 | 0.20 | 83 | 2.9 | 96 | 650 | 8 | 10.5 | 1.65 | Comparative Example |
| 930 | 3.37 | 0.20 | 81 | 1.9 | 99 | 600 | 13 | 10.2 | 1.59 | Comparative Example |
| 931 | 3.36 | 0.20 | 82 | 1.9 | 102 | 600 | 14 | 10.7 | 1.60 | Comparative Example |
| 932 | 3.35 | 0.20 | 81 | 1.9 | 105 | 610 | 14 | 10.5 | 1.59 | Comparative Example |
| 933 | 3.35 | 0.20 | 83 | 1.9 | 104 | 600 | 16 | 10.2 | 1.60 | Comparative Example |
| 934 | 3.37 | 0.20 | 82 | 2.0 | 96 | 600 | 18 | 10.5 | 1.60 | Comparative Example |
| 935 | 3.37 | 0.20 | 80 | 1.8 | 95 | 610 | 20 | 10.5 | 1.59 | Comparative Example |
| 936 | 3.35 | 0.20 | 82 | 1.9 | 103 | 620 | 19 | 10.4 | 1.59 | Comparative Example |
| 937 | 3.36 | 0.20 | 81 | 2.0 | 101 | 630 | 16 | 10.7 | 1.60 | Comparative Example |
| 938 | 3.35 | 0.20 | 80 | 1.9 | 99 | 650 | 9 | 10.4 | 1.59 | Comparative Example |
| 939 | 3.37 | 0.20 | 81 | 2.9 | 103 | 600 | 11 | 11.2 | 1.65 | Comparative Example |
| 940 | 3.35 | 0.20 | 82 | 2.9 | 102 | 600 | 12 | 11.5 | 1.65 | Comparative Example |
| 941 | 3.37 | 0.20 | 81 | 2.8 | 103 | 600 | 13 | 11.2 | 1.64 | Comparative Example |
| 942 | 3.35 | 0.20 | 82 | 3.0 | 104 | 610 | 16 | 11.3 | 1.64 | Comparative Example |
| 943 | 3.36 | 0.20 | 82 | 2.8 | 101 | 610 | 18 | 11.3 | 1.64 | Comparative Example |
| 944 | 3.36 | 0.20 | 80 | 2.9 | 97 | 610 | 19 | 11.7 | 1.65 | Comparative Example |
| 945 | 3.36 | 0.20 | 80 | 2.9 | 97 | 620 | 19 | 11.4 | 1.65 | Comparative Example |
| 946 | 3.37 | 0.20 | 80 | 3.0 | 105 | 630 | 16 | 11.2 | 1.64 | Comparative Example |
| 947 | 3.35 | 0.20 | 82 | 2.9 | 103 | 650 | 9 | 11.5 | 1.64 | Comparative Example |
| 948 | 3.37 | 0.20 | 81 | 3.0 | 1 | 490 | 17 | 10.3 | 1.64 | Comparative Example |

TABLE 20-continued

| No. | Q | Sheet thickness mm | Grain size µm | {100} intensity | Number of Cu particles (<100 nm)/10 µm² | TS MPa | EL % | W10/400 W/kg | B50 T | Note |
|---|---|---|---|---|---|---|---|---|---|---|
| 949 | 3.35 | 0.20 | 81 | 2.8 | 0 | 490 | 18 | 10.5 | 1.65 | Comparative Example |
| 950 | 3.37 | 0.20 | 82 | 2.8 | 0 | 490 | 18 | 10.3 | 1.65 | Comparative Example |
| 951 | 3.35 | 0.20 | 82 | 3.0 | 1 | 500 | 19 | 10.6 | 1.65 | Comparative Example |
| 952 | 3.35 | 0.20 | 80 | 3.0 | 0 | 490 | 20 | 10.3 | 1.64 | Comparative Example |
| 953 | 3.35 | 0.20 | 80 | 2.8 | 0 | 500 | 20 | 10.7 | 1.64 | Comparative Example |
| 954 | 3.35 | 0.20 | 81 | 2.9 | 2 | 510 | 19 | 10.2 | 1.64 | Comparative Example |
| 955 | 3.35 | 0.20 | 83 | 2.9 | 0 | 520 | 15 | 10.6 | 1.64 | Comparative Example |
| 956 | 3.35 | 0.20 | 82 | 2.9 | 0 | 540 | 8 | 10.5 | 1.65 | Comparative Example |
| 957 | 3.35 | 0.20 | 81 | 1.9 | 0 | 490 | 18 | 10.4 | 1.59 | Comparative Example |
| 958 | 3.36 | 0.20 | 82 | 2.0 | 2 | 490 | 18 | 10.6 | 1.60 | Comparative Example |
| 959 | 3.35 | 0.20 | 80 | 1.5 | 0 | 490 | 19 | 10.4 | 1.59 | Comparative Example |
| 960 | 3.36 | 0.20 | 80 | 1.9 | 0 | 490 | 19 | 10.3 | 1.59 | Comparative Example |
| 961 | 3.35 | 0.20 | 82 | 1.9 | 2 | 500 | 19 | 10.5 | 1.59 | Comparative Example |
| 962 | 3.35 | 0.20 | 80 | 1.8 | 1 | 500 | 20 | 10.4 | 1.60 | Comparative Example |
| 963 | 3.35 | 0.20 | 81 | 1.9 | 0 | 510 | 19 | 10.4 | 1.59 | Comparative Example |
| 964 | 3.35 | 0.20 | 81 | 1.9 | 2 | 520 | 16 | 10.6 | 1.60 | Comparative Example |
| 965 | 3.36 | 0.20 | 82 | 1.9 | 0 | 540 | 9 | 10.6 | 1.60 | Comparative Example |
| 966 | 3.35 | 0.20 | 83 | 2.8 | 0 | 490 | 19 | 11.6 | 1.64 | Comparative Example |
| 967 | 3.36 | 0.20 | 82 | 2.8 | 1 | 490 | 19 | 11.5 | 1.65 | Comparative Example |
| 968 | 3.35 | 0.20 | 82 | 2.9 | 0 | 500 | 19 | 11.5 | 1.64 | Comparative Example |
| 969 | 3 35 | 0.20 | 82 | 2.9 | 0 | 490 | 19 | 11.5 | 1.64 | Comparative Example |
| 970 | 3.37 | 0.20 | 80 | 2.9 | 0 | 490 | 19 | 11.3 | 1.64 | Comparative Example |
| 971 | 3.35 | 0.20 | 80 | 3.0 | 1 | 500 | 20 | 11.6 | 1.65 | Comparative Example |
| 972 | 3.35 | 0.20 | 83 | 2.9 | 0 | 510 | 19 | 11.6 | 1.64 | Comparative Example |
| 973 | 3.36 | 0.20 | 83 | 3.0 | 1 | 520 | 18 | 11.7 | 1.64 | Comparative Example |
| 974 | 3.36 | 0.20 | 82 | 2.9 | 1 | 540 | 9 | 11.4 | 1.65 | Comparative Example |

As shown in Tables 19 and 20, in Sample Nos. 923 to 928, since the chemical composition was within the range of the present invention and other conditions were within the ranges of the present invention, good results were obtained in magnetic characteristics and mechanical properties.

In Sample Nos. 921 and 922, since the Ni content was too small, the total elongation (EL) was insufficient.

In Sample No. 929, since the Ni content was too large, the total elongation (EL) was insufficient.

In Sample Nos. 930 to 938, since the {100} crystal orientation intensity I was too low, the magnetic flux density B50 was insufficient.

In Sample Nos. 939 to 947, since substantially no coarse precipitate forming element was contained, the iron loss W10/400 was deteriorated.

In Sample Nos. 948 to 956, since the Cu content was too small, the tensile strength (TS) was insufficient.

In Sample Nos. 957 to 965, since the Cu content was too small and the {100} crystal orientation intensity I was too low, the tensile strength (TS) and the magnetic flux density B50 were insufficient.

In Sample Nos. 966 to 974, since substantially no coarse precipitate forming element was contained and the Cu content was too small, the iron loss W10/400 was deteriorated, and the tensile strength (TS) was insufficient.

INDUSTRIAL APPLICABILITY

According to the present invention, it is possible to provide a non-oriented electrical steel sheet which is excellent in magnetic characteristics and excellent in both strength and elongation. Therefore, the present invention has high industrial utility value.

The invention claimed is:

1. A non-oriented electrical steel sheet comprising, as a chemical composition, by mass %:

C: 0.0030% or less;
Si: 2.00% to 4.00%;
Al: 0.01% to 3.00%;
Mn: 0.10% to 2.00%;
P: 0.005% to 0.200%;
S: 0.0030% or less;
Cu: more than 1.0% and 3.0% or less;
Ni: 0.10% to 3.0%;
one or more of Mg, Ca, Sr, Ba, Ce, La, Nd, Pr, Zn, and Cd: more than 0.0005% and 0.0100% or less in total;
a parameter Q represented by Formula 1 where a Si content (mass %) is set as [Si], an Al content (mass %) is set as [Al], and a Mn content (mass %) is set as [Mn]: 2.00 or more;
Sn: 0.00% to 0.40%;
Cr: 0.0% to 10.0%, and
a remainder: Fe and impurities,
wherein a number of Cu particles having a diameter of less than 100 nm is 5 or more per 10 µm²,
a {100} crystal orientation intensity is 2.4 or more,
a thickness is 0.10 mm to 0.60 mm, and
an average grain size is 70 µm to 200 µm
Q=[Si] +2 [Al]−[Mn] (Formula 1).

2. The non-oriented electrical steel sheet according to claim 1, wherein, in the chemical composition,
Sn: 0.02% to 0.40%
is satisfied.

3. The non-oriented electrical steel sheet according to claim 2, wherein, in the chemical composition,
Cr: 0.2% to 10.0%
is satisfied.

4. The non-oriented electrical steel sheet according to claim 1, wherein, in the chemical composition,
Cr: 0.2% to 10.0%
is satisfied.

* * * * *